(12) United States Patent
Park et al.

(10) Patent No.: US 12,523,859 B2
(45) Date of Patent: *Jan. 13, 2026

(54) OPTICAL PATH CONTROL MEMBER AND DISPLAY DEVICE INCLUDING SAME

(71) Applicant: LG INNOTEK CO., LTD., Seoul (KR)

(72) Inventors: Jin Gyeong Park, Seoul (KR); Jong Sik Lee, Seoul (KR); Byung Sook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 401 days.

This patent is subject to a terminal disclaimer.

(21) Appl. No.: 18/007,420

(22) PCT Filed: Jul. 26, 2021

(86) PCT No.: PCT/KR2021/009633
§ 371 (c)(1),
(2) Date: Jan. 30, 2023

(87) PCT Pub. No.: WO2022/025560
PCT Pub. Date: Feb. 3, 2022

(65) Prior Publication Data
US 2024/0272420 A1 Aug. 15, 2024

(30) Foreign Application Priority Data

Jul. 28, 2020 (KR) .................. 10-2020-0093718
Jul. 28, 2020 (KR) .................. 10-2020-0093818

(51) Int. Cl.
*G02B 26/02* (2006.01)
*G02B 26/08* (2006.01)
(Continued)

(52) U.S. Cl.
CPC .......... *G02B 26/023* (2013.01); *G02B 26/08* (2013.01); *G02F 1/1323* (2013.01); *G02F 1/167* (2013.01);
(Continued)

(58) Field of Classification Search
CPC ................. G02B 26/023; G02B 26/08; G02B 2207/123; G02F 1/1323; G02F 1/167;
(Continued)

(56) References Cited

U.S. PATENT DOCUMENTS 8,094,364 B2 1/2012 Park
10,867,898 B2 12/2020 Daitoku et al.
(Continued)

FOREIGN PATENT DOCUMENTS

CN 109308951 A 2/2019
EP 4 174 565 A1 5/2023
(Continued)

OTHER PUBLICATIONS

International Search Report dated Nov. 1, 2021 in International Application No. PCT/KR2021/009633.
(Continued)

*Primary Examiner* — Jia X Pan
(74) *Attorney, Agent, or Firm* — Saliwanchik, Lloyd & Eisenschenk

(57) ABSTRACT

An optical path control member according an embodiment comprises: a first substrate for which a first direction and a second direction are defined; a first electrode arranged on the first substrate; a second substrate which is arranged on the first substrate, and for which the first direction and the second direction are defined; a second electrode arranged under the second substrate; and an optical conversion unit arranged between the first electrode and the second electrode, wherein: the second substrate and the second elec-
(Continued)

trode include a cutting portion that passes through the second substrate and the second electrode; the cutting portion comprises a 1-1 cutting portion and a 1-2 cutting portion that are arranged in the second direction while facing each other, and a 2-1 cutting portion and a 2-2 cutting portion that are arranged in the first direction while facing each other; and a first sealing portion is arranged on the 1-1 cutting portion and the 1-2 cutting portion, and a second sealing portion is arranged inside the 2-1 cutting portion and the 2-2 cutting portion.

20 Claims, 48 Drawing Sheets

(51) Int. Cl.
  *G02F 1/13* (2006.01)
  *G02F 1/167* (2019.01)
  *G02F 1/1679* (2019.01)
  *H10K 59/50* (2023.01)
  *H10K 59/80* (2023.01)

(52) U.S. Cl.
  CPC ............ *G02F 1/1679* (2019.01); *H10K 59/50* (2023.02); *H10K 59/8791* (2023.02); *H10K 59/80* (2023.02)

(58) Field of Classification Search
  CPC ..... G02F 1/1679; G02F 1/1681; H10K 59/50; H10K 59/8791; H10K 59/8722
  See application file for complete search history.

(56) References Cited

U.S. PATENT DOCUMENTS

| | | |
|---|---|---|
| 11,031,330 B2 | 6/2021 | Daitoku et al. |
| 11,869,834 B2 | 1/2024 | Daitoku et al. |
| 2004/0027327 A1 | 2/2004 | LeCain et al. |
| 2009/0135468 A1 | 5/2009 | Park |
| 2009/0231676 A1 | 9/2009 | Uchida |
| 2017/0010516 A1 | 1/2017 | Shiota |
| 2019/0035719 A1 | 1/2019 | Daitoku et al. |
| 2020/0211951 A1 | 7/2020 | Daitoku et al. |
| 2021/0265256 A1 | 8/2021 | Daitoku et al. |
| 2023/0229035 A1* | 7/2023 | Park ................. G02F 1/1335 359/296 |
| 2023/0236467 A1 | 7/2023 | Park et al. |
| 2023/0258972 A1* | 8/2023 | Park ................. G02F 1/1323 349/56 |
| 2023/0273480 A1* | 8/2023 | Park ................. H10K 77/00 349/139 |
| 2023/0280612 A1* | 9/2023 | Choi ................. G02F 1/1323 349/62 |
| 2023/0341742 A1* | 10/2023 | Lee ................. H10K 59/80 |

FOREIGN PATENT DOCUMENTS

| | | | |
|---|---|---|---|
| JP | 2010-85566 A | | 4/2010 |
| JP | 2010085566 A | * | 4/2010 |
| JP | 2013-37190 A | | 2/2013 |
| JP | 2013037190 A | * | 2/2013 |
| JP | 6443691 B2 | | 12/2018 |
| JP | 2019-20486 A | | 2/2019 |
| JP | 2019-60946 A | | 4/2019 |
| KR | 10-2005-0013568 A | | 2/2005 |
| KR | 10-2009-0054278 A | | 5/2009 |
| KR | 10-2009-0098738 A | | 9/2009 |
| KR | 10-2013-0028219 A | | 3/2013 |
| KR | 10-2014-0015829 A | | 2/2014 |
| KR | 10-2015-0125051 A | | 11/2015 |
| KR | 10-2018-0004879 A | | 1/2018 |
| WO | 2015/122083 A1 | | 8/2015 |
| WO | WO-2022025474 A1 * | | 2/2022 ......... G02B 26/0875 |
| WO | WO-2022025529 A1 * | | 2/2022 ........... G02F 1/1335 |
| WO | WO-2022025578 A1 * | | 2/2022 ............. G02B 26/08 |
| WO | WO-2022050745 A1 * | | 3/2022 ............. G02B 6/0023 |

OTHER PUBLICATIONS

Office Action dated Dec. 10, 2024 in Korean Application No. 10-2020-0093718.

Supplementary European Search Report dated Aug. 1, 2024 in European Application No. 21849680.0.

Office Action dated Apr. 8, 2025 in Chinese Application No. 202180066093.6.

* cited by examiner (a)

(b)

Fig. 67
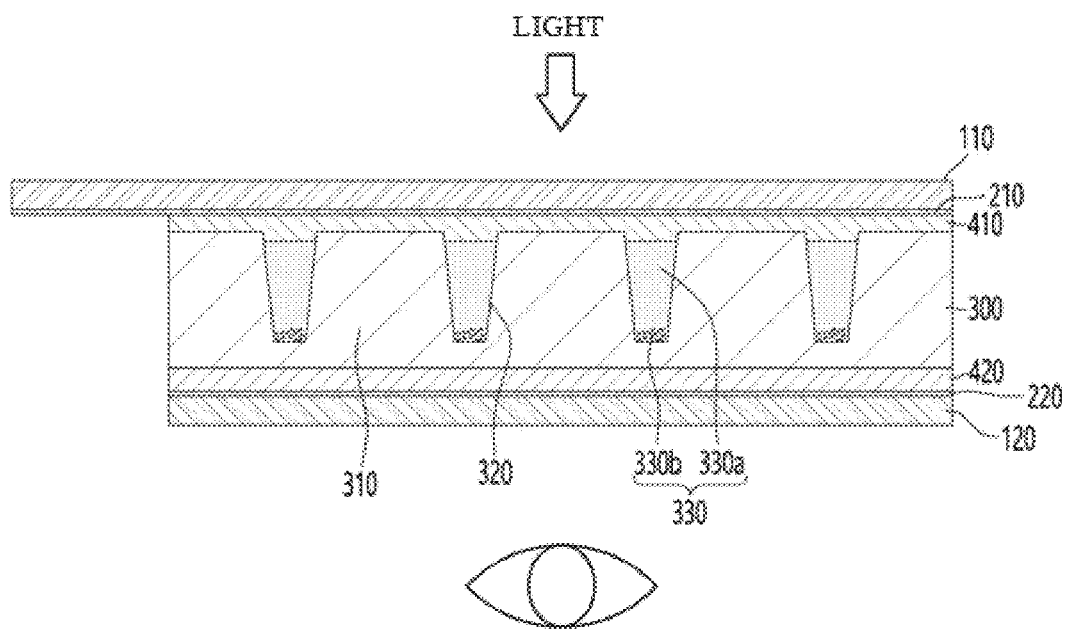
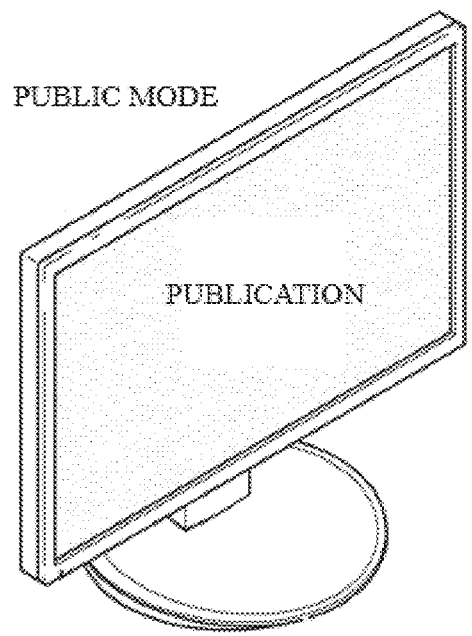

Fig. 68
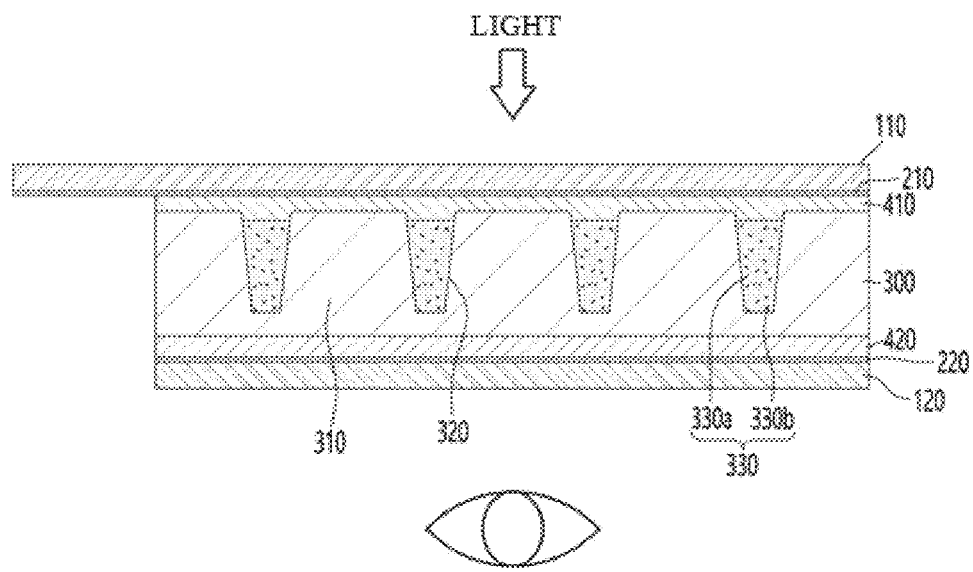
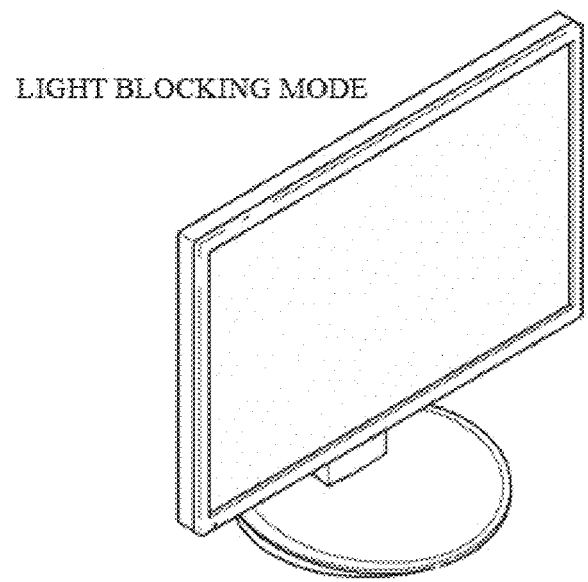
LIGHT BLOCKING MODE

OPTICAL PATH CONTROL MEMBER AND DISPLAY DEVICE INCLUDING SAME

CROSS-REFERENCE TO RELATED APPLICATIONS

This application is the U.S. national stage application of International Patent Application No. PCT/KR2021/009633, filed Jul. 26, 2021, which claims the benefit under 35 U.S.C. § 119 of Korean Application No. 10-2020-0093718, filed Jul. 28, 2020; and 10-2020-0093818, filed Jul. 28, 2020; the disclosures of each of which are incorporated herein by reference in their entirety.

TECHNICAL FIELD

An embodiment relates to an optical path control member, and to a display device including the same.

BACKGROUND ART

A light blocking film blocks transmitting of light from a light source, and is attached to a front surface of a display panel which is a display device used for a mobile phone, a notebook, a tablet PC, a vehicle navigation device, a vehicle touch, etc., so that the light blocking film adjusts a viewing angle of light according to an incident angle of light to express a clear image quality at a viewing angle needed by a user when the display transmits a screen.

In addition, the light blocking film may be used for the window of a vehicle, building or the like to shield outside light partially to inhibit glare, or to inhibit the inside from being visible from the outside.

That is, the light blocking film may be an optical path control member that controls the movement path of light to block light in a specific direction and transmit light in a specific direction. Accordingly, it is possible to control the viewing angle of the user by controlling a transmission angle of the light by the light blocking film.

Meanwhile, such a light blocking film may be divided into a light blocking film that can always control the viewing angle regardless of the surrounding environment or the user's environment and a switchable light blocking film that allow the user to turn on/off the viewing angle control according to the surrounding environment or the user's environment.

Such a switchable light blocking film may be implemented by converting an accommodating portion into a light transmitting part and a light blocking part by filling the inside of the accommodating portion with particles that may move when a voltage is applied and a dispersion liquid for dispersing the particles and by dispersing and aggregating the particles.

That is, the switchable light blocking film may include a plurality of accommodating portions filled with the dispersion liquid in order to change a path of light.

The dispersion liquid having viscosity is filled inside the accommodating portions as described above. Accordingly, there is a problem that the dispersion liquid flows out to the outside while the switchable light blocking film is in use, or impurities penetrate into the dispersion liquid, so that driving characteristics and reliability of the switchable light blocking film are deteriorated.

In addition, when the switchable light blocking film is combined with a display panel and the like to be used as a display device, a pattern of the switchable light blocking film and a pattern of the display panel may overlap to occur a moire phenomenon. Accordingly, when a user uses the display device, there is a problem that visibility is deteriorated due to moire.

Therefore, there is a need for an optical path control member having a new structure capable of solving the above problems.

DISCLOSURE

Technical Problem

An embodiment relates to an optical path control member having improved visibility and reliability, and to a display device including the same.

Technical Solution

An optical path control member according to an embodiment includes: a first substrate in which a first direction and a second direction are defined; a first electrode disposed on the first substrate; a second substrate which is disposed on the first substrate, and in which the first direction and the second direction are defined; a second electrode disposed under the second substrate; and an optical conversion unit disposed between the first electrode and the second electrode, wherein the second substrate and the second electrode include a cutting portion that passes through the second substrate and the second electrode, the cutting portion includes: a 1-1 cutting portion and a 1-2 cutting portion that are disposed to face each other in the second direction; and a 2-1 cutting portion and a 2-2 cutting portion that are disposed to face each other in the first direction, a first sealing portion is disposed on the 1-1 cutting portion and the 1-2 cutting portion, and a second sealing portion is disposed inside the 2-1 cutting portion and the 2-2 cutting portion.

Advantageous Effects

In an optical path control member according to a first embodiment, cutting portions passing through an entire or a portion of a second substrate, a second electrode, a buffer layer, and an optical conversion unit may be formed on the second substrate.

In addition, a first sealing portion and a second sealing portion may be disposed inside the cutting portions, respectively.

The first sealing portion and the second sealing portion are arranged to seal an inlet and an outlet of an accommodating portion for accommodating an optical conversion material, and to extend along a side region of the optical conversion unit, that is, a side region in a first direction.

Accordingly, it is possible to inhibit the optical conversion material inside the accommodating portion from flowing out to the outside of the optical conversion unit by the first sealing portion, and it is possible to inhibit impurities from penetrating into the optical conversion unit from the outside by the first sealing portion and the second sealing portion, thereby improving the reliability of the optical path control member.

In addition, since the first sealing portion and the second sealing portion are disposed inside the cutting portions formed on the second substrate, compared to forming the first sealing portion and the second sealing portion outside the optical conversion unit, the size of the optical path control member may be reduced, and the sealing property of the optical path control member may be improved by inhibiting the sealing member material from being denatured by an external environment.

In addition, in the optical path control member according to the first embodiment, a first connection electrode may be disposed on a first protrusion, and a second connection electrode may be disposed on a second protrusion formed on the second substrate.

Surfaces of the first and second substrates may not entirely protrude, and the first protrusion and the second protrusion may protrude only by an area in which a first connection region and a second connection electrode may be formed.

In addition, in the optical path control member according to the first embodiment, since the first connection electrode and the second connection electrode are disposed on the same plane, the first connection electrode and the second connection electrode are easily connected to a printed circuit board or the like.

Accordingly, the areas of the first protrusion and the second protrusion may be reduced. Accordingly, when the optical path control member is coupled to a display panel and applied to a display device, other components of the display device may be disposed in regions that do not correspond to the first protrusion and the second protrusion, thereby reducing a bezel region of the display device.

That is, the optical path control member according to the first embodiment reduces the size of the bezel region where the connection electrode is disposed, thereby reducing the bezel region of the display device to which the optical path control member is applied.

In an optical path control member according to a second embodiment, an accommodating portion may be disposed by tilting the accommodating portion at an inclination angle of a predetermined size with respect to a second direction of a substrate.

Accordingly, when the optical path control member and a display panel are coupled to form a display device, it is possible to inhibit the occurrence of the moire phenomenon caused by overlapping a pattern of the accommodating portion of the optical path controlling member and a pixel pattern of the display panel.

Accordingly, when the user views the display device from the outside, it is possible to inhibit the pattern from being viewed due to the moire phenomenon caused by the overlapping of the pattern of the accommodating portion of the optical path control member and the pattern of the pixel of the display panel.

In addition, the optical path control member according to the second embodiment may inhibit an optical conversion material from flowing out to a side surface of the optical path control member as the accommodating portion is inclined.

That is, since a first sealing portion and a second sealing portion are disposed at ends of the optical path control member in the first and second directions to seal the optical conversion material inside the accommodating portion, it is possible to minimize the optical conversion material flowing out to the outside or external impurities penetrating into the optical conversion material.

In addition, by forming a region where the sealing portion and the optical conversion material are mixed, adhesive properties of the sealing portion may be improved by the anchor effect. Accordingly, it is possible to improve the adhesion of the sealing portion to inhibit delamination, thereby improving reliability and sealing properties of the optical path control member.

An optical path control member according to a third embodiment may be disposed by connecting a first protrusion of a first substrate and a second protrusion of a second substrate.

Accordingly, when the first substrate and the second substrate are laminated, an alignment error may be reduced.

Accordingly, defects can be inhibited in the process of manufacturing the optical path control member, and process efficiency can be improved.

In addition, an adhesive layer is spaced apart from an electrode connection portion disposed inside a third cutting portion which is a second connection region, and the insulating layer is disposed between the electrode connection portion and the adhesive layer, so that it is possible to inhibit the electrode connection portion from being electrically connected to the first electrode by the dielectric constant of the adhesive layer.

Therefore, a material of the adhesive layer may be freely selected and an electric short by the dielectric constant of the adhesive layer may be inhibited, thereby improving the driving characteristics and reliability of the optical path control member.

DESCRIPTION OF DRAWINGS

FIGS. 67 to 69 are views for describing one embodiment of the display device to which the optical path control member according to the embodiment is applied.

MODES OF THE INVENTION

Figure 1:
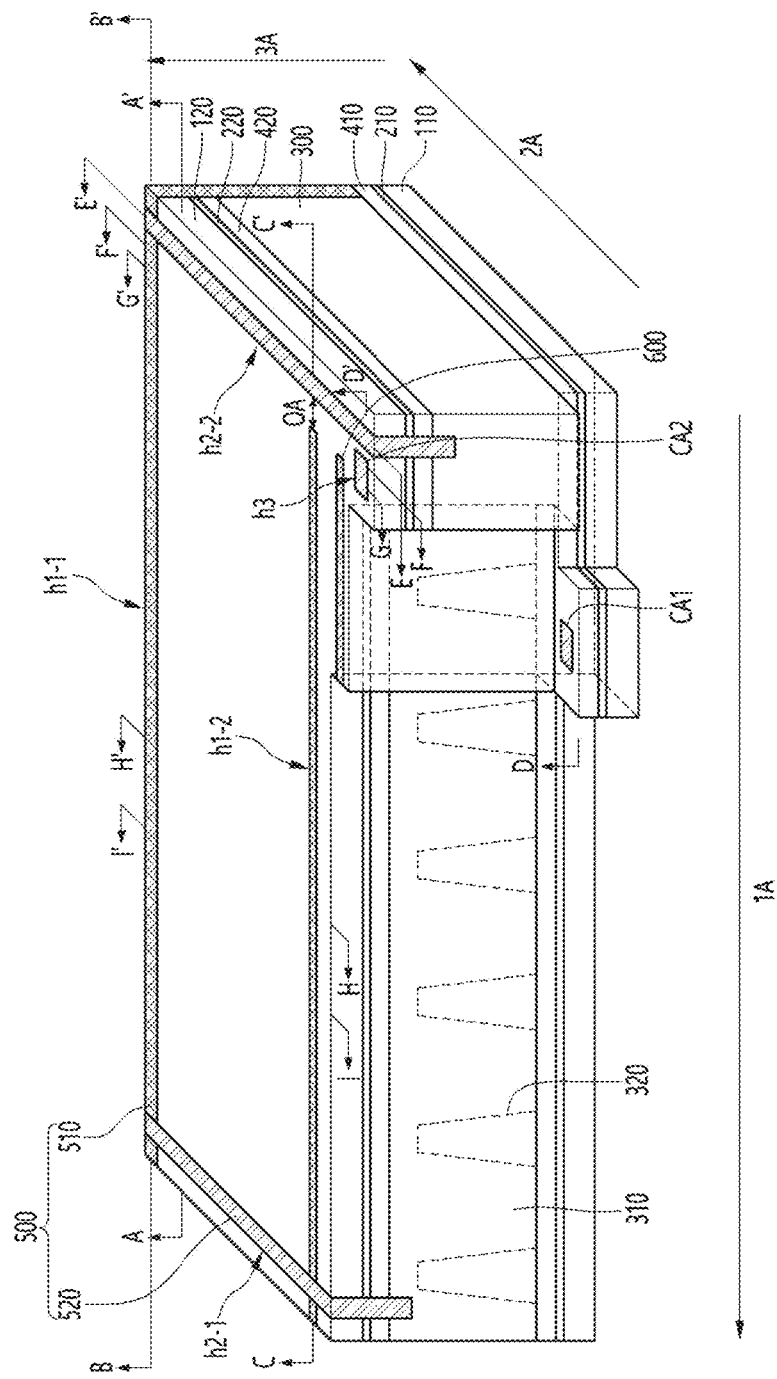
FIG. 1 is a perspective view of an optical path control member according to a first embodiment.

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", or "coupled" to another element, it may include not only when the element is directly "connected" to, or "coupled" to other elements, but also when the element is "connected", or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an optical path control member according to an embodiment will be described with reference to drawings. The optical path control member described below relates to a switchable optical path control member driven in various modes according to electrophoretic particles moving by application of a voltage.

Hereinafter. An optical path control member according to a first embodiment will be described with reference to FIGS. 1 to 14.

Referring to FIGS. 1 to 14, an optical path control member 1000 according to the first embodiment may include a first substrate 110, a second substrate 120, a first electrode 210, a second electrode 220, and an optical conversion unit 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the optical path control member including the first substrate 110 may also be formed to have flexible, curved, or bent characteristics. Accordingly, the optical path control member according to the embodiment may be changed to various designs.

The first substrate 110 may extend in a first direction 1A, a second direction 2A, and a third direction 3A.

In detail, the first substrate 110 may include the first direction 1A corresponding to a length or width direction of the first substrate 110, a second direction 2A extending in a direction different from the first direction 1A and corresponding to the length or width direction of the first substrate 110, and a third direction 3A extending in a direction different from the first direction 1A and the second direction 2A and corresponding to a thickness direction of the first substrate 110.

For example, the first direction 1A may be defined as the length direction of the first substrate 110, the second direction 2A may be defined as the width direction of the first substrate 110 perpendicular to the first direction 1A, and the third direction 3A may be defined as the thickness direction of the first substrate 110. Alternatively, the first direction 1A may be defined as the width direction of the first substrate 110, the second direction 2A may be defined as the length direction of the first substrate 110 perpendicular to the first direction 1A, and the third direction 3A may be defined as the thickness direction of the first substrate 110.

Hereinafter, for convenience of description, the first direction 1A will be described as the length direction of the first substrate 110, the second direction 2A will be described as the width direction of the first substrate 110, and the third directions 3A will be described as the thickness direction of the first substrate 110.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may include a transparent conductive material. For example, the first electrode 210 may include a conductive material having a light transmittance of about 80% or more. For example, the first electrode 210 may include a metal oxide such as indium tin oxide, indium zinc oxide, copper oxide, tin oxide, zinc oxide, titanium oxide, etc.

The first electrode 210 may have a thickness of 10 nm to 300 nm.

Alternatively, the first electrode 210 may include various metals to realize low resistance. For example, the first electrode 210 may include at least one metal of chromium (Cr), nickel (Ni), copper (Cu), aluminum (Al), silver (Ag), molybdenum (Mo), Gold (Au), titanium (Ti), and alloys thereof.

The first electrode 210 may be disposed on the entire surface of one surface of the first substrate 110. In detail, the first electrode 210 may be disposed as a surface electrode on one surface of the first substrate 110. However, the embodiment is not limited thereto, and the first electrode 210 may be formed of a plurality of pattern electrodes having a uniform pattern such as a mesh or stripe shape.

For example, the first electrode 210 may include a plurality of conductive patterns. In detail, the first electrode 210 may include a plurality of mesh lines crossing each other and a plurality of mesh openings formed by the mesh lines.

Accordingly, even though the first electrode 210 includes a metal, the first electrode 210 is not visually recognized from the outside, so that visibility may be improved. In addition, the light transmittance is increased by the openings, so that the brightness of the optical path control member according to the embodiment may be improved.

The second substrate 120 may be disposed on the first substrate 110. In detail, the second substrate 120 may be disposed on the first electrode 210 on the first substrate 110.

The second substrate 120 may include a material capable of transmitting light. The second substrate 120 may include a transparent material. The second substrate 120 may include a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS). This is only an example, but the embodiment is not limited thereto.

In addition, the second substrate 120 may be a flexible substrate having flexible characteristics.

Further, the second substrate 120 may be a curved or bended substrate. That is, the optical path control member including the second substrate 120 may also be formed to have flexible, curved, or bent characteristics. Accordingly, the optical path control member according to the embodiment may be changed to various designs.

The second substrate 120 may also extend in the first direction 1A, the second direction 2A, and the third direction 3A in the same manner as the first substrate 110 described above.

In detail, the second substrate 120 may include the first direction 1A corresponding to a length or width direction of the second substrate 120, the second direction 2A extending in a direction different from the first direction 1A and corresponding to the length or width direction of the second substrate 120, and the third direction 3A extending in the direction different from the first direction 1A and the second direction 2A and corresponding to the thickness direction of the second substrate 120.

For example, the first direction 1A may be defined as the length direction of the second substrate 120, the second direction 2A may be defined as the width direction of the second substrate 120 perpendicular to the first direction 1A, and the third direction 3A may be defined as the thickness direction of the second substrate 120.

Alternatively, the first direction 1A may be defined as the width direction of the second substrate 120, the second direction 2A may be defined as the length direction of the second substrate 120 perpendicular to the first direction 1A, and the third direction 3A may be defined as the thickness direction of the second substrate 120.

Hereinafter, for convenience of description, the first direction 1A will be described as the length direction of the second substrate 120, the second direction 2A the second direction 2A will be described as the width direction of the second substrate 120, and the third directions 3A will be described as the thickness direction of the second substrate 120.

The second electrode 220 may be disposed on one surface of the second substrate 120. In detail, the second electrode 220 may be disposed on a lower surface of the second substrate 120. That is, the second electrode 220 may be disposed on one surface of the second substrate 120 in which the second substrate 120 and the first substrate 110 face each other. That is, the second electrode 220 may be disposed to face the first electrode 210 on the first substrate 110. That is, the second electrode 220 may be disposed between the first electrode 210 and the second substrate 120.

The second electrode 220 may include a material the same as or similar to that of the first substrate 110 described above.

The second electrode 220 may include a transparent conductive material. For example, the second electrode 220 may include a conductive material having a light transmittance of about 80% or more. As an example, the second electrode 220 may include a metal oxide such as indium tin oxide, indium zinc oxide, copper oxide, tin oxide, zinc oxide, titanium oxide, etc.

The second electrode 220 may have a thickness of about 10 nm to about 300 nm.

Alternatively, the second electrode 220 may include various metals to realize low resistance. For example, the second electrode 220 may include at least one metal of chromium (Cr), nickel (Ni), copper (Cu), aluminum (Al), silver (Ag), molybdenum (Mo), Gold (Au), titanium (Ti), and alloys thereof.

The second electrode 220 may be disposed on the entire surface of one surface of the second substrate 120. However, the embodiment is not limited thereto, and the second electrode 220 may be formed of a plurality of pattern electrodes having a uniform pattern such as a mesh or stripe shape.

For example, the second electrode 220 may include a plurality of conductive patterns. In detail, the second electrode 220 may include a plurality of mesh lines crossing each other and a plurality of mesh openings formed by the mesh lines.

Accordingly, even though the second electrode 220 includes a metal, the second electrode 220 is not visually recognized from the outside, so that visibility may be improved. In addition, the light transmittance is increased by the openings, so that the brightness of the optical path control member according to the embodiment may be improved.

A cutting portion may be formed on the second substrate 120. In detail, the second substrate 120 may include a plurality of cutting portions.

Referring to FIG. 1, the second substrate 120 may include a 1-1 cutting portion h1-1, a 1-2 cutting portion h1-2, a 2-1 cutting portion h2-1, and a 2-2 cutting portion h2-2.

The 1-1 cutting portion h1-1, the 1-2 cutting portion h1-2, the 2-1 cutting portion h2-1, and the 2-2 cutting portion h2-2 may be formed in a hole shape or a groove shape.

For example, at least one of the 1-1 cutting portion h1-1, the 1-2 cutting portion h1-2, the 2-1 cutting portion h2-1, and the 2-2 cutting portion h2-2 may be formed in a groove shape in which one end that is an upper surface of the second substrate is opened and the other end that is a lower surface of the optical conversion unit is closed. In addition, at least one of the 1-1 cutting portion h1-1, the 1-2 cutting portion h1-2, the 2-1 cutting portion h2-1, and the 2-2 cutting portion h2-2 may be formed in a groove shape in which one end that is the upper surface of the second substrate is opened, the other end that is the lower surface of the optical conversion unit is opened or closed, and any one of both side portions that is perpendicular to a length direction of the cutting portion is opened.

In detail, the 1-1 cutting portion h1-1, the 2-1 cutting portion h2-1, and the 2-2 cutting portion h2-2 may be disposed inside the second substrate 120. Accordingly, the 1-1 cutting portion h1-1, the 2-1 cutting portion h2-1, and the 2-2 cutting portion h2-2 may be formed in a groove shape in which one end that is the upper surface of the second substrate is opened and the other end that is the lower surface of the optical conversion unit is closed.

In addition, the 1-2 cutting portions h1-2 may be disposed on the upper surface and one side surface of the second substrate. Accordingly, the 1-2 cutting portions h1-2 may be formed in a groove shape in which one end that is the upper surface of the second substrate is opened, the other end that is the lower surface of the optical conversion unit is closed, and one side portion of the cutting portion that is perpendicular to the length direction of the cutting portion is opened.

At least one of the 1-1 cutting portion h1-1, the 1-2 cutting portion h1-2, the 2-1 cutting portion h2-1, and the 2-2 cutting portion h2-2 may be formed in a shape in which a long width and/or a short width are narrowed while extending from the second substrate 120 toward the first substrate 110.

The 1-1 cutting portion h1-1 and the 1-2 cutting portion h1-2 may be disposed to face each other. In detail, the 1-1 cutting portion h1-1 and the 1-2 cutting portion h1-2 may extend in the first direction 1A of the second substrate 120, and the 1-1 cutting portion h1-1 and the 1-2 cutting portion h1-2 may be disposed to face each other. That is, the 1-1 cutting portion h1-1 and the 1-2 cutting portion h1-2 may extend in the length direction of the second substrate 120, and the 1-1 cutting portion h1-1 and the 1-2 cutting portions h1-2 may be disposed to face each other.

The 1-1 cutting portion h1-1 and the 1-2 cutting portion h1-2 may have the same shape and area. Alternatively, the 1-1 cutting portion h1-1 and the 1-2 cutting portion h1-2 may have different shapes and/or areas.

At least one of the 1-1 cutting portion h1-1 and the 1-2 cutting portion h1-2 may be disposed to be spaced apart from or in contact with both ends of the second substrate 120.

The 2-1 cutting portion h2-1 and the 2-2 cutting portion h2-2 may be disposed to face each other. In detail, the 2-1 cutting portion h2-1 and the 2-2 cutting portion h2-2 may extend in the second direction 2A of the second substrate 120, and the 2-1 cutting portion h2-1 and the 2-2 cutting portion h2-2 may be disposed to face each other. That is, the 2-1 cutting portion h2-1 and the 2-2 cutting portion h2-2 may extend in the width direction of the second substrate 120, and the 2-1 cutting portion h2-1 and the 2-2 cutting portion h2-2 may be disposed to face each other.

The 2-1 cutting portion h2-1 and the 2-2 cutting portion h2-2 may have the same shape and area. Alternatively, the 2-1 cutting portion h2-1 and the 2-2 cutting portion h2-2 may have different shapes and/or areas.

At least one of the 2-1 cutting portion h2-1 and the 2-2 cutting portion h2-2 may be disposed to be spaced apart from or in contact with both ends of the second substrate 120.

Accordingly, the 1-1 cutting portion h1-1, the 1-2 cutting portion h1-2, the 2-1 cutting portion h2-1, and the 2-2 cutting portion h2-2 may be disposed to extend along an edge of the second substrate 120.

At least two of the 1-1 cutting portion h1-1, the 1-2 cutting portion h1-2, the 2-1 cutting portion h2-1, and the 2-2 cutting portion h2-2 may be connected to each other. In addition, at least two of the 1-1 cutting portion h1-1, the 1-2 cutting portion h1-2, the 2-1 cutting portion h2-1, and the 2-2 cutting portion h2-2 may be disposed to be spaced apart from each other.

For example, referring to FIG. 1, the 1-1 cutting portion h1-1 may be connected to the 2-1 cutting portion h2-1 and the 2-2 cutting portion h2-2, the 1-2 cutting portion h1-2 may be connected to the 2-1 cutting portion h2-1, the 2-1 cutting portion h2-1 may be connected to the 1-1 cutting portion h1-1 and the 1-2 cutting portion h1-2, and the 2-2 cutting portion h2-2 may be connected to the 1-1 cutting portion h1-1. Accordingly, the 1-2 cutting portion h1-2 and the 2-2 cutting portion h2-2 may be disposed to be spaced apart from each other.

Accordingly, an open region OA formed between the 1-2 cutting portion h1-2 and the 2-2 cutting portion h2-2 may be formed in the second substrate 120.

A current and a voltage applied from an electrode connection portion 700 of a second connection region CA2 by the open region OA may be transmitted in a direction of the accommodating portion 320 of the optical conversion unit 300 through the second electrode 220.

Meanwhile, at least one of the 1-1 cutting portion h1-1, the 1-2 cutting portion h1-2, the 2-1 cutting portion h2-1, and the 2-2 cutting portion h2-2 may be formed in the second substrate 120. That is, all of the 1-1 cutting portion h1-1, the 1-2 cutting portion h1-2, the 2-1 cutting portion h2-1, and the 2-2 cutting portions h2-2 may be formed in the second substrate 120, or some of the 1-1 cutting portion h1-1, the 1-2 cutting portion h1-2, and the 2-1 cutting portion 2-1, and the 2-2 cutting portion h2-2 may be omitted, and only at least one may be formed. The number of the cutting portions may vary depending on a manufacturing process of the optical path control member.

The 1-1 cutting portion h1-1, the 1-2 cutting portion h1-2, the 2-1 cutting portion h2-1, and the 2-2 cutting portion h2-2 may be formed through the second substrate 120. In addition, the 1-1 cutting portion h1-1, the 1-2 cutting portion h1-2, the 2-1 cutting portion h2-1, and the 2-2 cutting portion h2-2 may be formed to pass through at least one of the second substrate 120, the optical conversion unit 300, and the second electrode 220.

In addition, the 1-1 cutting portion h1-1, the 1-2 cutting portion h1-2, the 2-1 cutting portion h2-1, and the 2-2 cutting portion h2-2 may have the same penetration depth. Alternatively, at least one of the 1-1 cutting portion h1-1, the 1-2 cutting portion h1-2, the 2-1 cutting portion h2-1, and the 2-2 cutting portion h2-2 may have a different depth from other cutting portions.

The penetration depth of the 1-1 cutting portion h1-1, the 1-2 cutting portion h1-2, the 2-1 cutting portion h2-1, and the 2-2 cutting portion h2-2 will be described in detail below.

In addition, a sealing material may be disposed in the 1-1 cutting portion h1-1, the 1-2 cutting portion h1-2, the 2-1 cutting portion h2-1, and the 2-2 cutting portion h2-2. Accordingly, the sealing material may be disposed inside the 1-1 cutting portion h1-1, the 1-2 cutting portion h1-2, the 2-1 cutting portion h2-1, and the 2-2 cutting portion h2-2 to form a sealing portion 500.

That is, a first sealing portion 510 may be disposed on the 1-1 cutting portion h1-1 and the 1-2 cutting portion h1-2, and a second sealing portion 520 may be disposed on the 2-1 cutting portion h2-1 and the 2-2 cutting portion h2-2.

That is, a 1-1 sealing portion may be disposed on the 1-1 cutting portion h1-1, a 1-2 sealing portion may be disposed on the 1-2 cutting portion h1-2, a 2-1 sealing portion may be disposed on the 2-1 cutting portion h2-1, and a 2-2 sealing portion may be disposed on the 2-2 cutting portion h2-2.

Meanwhile, in order to minimize a bezel region of the optical path control member, in at least one of the 1-1 cutting portion h1-1, the 1-2 cutting portion h1-2, and the 2-1 cutting portion h2-1, and the 2-2 cutting portion h2-2, a part of the cutting portion may be the outermost surface of the optical path control member by removing an entire or a portion of at least one outer surface of the cutting portion and from an outer surface of the cutting portion to an outer surface of the substrate.

For example, since an open region is formed by removing from the outer surface of the cutting portion to the outer surface of the second substrate, the outermost portion of the optical path controlling member in the open region may be a part of the cutting portion, that is, the sealing portion may be the outermost surface of the optical path controlling member. Accordingly, at least one of the first sealing portion 510 and the second sealing portion 520 may be the outermost surface of the optical path control member.

The sealing portion 500 disposed inside the cutting portions will be described in detail below.

The first substrate 110 and the second substrate 120 may have the same or different sizes.

In detail, a first length extending in the first direction 1A of the first substrate 110 may have a size the same as or similar to a second length extending in the first direction 1A of the second substrate 120.

For example, the first length and the second length may have a size of 300 mm to 400 mm.

In addition, a first width extending in the second direction 2A of the first substrate 110 may have a size the same as or similar to a second width extending in the second direction of the second substrate 120.

For example, the first width and the second width may have a size of 150 mm to 200 mm.

In addition, a first thickness extending in the third direction 3A of the first substrate 110 may have a size the same as or similar to a second thickness extending in the third direction of the second substrate 120.

For example, the first thickness and the second thickness may have a size of 1 mm or less.

In addition, the first substrate 110 and the second substrate 120 may have different areas.

Figure 2:
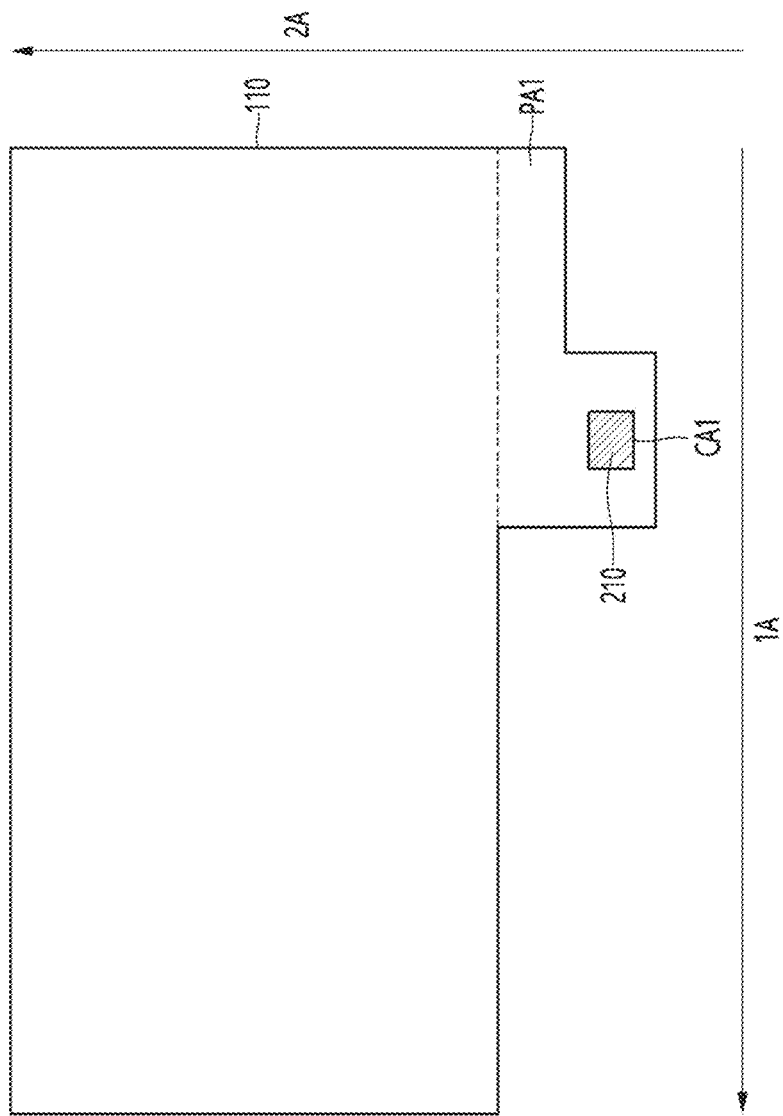
FIG. 2 is a top view of a first substrate of the optical path control member according to the first embodiment.
Figure 3:
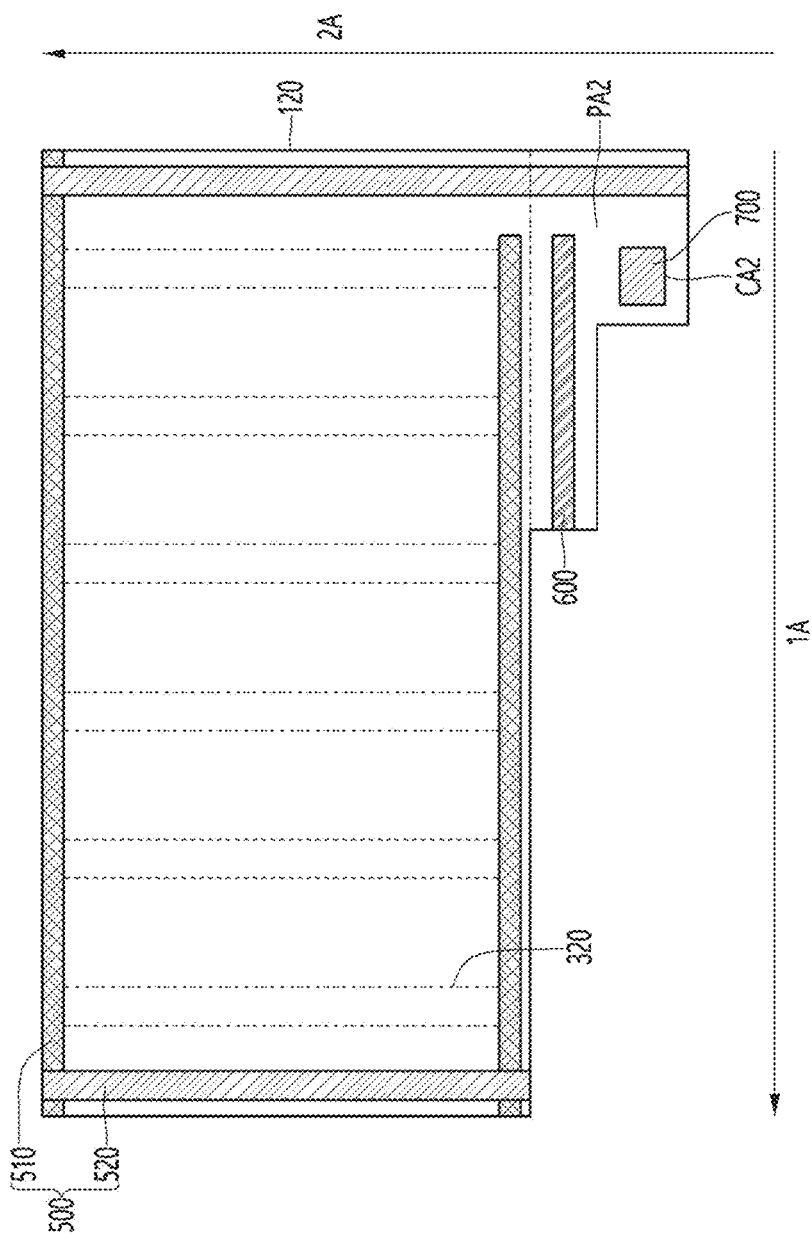
FIG. 3 is a top view of a second substrate of the optical path control member according to the first embodiment.

In detail, the first substrate 110 and the second substrate 120 may include a protrusion. Referring to FIGS. 2 and 3, the first substrate 110 may include a first protrusion PA1, and the second substrate 120 may include a second protrusion PA2. In detail, the first substrate 110 and the second substrate 120 may include the first protrusion PA1 and the second protrusion PA2 that are disposed to be misaligned from each other, respectively.

That is, the first protrusion PA1 and the second protrusion PA2 may be disposed so as not to overlap each other in the third direction 3A.

Alternatively, the embodiment is not limited thereto, and the first protrusion PA1 and the second protrusion PA2 may include an overlapping region overlapping each other and a non-overlapping region not overlapping each other. That is, the first protrusion PA1 and the second protrusion PA2 may include the overlapping region overlapping each other and the non-overlapping region not overlapping each other in the third direction.

In this case, the first protrusion PA1 and the second protrusion PA2 may have different areas. That is, the first substrate 110 and the second substrate 120 may have different sizes by a difference in size of the protrusions.

A connection region connected to an external printed circuit board or a flexible printed circuit board may be formed in the first protrusion PA1 of the first substrate 110 and the second protrusion PA2 of the second substrate 120, respectively.

In detail, a first connection region CA1 may be disposed on the first protrusion PA1, and a second connection region CA2 may be disposed on the second protrusion PA2. When the first protrusion PA1 and the second protrusion PA2 are disposed at positions misaligned from each other, the first connection region CA1 and the second connection region CA2 may be disposed so as not to overlap in the third direction 3A.

A conductive material may be exposed on upper surfaces of the first connection region CA1 and the second connection region CA2, respectively, and the optical path control member may be electrically connected to the external printed circuit board or the flexible printed circuit board through the first connection region CA1 and the second connection region CA2.

For example, a pad portion may be disposed on the first connection region CA1 and the second connection region CA2, and a conductive adhesive including at least one of an anisotropic conductive film (ACF) and anisotropic conductive pastes (ACP) may be disposed between the pad portion and the printed circuit board or the flexible printed circuit board to connect the optical path control member.

Alternatively, the conductive adhesive including at least one of an anisotropic conductive film (ACF) and anisotropic conductive pastes (ACP) may be disposed between the first connection region CA1 and the second connection region CA2 and the printed circuit board or the flexible printed circuit board to direct connect the optical path control member without the pad portion.

The conductive material constituting the first connection region CA1 and the second connection region CA2 will be described in detail below.

The optical conversion unit 300 may be disposed between the first substrate 110 and the second substrate 120. In detail, the optical conversion unit 300 may be disposed between the first electrode 210 and the second electrode 220.

An adhesive layer or a buffer layer may be disposed between at least one of between the optical conversion unit 300 and the first substrate 110 or between the optical conversion unit 300 and the second substrate 120, and the first substrate 110, the second substrate 120, and the optical conversion unit 300 may be adhered to each other by the adhesive layer and/or the buffer layer.

For example, an adhesive layer 410 may be disposed between the first electrode 210 and the optical conversion unit 300, thereby adhering the first substrate 110 and the optical conversion unit 300.

In addition, a buffer layer 420 may be disposed between the second electrode 220 and the optical conversion unit 300, thereby improving adhesion between the second electrode 220 including different materials and the optical conversion unit 300.

The above-described cutting portions may be formed to pass through an entire or a portion of the buffer layer 420 and the optical conversion unit 300. That is, the cutting portion may pass through the second substrate 120, the second electrode 220, and the buffer layer 420 in the third direction and may pass through an entire or a portion of the optical conversion unit 300.

The optical conversion unit 300 may include a plurality of partition wall portions and accommodating portions. An optical conversion material 330 including optical conversion particles that move by application of a voltage and a dispersion liquid for dispersing the optical conversion particles may be disposed in the accommodating portion 320, and light transmission characteristics of the optical path control member may be changed by the optical conversion particles.

In addition, the sealing portion 500 for sealing the optical conversion material 330 and the dam portion 600 for easily injecting the optical conversion material 330 may be disposed in the accommodating portion 320.

Figure 4:
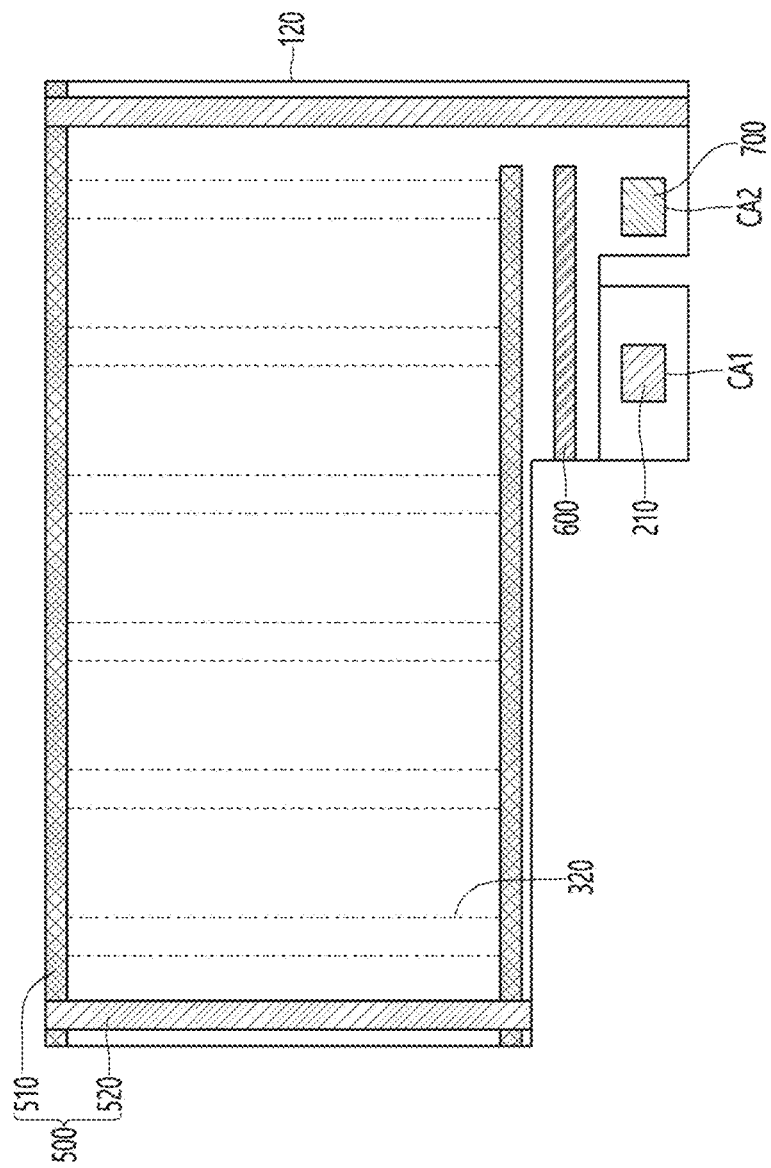
FIG. 4 is a top view of the second substrate in which the first and second substrates of the optical path control member are laminated according to the first embodiment.

Referring to FIGS. 3 and 4, the accommodating portion 320 may be disposed to extend in one direction. In detail, the accommodating portion 320 may extend in a direction corresponding to the second direction 2A of the first substrate 110 or the second substrate 120. That is, the accommodating portion 320 may be disposed to extend in a direction corresponding to the width direction of the first substrate 110 or the second substrate 120.

Accordingly, both ends of the accommodating portion 320 of the optical path control member according to the first embodiment may be disposed to face both ends of the first substrate 110 or the second substrate 120, respectively. That is, one end of the accommodating portion 320 may be disposed to face one end of the first substrate 110 or the second substrate 120 in the second direction 2A. The other end of the accommodating portion 320 may be disposed to face the other end of the first substrate 110 or the second substrate 120 in the second direction 2A.

Accordingly, both ends of the accommodating portion 320 may be disposed in contact with the first sealing portion 510 disposed to face in the second direction 2A and may be disposed to be spaced apart from the second sealing portion 520.

Meanwhile, although not shown in the drawings, the accommodating portion 320 may be disposed to extend up to the second protrusion, and the accommodating portion 320 on the second protrusion may not include the optical conversion material or may include less the optical conversion material than other accommodating portions.

Figure 5:
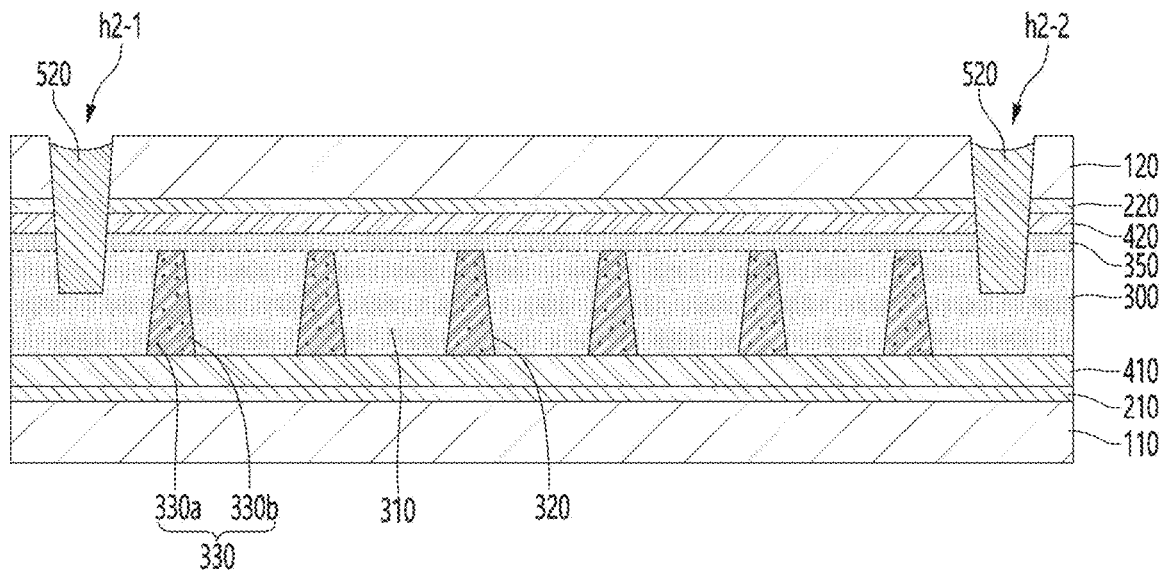
FIGS. 5 and 6 are cross-sectional views taken along line A-A' in FIG. 1.
Figure 6:
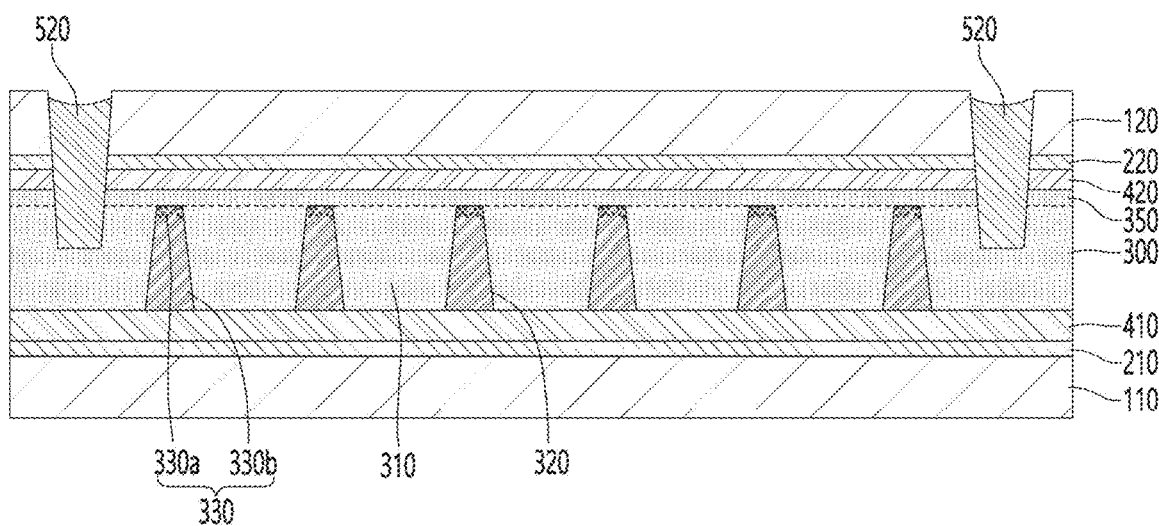

FIGS. 5 and 6 are cross-sectional views taken along line A-A' in FIG. 1.

Referring to FIGS. 5 and 6, the optical conversion unit 300 may the partition wall portion 310 and the accommodating portion 320.

The partition wall portion 310 may be defined as a partition wall portion dividing the accommodating portion. That is, the partition wall portion 310 may transmit light as a barrier region dividing a plurality of accommodating portions. That is, light emitted in the direction of the first substrate 110 or the second substrate 120 may pass through the partition wall portion.

The partition wall portion 310 and the accommodating portion 320 may be disposed to extend in the second direction 2A of the first substrate 110 and the second substrate 120. That is, the partition wall portion 310 and the accommodating portion 320 may be disposed to extend in the width direction or the length direction of the first substrate 110 and the second substrate 120.

The partition wall portion 310 and the accommodating portion 320 may be disposed to have different widths. For example, a width of the partition wall portion 310 may be greater than that of the accommodating portion 320.

In addition, the accommodating portion 320 may be formed in a shape extending from the first electrode 210 toward the second electrode 220 and narrowing in width.

The partition wall portion 310 and the accommodating portion 320 may be alternately disposed with each other. In detail, the partition wall portion 310 and the accommodating portion 320 may be alternately disposed with each other. That is, each of the partition wall portions 310 may be disposed between the accommodating portions 320 adjacent to each other, and each of the accommodating portions 320 may be disposed between the partition wall portions 310 adjacent to each other.

The partition wall portion 310 may include a transparent material. The partition wall portion 310 may include a material that may transmit light.

The partition wall portion 310 may include a resin material. For example, the partition wall portion 310 may include a photo-curable resin material. As an example, the partition wall portion 310 may include a UV resin or a transparent photoresist resin. Alternatively, the partition wall portion 310 may include urethane resin or acrylic resin.

The accommodating portion 320 may be formed to partially penetrate the optical conversion unit 300. Accordingly, the accommodating portion 320 may be disposed in contact with the adhesive layer 410 and may be disposed to be spaced apart from the buffer layer 420. Accordingly, a base portion 350 may be formed between the accommodating portion 320 and the buffer layer 420.

An optical conversion material 330 including optical conversion particles 330a and a dispersion liquid 330b in which the optical conversion particles 330a are dispersed may be disposed in the accommodating portion 320.

The dispersion liquid 330b may be a material for dispersing the optical conversion particles 330a. The dispersion liquid 330b may include a transparent material. The dispersion liquid 330b may include a non-polar solvent. In addition, the dispersion liquid 330b may include a material capable of transmitting light. For example, the dispersion liquid 330b may include at least one of a halocarbon-based oil, a paraffin-based oil, and isopropyl alcohol.

The optical conversion particles 330a may be disposed to be dispersed in the dispersion liquid 330b. In detail, the plurality of optical conversion particles 330a may be disposed to be spaced apart from each other in the dispersion liquid 330b.

The optical conversion particles 330a may include a material capable of absorbing light. That is, the optical conversion particles 330a may be light absorbing particles. The optical conversion particles 330a may have a color. For example, the optical conversion particles 330a may have a black-based color. As an example, the optical conversion particles 330a may include carbon black.

The optical conversion particles 330a may have a polarity by charging a surface thereof. For example, the surface of the optical conversion particles 330a may be charged with a negative (−) charge. Accordingly, according to the application of the voltage, the optical conversion particles 330a may move toward the first electrode 210 or the second electrode 220.

The light transmittance of the accommodating portion 320 may be changed by the optical conversion particles 330a. In detail, the accommodating portion 320 may be converted into the light blocking part and the light transmitting part by changing the light transmittance due to the movement of the optical conversion particles 330a. That is, the accommodating portion 320 may change the transmittance of light passing through the accommodating portion 320 by dispersion and aggregation of the optical conversion particles 330a disposed inside the dispersion liquid 330b.

For example, the optical path control member according to the embodiment may be switched from a first mode to a second mode or from the second mode to the first mode by a voltage applied to the first electrode 210 and the second electrode 220.

In detail, in the optical path control member according to the first embodiment, the accommodating portion 320 becomes the light blocking part in the first mode, and light of a specific angle may be blocked by the accommodating portion 320. That is, a viewing angle of the user viewing from the outside is narrowed, so that the optical path control member may be driven in a privacy mode.

In addition, in the optical path control member according to the first embodiment, the accommodating portion 320 becomes the light transmitting part in the second mode, and in the optical path control member according to the first embodiment, light may be transmitted through both the partition wall portion 310 and the accommodating portion 320. That is, the viewing angle of the user viewing from the outside may be widened, so that the optical path control member may be driven in a public mode.

Switching from the first mode to the second mode, that is, the conversion of the accommodating portion 320 from the light blocking part to the light transmitting part may be realized by movement of the optical conversion particles 330a of the accommodating portion 320. That is, the optical conversion particles 330a may have a charge on the surface thereof and may move toward the first electrode or the second electrode according to the application of a voltage according to characteristics of the charge. That is, the optical conversion particles 330a may be electrophoretic particles.

For example, when a voltage is not applied to the optical path control member from the outside, the optical conversion particles 330a of the accommodating portion 320 are uniformly dispersed in the dispersion liquid 330b, and the accommodating portion 320 may block light by the optical conversion particles. Accordingly, in the first mode, the accommodating portion 320 may be driven as the light blocking part.

In addition, when a voltage is applied to the optical path control member from the outside, the optical conversion particles 330a may move. For example, the optical conversion particles 330a may move toward one end or the other end of the accommodating portion 320 by a voltage transmitted through the first electrode 210 and the second electrode 220. That is, the optical conversion particles 330a may move from the accommodating portion 320 toward the first electrode 210 or the second electrode 220.

For example, when a voltage is applied to the first electrode 210 and/or the second electrode 220, an electric field is formed between the first electrode 210 and the second electrode 220, and the optical conversion particles 330a charged with the negative charge may move toward a positive electrode of the first electrode 210 and the second electrode 220 using the dispersion liquid 330b as a medium.

As an example, in the initial mode or when the voltage is not applied to the first electrode 210 and/or the second electrode 220, as shown in FIG. 5, the optical conversion particles 330a may be uniformly dispersed in the dispersion liquid 330b, and the accommodating portion 320 may be driven as the light blocking part.

Figure 8:
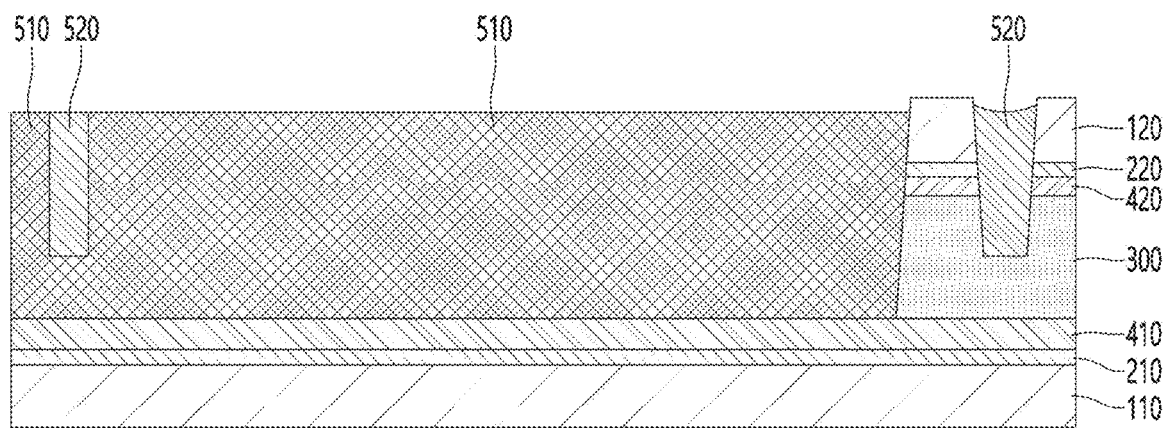
FIG. 8 is a cross-sectional view taken along line C-C' in FIG. 1.

In addition, when the voltage is applied to the first electrode 210 and/or the second electrode 220, as shown in FIG. 8, the optical conversion particles 330a may move toward the second electrode 220 in the dispersion liquid 330b. That is, the optical conversion particles 330a move in one direction, and the accommodating portion 320 may be driven as the light transmitting part.

Accordingly, the optical path control member according to the embodiment may be driven in two modes according to a user's surrounding environment. That is, when the user requires light transmission only at a specific viewing angle, the accommodating portion is driven as the light blocking part, or in an environment in which the user requires high brightness, a voltage may be applied to drive the accommodating portion as the light transmitting part.

Therefore, since the optical path control member according to the embodiment may be implemented in two modes according to the user's requirement, the optical path control member may be applied regardless of the user's environment.

The second sealing portion 520 may be disposed on the outermost side of the optical path control member. In detail, the second sealing portion 520 extending in the second direction 2A and facing each other may be disposed on the outermost side of the optical path control member in the first direction 1A.

The second sealing portion 520 may be disposed inside the cutting portions described above. In detail, the second sealing portion 520 may be disposed inside the 2-1 cutting portion h2-1 and the 2-2 cutting portion h2-2.

That is, the 2-1 cutting portion h2-1 and the 2-2 cutting portion h2-2 may be formed to sequentially pass through the second substrate 120, the second electrode 220, the buffer layer 420, and a portion or an entire of the optical conversion unit 300 including the base portion 350 and the partition wall portion 310, and the second sealing portion 520 may be formed by disposing the sealing material inside the 2-1 cutting portion h2-1 and the 2-2 cutting portion h2-2.

That is, one surface of the partition wall portion 310 or the adhesive layer 410 may be exposed through the 2-1 cutting portion h2-1 and the 2-2 cutting portion h2-1, and the second sealing portion 520 may be disposed in contact with the partition wall portion 310 or the adhesive layer 410.

The second sealing portion 520 may be disposed in contact with a side surface of the second substrate 120. In addition, the second sealing portion 520 may be disposed in contact with a side surface of the second electrode 220. In addition, the second sealing portion 520 may be disposed in contact with a side surface of the buffer layer 420. In addition, the second sealing portion 520 may be disposed in contact with a side surface of the base portion 350. In addition, the second sealing portion 520 may be disposed in contact with a side surface of the partition wall portion 310.

The second sealing portion 520 may be disposed on a side surface of the optical path control member, that is, a side surface in the second direction 2A, to inhibit impurities that may penetrate from the outside from penetrating into the optical conversion unit 300.

The second sealing portion 520 may be disposed to completely fill the 2-1 cutting portion h2-1 and the 2-2 cutting portion h2-2 or may be disposed to have a height lower than depths of the 2-1 cutting portion h2-1 and the 2-2 cutting portion h2-2. Accordingly, as shown in FIGS. 5 and 6, an upper surface of the second sealing portion 520 may be disposed to have a height lower than an upper surface of the second substrate 120. That is, a step may be formed between the upper surface of the second sealing portion 520 and the upper surface of the second substrate 120. In addition, the upper surface of the second sealing portion 520 may be formed in a concave shape.

Meanwhile, in FIGS. 5 and 6, it is illustrated that the 2-1 cutting portion h2-1 and the 2-2 cutting portion h2-2 are formed up to a depth at which one surface of the partition wall portion of the optical conversion unit 300 is exposed, but the embodiment is not limited thereto.

That is, the depths of the 2-1 cutting portion h2-1 and the 2-2 cutting portion h2-2 may vary through a process method, a process time, and the like for forming the 2-1 cutting portion h2-1 and the 2-2 cutting portion h2-2. h2-2.

For example, at least one of the 2-1 cutting portion h2-1 and the 2-2 cutting portion h2-2 may be formed up to a depth partially passing through the optical conversion unit 300, and accordingly, one surface of the base portion, the partition wall portion 310 or the accommodating portion 320 may be exposed by the 2-1 cutting portion h2-1 and the 2-2 cutting portion h2-2.

Accordingly, the second sealing portion 520 may be disposed to be spaced apart from the adhesive layer 410.

Alternatively, at least one of the 2-1 cutting portion h2-1 and the 2-2 cutting portion h2-2 may be formed up to a depth partially passing through the optical conversion unit 300, and accordingly, one surface of the adhesive layer 410 may be exposed by the 2-1 cutting portion h2-1 and the 2-2 cutting portion h2-2.

Alternatively, at least one of the 2-1 cutting portion h2-1 and the 2-2 cutting portion h2-2 may be formed up to a depth partially passing through the adhesive layer 410, and accordingly, one surface of the adhesive layer 410 may be exposed by the 2-1 cutting portion h2-1 and the 2-2 cutting portion h2-2.

Alternatively, at least one of the 2-1 cutting portion h2-1 and the 2-2 cutting portion h2-2 may be formed up to a depth partially passing through the first electrode 210, and accordingly, one surface of the first electrode 210 may be exposed by the 2-1 cutting portion h2-1 and the 2-2 cutting portion h2-2.

Alternatively, at least one of the 2-1 cutting portion h2-1 and the 2-2 cutting portion h2-2 may be formed up to a depth partially passing through the first substrate 110, and accordingly, one surface of the first substrate 110 may be exposed by the 2-1 cutting portion h2-1 and the 2-2 cutting portion h2-2.

Figure 7:
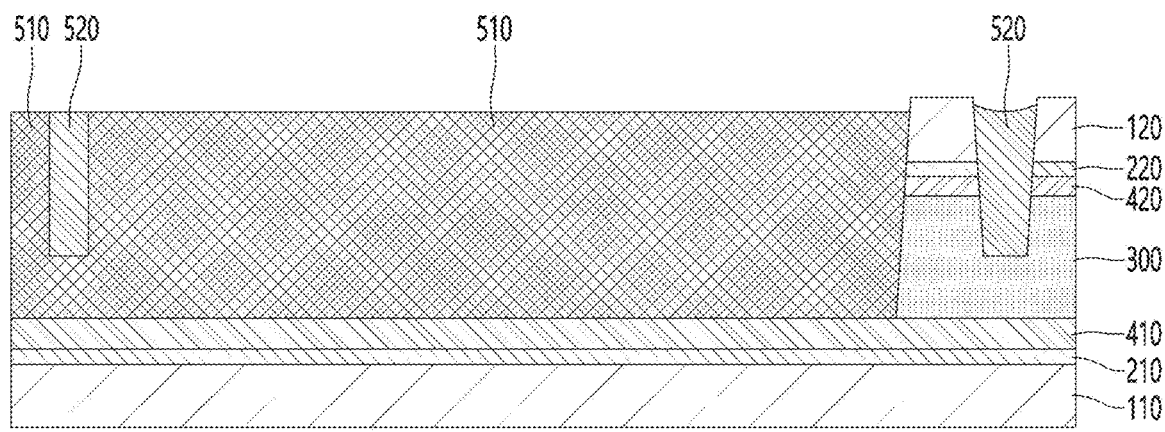
FIG. 7 is a cross-sectional view taken along line B-B' in FIG. 1.

FIG. 7 is a cross-sectional view taken along line B-B' in FIG. 1. That is, FIG. 7 is a cross-sectional view taken both ends of one of the first sealing portions 510.

Referring to FIG. 7, the first sealing portion 510 may be disposed inside the 1-1 cutting portion h1-1. The first sealing portion 510 may be disposed in contact with a side surface of the second substrate 120. In addition, the first sealing portion 510 may be disposed in contact with a side surface of the second electrode 220. In addition, the first sealing portion 510 may be disposed in contact with a side surface of the buffer layer 420. In addition, the first sealing portion 510 may be disposed in contact with a side surface of the base portion 350. In addition, the first sealing portion 510 may be disposed in contact with a side surface of the partition wall portion 310.

In addition, the second sealing portion 520 may be disposed on the first sealing portion 510 in a region where the 1-1 cutting portion, the 2-1 cutting portion, and the 2-2 cutting portion overlap. That is, since the second sealing portion 520 is formed after the first sealing portion 510 is formed, the second sealing portion 520 may be disposed on the first sealing portion 510 in a region where the first sealing portion 510 and the second sealing portion 520 overlap.

For example, the 1-1 cutting portion h1-1 may be formed to pass through all of the second substrate 120, the second electrode 220, the buffer layer 420, and the optical conversion unit 300, and the first sealing portion 510 may be disposed in contact with the side surface of the second substrate 120, the side surface of the second electrode 220, the side surface of the buffer layer 420, the side surface of the base portion 350, and the side surface of the partition wall portion 310. The 1-1 cutting portion h1-1 may be disposed in contact with one end of the second substrate 120 in the first direction 1A and both ends of the second direction 2A.

That is, the 1-1 cutting portion h1-1 may be formed by removing one outer surface of the second substrate 120 in the first direction 1A and both outer surfaces of the second substrate 120 in the second direction 2A. Accordingly, in the one outer surface of the second substrate 120 in the first direction 1A, a portion of the 1-1 cutting portion h1-1 may be the outermost surface of the second substrate 120, and in a portion where the 1-1 cutting portion h1-1 1 among both outer surfaces of the second substrate 120 in the second direction 2A is formed, a portion of the 1-1 cutting portion h1-1 may be the outermost surface of the second substrate 120.

The 1-1 cutting portion h1-1 may be formed to sequentially pass through the second substrate 120, the second electrode 220, the buffer layer 420, and the optical conversion unit 300 including the base portion 350 and the partition wall portion 310. Subsequently, the first sealing portion 510 may be formed by disposing the sealing material inside the 1-1 cutting portion h1-1.

The sealing material of the first sealing portion 510 and the second sealing portion 520 may include the same material. Alternatively, the sealing material of the first sealing portion 510 and the second sealing portion 520 may include different materials.

As an example, a sealing material of at least one of the first sealing portion 510 and the second sealing portion 520 may include a photocurable material. In addition, a sealing material of at least one of the first sealing portion 510 and the second sealing portion 520 may include a material having low reactivity with the optical conversion material. For example, a sealing material of at least one of the first sealing portion 510 and the second sealing portion 520 may include polyurethane acrylate.

The 1-1 cutting portion h1-1 may be formed to sequentially pass through the second substrate 120, the second electrode 220, the buffer layer 420, and the optical conversion unit 300 including the base portion 350 and the partition wall portion 310, and thus one surface of the adhesive layer 410 may be exposed through the 1-1 cutting portion h1-1.

Accordingly, the first sealing portion 510 disposed inside the 1-1 cutting portion h1-1 may be disposed in contact with the adhesive layer 410 inside the 1-1 cutting portion h1-1.

The first sealing portion 520 may be disposed on the side surface of the optical path control member, that is, a side surface in the first direction 1A, to seal the accommodating portion 320 of the optical conversion unit 300. That is, while inhibiting the optical conversion material 330 accommodated in the accommodating portion 320 from flowing out to the outside, impurities that may penetrate from the outside may be inhibited from penetrating into the optical conversion unit 300.

The first sealing portion 510 may be disposed to completely fill the 1-1 cutting portion h1-1 or may be disposed to have a height lower than a depth of the 1-1 cutting portion h1-1. Accordingly, an upper surface of the first sealing portion 510 may be disposed to have a height lower than the upper surface of the second substrate 120. That is, a step may be formed between the upper surface of the first sealing portion 510 and the upper surface of the first substrate 110. In addition, the upper surface of the first sealing portion 510 may be formed in a concave shape.

FIG. 8 is a cross-sectional view taken along line C-C' in FIG. 1. That is, FIG. 8 is a cross-sectional view taken both ends of a sealing portion to which the first sealing portion 510 and the second sealing portion 520 are connected in the first direction.

Referring to FIG. 8, the 1-2 cutting portion h1-2 and the 2-1 cutting portion h2-1 may be connected to each other.

In addition, the 1-2 cutting portion h1-2 may be spaced apart from the 2-2 cutting portion h2-2. That is, one end of the 1-2 cutting portion h1-2 may be spaced apart from the 2-2 cutting portion h2-2.

The 1-2 cutting portion h1-2 and the 2-2 cutting portion h2-2 may be spaced apart from each other, whereby an open region OA formed between the 1-2 cutting portion h1-1 and the 2-2 cutting portion h2-2 may be formed.

The electrode connection portion 700 of the second connection region CA2 disposed on the second protrusion PA2 of the second substrate 120 through the second electrode 220 disposed in the open region OA and the second electrode 220 may be connected without being disconnected. That is, a current and a voltage transmitted through the open region OA may be applied to the optical conversion material 330 inside the accommodating portion 320 disposed between the first sealing portion 510 and the second sealing portion.

Since the 1-2 cutting portion h1-2 and the 2-1 cutting portion h2-1 are connected, the first sealing portion 510 disposed on the 1-2 cutting portion h1-2 and the second sealing portion 520 disposed on the 2-1 cutting portion h2-1 may be disposed to be connected to each other. In addition, since the 1-2 cutting portion h1-2 and the 2-2 cutting portion h2-2 are spaced apart from each other, the first sealing portion disposed on the 1-2 cutting portion h1-2. 510 may be disposed to be spaced apart from the second sealing portion 520 disposed on the 2-2 cutting portion h2-2.

Meanwhile, in the drawing, it is illustrated that the 2-1 cutting portion h2-1 is disposed to be spaced apart from the end of the second substrate 120 in the first direction 1A, that is, the outer surface, but the embodiment is not limited thereto, and the 2-1 cutting portion h2-1 may be formed by removing one outer surface of the second substrate 120 in the first direction 1A like the 1-1 cutting portion h1-1 described above. Accordingly, in the one outer surface of the second substrate 120 in the first direction 1A, a portion of the 2-1 cutting portion h2-1 may be the outermost surface of the second substrate 120.

Meanwhile, the 2-1 cutting portion h2-1 and the 2-2 cutting portion h2-2 may be disposed to have different lengths. In detail, a length of the 2-2 cutting portion h2-2 in the second direction 2A may be greater than a length of the 2-1 cutting portion h2-1 in the second direction 2A.

The 2-2 cutting portion h2-2 may be disposed to extend to the second protrusion PA2 of the second substrate 120, and accordingly, the 2-2 cutting portion h2-2 may be disposed. The length of may be disposed to be greater than that of the second-first cutting portion h2-1.

Accordingly, a length of the second sealing portion 520 disposed inside the 2-1 cutting portion h2-1 and the 2-2 cutting portion h2-2 may also vary. That is, a length of the second sealing portion 520 disposed inside the 2-2 cutting portion h2-2 may be greater than that of the second sealing portion 520 disposed in the 2-1 cutting portion h2-1.

A first sealing portion and a second sealing portion may be disposed inside the 1-1 cutting portion, the 1-2 cutting portion, the 2-1 cutting portion, and the 2-2 cutting portion, respectively.

In addition, the second sealing portion 520 may be disposed on the first sealing portion 510 in a region where the 1-2 cutting portion and the 2-1 cutting portion overlap.

That is, since the second sealing portion 520 is formed after the first sealing portion 510 is formed, the second sealing portion 520 may be disposed on the first sealing portion 510 in a region where the first sealing portion 510 and the second sealing portion 520 overlap. The first sealing portion and the second sealing portion may be disposed to seal an inlet and an outlet of the accommodating portion for accommodating the optical conversion material and may be disposed to extend along a side surface region of the optical conversion unit, that is, a side surface region in the first direction.

Accordingly, it is possible to inhibit the optical conversion material inside the accommodating portion from flowing out to the outside of the optical conversion unit by the first sealing portion, and it is possible to inhibit impurities from penetrating into the optical conversion unit from the outside by the first sealing portion and the second sealing portion, thereby improving the reliability of the optical path control member.

In addition, since the first sealing portion and the second sealing portion are disposed inside the cutting portions formed on the second substrate, as compared with the formation of the first sealing portion and the second sealing portion outside the optical conversion unit, the size of the optical path control member may be reduced, and sealing characteristics of the optical path control member may be improved by inhibiting the sealing portion material from being denatured by an external environment.

Figure 9:
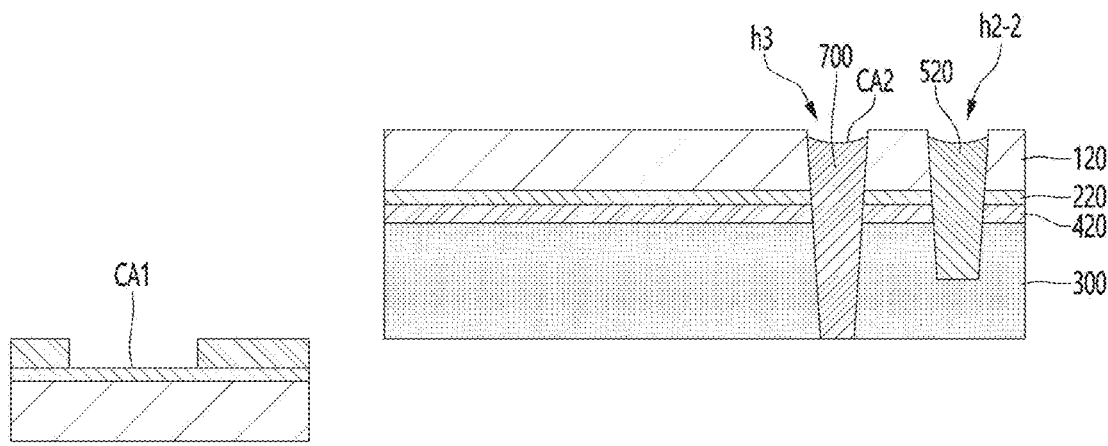
FIG. 9 is a cross-sectional view taken along line D-D' in FIG. 1.

FIG. 9 is a cross-sectional view taken along line D-D' in FIG. 1. That is, FIG. 9 is a cross-sectional view taken along a protrusion region of the first substrate and the second substrate.

Referring to FIG. 9, a first protrusion PA1 of the first substrate 110 and a second protrusion PA2 of the second substrate 120 may be disposed to be spaced apart from each other. That is, the first protrusion PA1 of the first substrate 110 and the second protrusion PA2 of the second substrate 120 may be disposed to be spaced apart from each other in the first direction 1A.

Therefore, the first substrate 110, the first electrode 210, and the adhesive layer 410 may not be disposed under the second protrusion PA2.

Accordingly, the first connection region CA1 disposed on the first protrusion PA1 and the second connection region CA2 disposed on the second protrusion PA2 are physically spaced apart from each other, so that it is possible to inhibit the first connection region CA1 and the second connection region CA2 from being electrically connected to each other through the adhesive layer.

The first connection region CA1 may be disposed on the first protrusion PA1. The first electrode 210 may be exposed in the first connection region CA1. That is, the first electrode 210 on the first substrate 110 may be exposed by partially removing the adhesive layer 410 on the first protrusion PA1, and accordingly, an upper surface of the first electrode 210 may be exposed in the first connection region CA1. That is, the first electrode 210 exposed in the first connection region CA1 may be a first connection electrode that is connected to an external printed circuit board or a flexible printed circuit board.

In addition, the second connection region CA2 may be disposed on the second protrusion PA2. A third cutting portion h3 may be formed in the second connection region CA2. An electrode connection portion 700 including a conductive material may be disposed inside the third cutting portion h3.

The electrode connection portion 700 may include a material different from that of at least one of the first electrode 210 and the second electrode 220. In addition, a light transmittance of the electrode connection portion 700 may be smaller than that of at least one of the first electrode 210 and the second electrode 220.

For example, the electrode connection portion 700 may include a metal. In detail, the electrode connection portion 700 may include a metal paste in which metal particles are dispersed in a binder.

The electrode connection portion 700 may be disposed in contact with a side surface of the second substrate 120. In addition, the electrode connection portion 700 may be disposed in contact with a side surface of the second electrode 220. In addition, the electrode connection portion 700 may be disposed in contact with a side surface of the buffer layer 420. In addition, the electrode connection portion 700 may be disposed in contact with a side surface of the base portion 350. In addition, the electrode connection portion 700 may be disposed in contact with a side surface of the partition wall portion 310.

That is, the electrode connection portion 700 may be disposed in contact with at least one side surface of the second substrate 120, the second electrode 220, the buffer layer 420, the base portion 350, and the partition wall portion 310.

In addition, a protective layer may be additionally disposed on a lower surface of the electrode connection portion. Accordingly, oxidation or denaturation of the electrode connection portion exposed to the outside may be inhibited.

An upper surface of the electrode connection portion 700 may be disposed on the same plane as the upper surface of the second substrate 120 or may be lower. For example, the upper surface of the electrode connection portion 700 may be disposed on the same plane as the upper surface of the second substrate 120. Alternatively, the upper surface of the electrode connection portion 700 may be disposed lower than the upper surface of the second substrate 120.

Accordingly, the upper surface of the electrode connection portion 700 and the upper surface of the second substrate 120 may be formed on the same plane without a step, or may be disposed with a step such that the upper surface of the electrode connection portion 700 is lower.

Accordingly, it is possible to inhibit an overall thickness of the optical path control member from increasing due to a height of the electrode connection portion 700, thereby reducing the overall thickness of the optical path control member.

The electrode connection portion 700 may be electrically connected to the second electrode 220 and may be exposed to the outside of the second substrate 120. That is, the electrode connection portion 700 may be exposed on the second protrusion portion PA2 of the second substrate 120. That is, the upper surface of the electrode connection portion 700 may be exposed in the second connection region CA2.

Accordingly, the electrode connection portion 700 exposed in the second connection region CA2 may be a second connection electrode connected to an external printed circuit board or a flexible printed circuit board.

Accordingly, the first electrode 210 and the second electrode 220 may be respectively connected to the same printed circuit board or flexible printed circuit board through the first connection electrode of the first connection region and the second connection electrode of the second connection region to be electrically connected to each other.

In this case, since the first connection electrode and the second connection electrode are disposed on the same surface, when the first connection electrode and the second connection electrode are connected with one printed circuit board, the first connection electrode and the second connection electrode may be easily connected.

Alternatively, the first electrode 210 and the second electrode 220 may be respectively connected to another printed circuit board or a flexible printed circuit board through the first connection electrode of the first connection region and the second connection electrode of the second connection region to be electrically connected to each other. That is, the first connection electrode may be connected to a first circuit board, and the second connection electrode may be connected to a second circuit board different from the first circuit board.

In the optical path control member according to the first embodiment, the first connection electrode of the first connection region and the second connection electrode of the second connection region may be disposed on a first protrusion and a second protrusion formed on the first and second substrates.

The surfaces of the first and second substrates may not entirely protrude, and the first protrusion and the second protrusion may protrude only by an area in which the first connection region and the second connection electrode may be formed.

Accordingly, the areas of the first protrusion and the second protrusion may be reduced. Therefore, when the optical path control member is coupled to a display panel and applied to a display device, other components of the display device may be disposed in regions that do not correspond to the first protrusion and the second protrusion, thereby reducing a bezel region of the display device.

That is, the optical path control member according to the first embodiment reduces the size of the bezel region where the connection electrode is disposed, thereby reducing the bezel region of the display device to which the optical path control member is applied.

Figure 10:
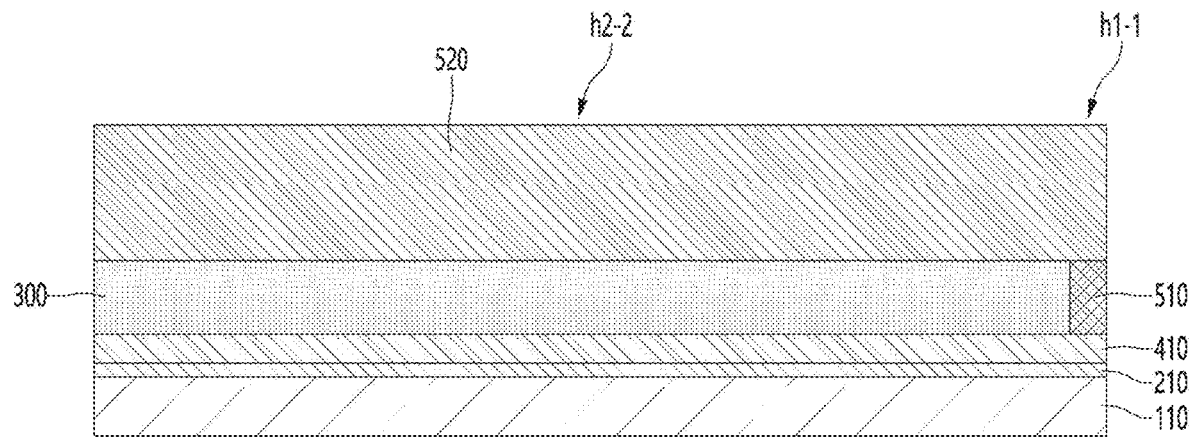
FIG. 10 is a cross-sectional view taken along line E-E' in FIG. 1.

FIG. 10 is a cross-sectional view taken along line E-E' in FIG. 1. That is, FIG. 10 is a cross-sectional view taken along both ends of the 2-2 cutting portion in the second direction.

Referring to FIG. 10, the 2-2 cutting portion h2-2 may be disposed to extend from the second protrusion PA2 of the second substrate 120 in the second direction 2A.

Referring to FIG. 10, the 1-1 cutting portion h1-1 and the 2-2 cutting portion h2-2 may be connected to each other.

Since the 1-1 cutting portion h1-1 and the 2-2 cutting portion h2-2 are connected, the first sealing portion 510 disposed in the 1-1 cutting portion h1-1 and the second sealing portion 520 disposed on the 2-2 cutting portion h2-2 may be disposed to be connected to each other.

In addition, in a region where the 1-1 cutting portion h1-1 and the 2-2 cutting portion h2-2 overlap, the second sealing portion 520 may be disposed on the first sealing portion 510. That is, since the second sealing portion 520 is formed after the first sealing portion 510 is formed, in a region where the first sealing portion 510 and the second sealing portion 520 overlap, the second sealing portion 520 may be disposed on the first sealing portion 510.

Meanwhile, in the drawing, it is illustrated that the 2-2 cutting portion h2-2 is disposed to be spaced apart from the end of the second substrate 120 in the first direction 1A, that is, the outer surface, but the embodiment is not limited thereto, and the 2-2 cutting portion h2-2 may be formed by removing one outer surface of the second substrate 120 in the first direction 1A like the 1-1 cutting portion h1-1 described above. Accordingly, in the one outer surface of the second substrate 120 in the first direction 1A, a portion of the 2-2 second cutting portion h2-2 may be the outermost surface of the second substrate 120.

Figure 11:
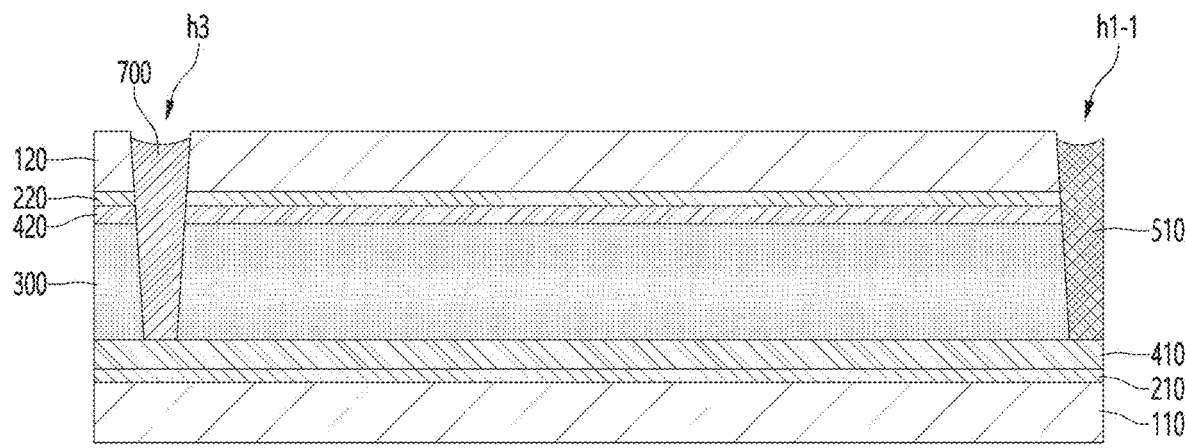
FIG. 11 is a cross-sectional view taken along line F-F' in FIG. 1.
Figure 12:
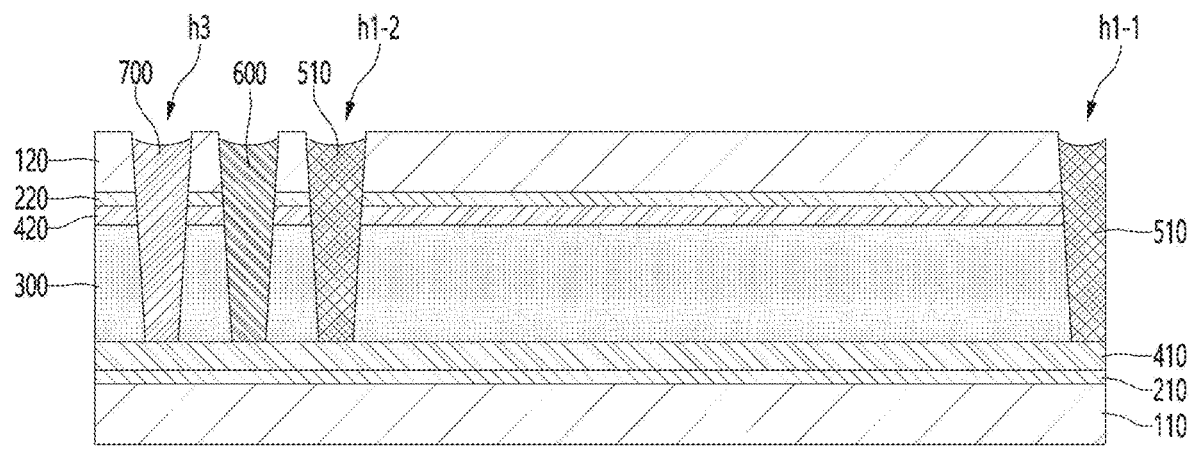
FIG. 12 is a cross-sectional view taken along line G-G' in FIG. 1.

FIG. 11 is a cross-sectional view taken along line F-F' in FIG. 1, and FIG. 12 is a cross-sectional view taken along line G-G' in FIG. 1, that is, FIGS. 11 and 12 are cross-sectional views taken the second connection region CA2 disposed on the second protrusion PA2 in the second direction.

Referring to FIGS. 11 and 12, the second connection region CA2 may include a region overlapping the first sealing portion 510 and a region not overlapping the first sealing portion 510.

That is, since the 1-2 cutting portion h1-2 and the 2-2 cutting portion h2-2 are disposed to be spaced apart from each other, the second connection region CA2 may be disposed in a region overlapping the open region OA in the second direction and in a region overlapping the first sealing portion 510 disposed inside the 1-2 cutting portion h1-2.

In addition, referring to FIG. 12, a dam portion 600 may be disposed between the second connection region CA2, that is, between the electrode connection portion 700 and the first sealing portion 510. That is, the dam portion 600 may be disposed on the second protrusion PA2 between the electrode connection portion 700 and the first sealing portion 510.

The dam portion 600 may be formed by filling a dam forming material in a cutting portion passing through the second substrate 120, the second electrode 220, the buffer layer 410, and the optical conversion unit 300.

The dam portion 600 is a material that controls an injection length of the optical conversion material when the optical conversion material 330 is injected into the accommodating portion 320, and the dam portion 600 may inhibit the optical conversion material 330 from overflowing in an outer direction of the dam, that is, in a direction of the electrode connection portion 700.

A part of the dam portion 600 may be removed during the manufacturing process of the optical path control member, a part of the dam portion 600 may remain, and a part of the dam portion may remain in a region adjacent to the second connection region CA2.

Meanwhile, when the optical conversion unit 300 between the electrode connection portion 700 and the dam portion 600 is a partition wall portion 310 region, as shown in FIG. 12, the optical conversion unit 300, the buffer layer 420, the second electrode 220, and the second substrate 120 may remain between the electrode connection portion 700 and the dam portion 600.

Alternatively, when the optical conversion unit 300 between the electrode connection portion 700 and the dam portion 600 is the accommodating portion 320 region, a material of the dam portion 600 may move into the accommodating portion 320, so that the dam portion 600 and the electrode connection portion 700 may contact each other.

In addition, when the optical conversion unit 300 between the dam portion 600 and the first sealing portion 510 is the accommodating portion 320 region, the optical conversion unit 300, the buffer layer 420, the second electrode 220, and the second substrate 120 may remain between the dam portion 600 and the first sealing portion 510 as shown in FIG. 12.

Alternatively, when the optical conversion unit 300 between the dam portion 600 and the first sealing portion 510 is the accommodating portion 320 region, materials of the first sealing portion 510 and the dam portion 600 may move into the accommodating portion 320, so that the first sealing portion 510 and the dam portion 600 may contact each other.

Figure 13:
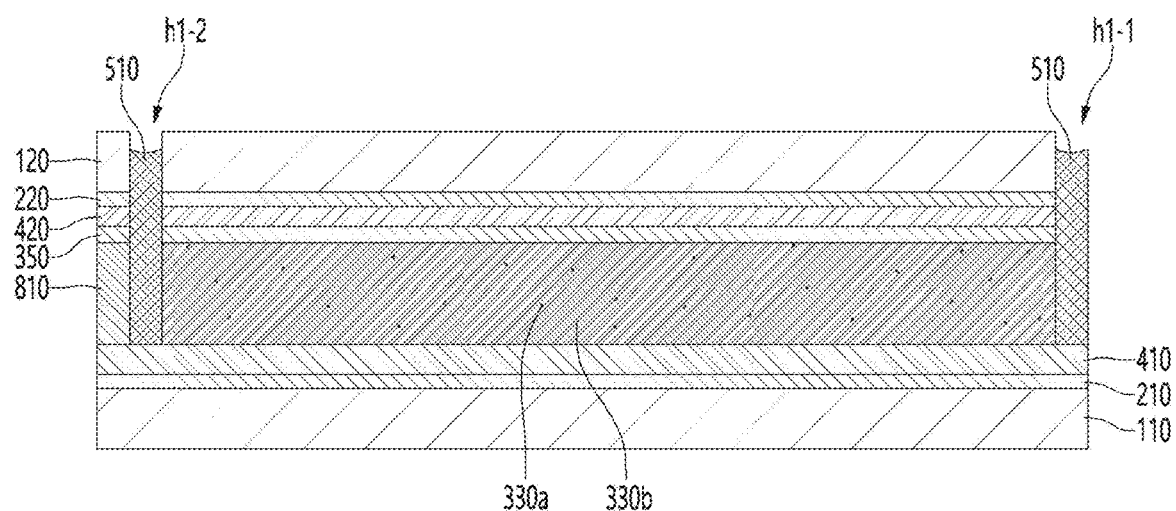
FIG. 13 is a cross-sectional view taken along line H-H' in FIG. 1.

FIG. 13 is a cross-sectional view taken along line H-H' in FIG. 1. That is, FIG. 13 is a cross-sectional view taken one accommodating portion of the optical path control member in the second direction.

Referring to FIG. 13, an optical conversion material 330 may be disposed inside the accommodating portion 320. In detail, the optical conversion material 330 and the first sealing portion 510 may be disposed inside the accommodating portion 320.

The first sealing portion 510 may be disposed at one end and the other end of the accommodating portion 320 in the second direction 2A to seal the optical conversion material 330 disposed inside the accommodating portion 320.

The optical conversion material 330 inside the accommodating portion 320 may be sealed by the first sealing portion 510, so that it is possible to inhibit the optical conversion material 330 from flowing out to the outside of the optical path control member.

The first sealing portion 510 disposed in the 1-1 cutting portion h1-1 may be disposed in contact with the optical conversion material 330. In addition, the first sealing portion 510 disposed in the 1-2 cutting portions h1-2 may be disposed in contact with the optical conversion material 300 and a first mixing region 810.

The first mixing region 810 may be a region where both the material of the dam portion 600 and a material of the first sealing portion 510, which are removed during the manufacturing process of the optical path control member, are disposed.

That is, the first mixing region 810 may include the same or a different material from the first sealing portion 510.

For example, when the materials of the first sealing portion 510 and the dam portion 600 include the same material, the first mixing region 810 may be a region where the first sealing portion 510 extends.

Alternatively, when the materials of the first sealing portion 510 and the dam portion 600 include different materials, the first mixing region 810 may be a region where the materials of the first sealing portion 510 and the dam portion 600 are mixed or a region where the materials of the first sealing portion 510 and the dam portion 600 are separated while having an interface without being mixed with each other and disposed together.

By the first mixing region 810 disposed inside the accommodating portion 320, it is possible to minimize the occurrence of air bubbles in the accommodating portion 320.

That is, as an injection amount of the material of the dam portion 600 varies in any one of the accommodating portions, a size of a space region between the first sealing portion 510 and the dam portion 600 may vary, and by disposing the sealing material of the first sealing portion 510 inside such a space region in an appropriate amount, the inside of the accommodating portion may be disposed to fill with the first sealing portion 510, the optical conversion material 330, and the like.

Accordingly, it is possible to inhibit the occurrence of air bubbles due to voids or the like inside the accommodating portion 320 and a light leakage phenomenon or the like according thereto.

Figure 14:
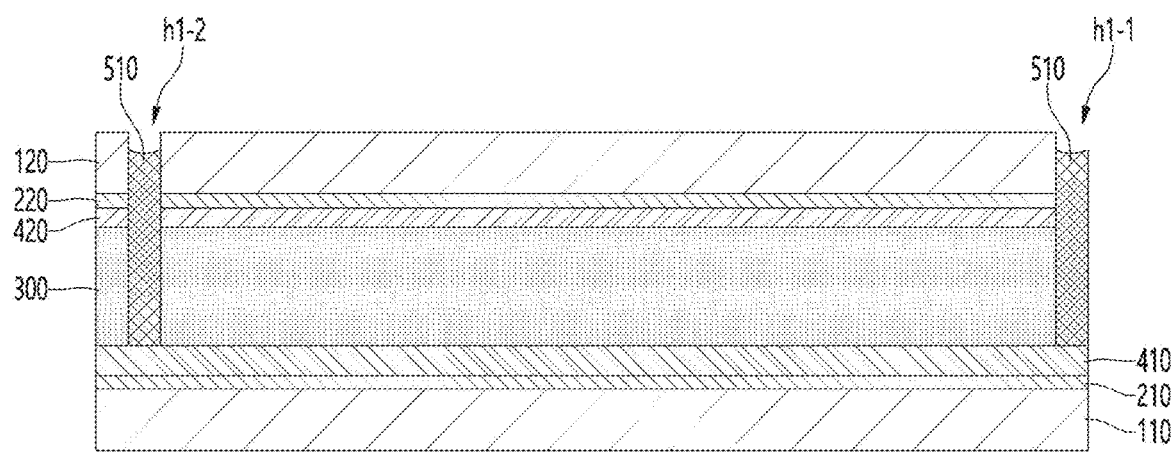
FIG. 14 is a cross-sectional view taken along line I-I' in FIG. 1.

FIG. 14 is a cross-sectional view taken along line I-I' in FIG. 1. That is, FIG. 14 is a cross-sectional view taken one partition wall portion of the optical path control member in the second direction.

Referring to FIG. 14, the partition wall portion 310 may be disposed in a region corresponding to the partition wall portion 310, and the partition wall portion 310 may be entirely removed from the second substrate 120 to form the first sealing portion 510.

That is, the first sealing portion 510 may be disposed even in a region where the partition wall portion is disposed. Accordingly, an area of the first sealing portion 510 may be increased by a size in which the partition wall portion is removed.

Therefore, an arrangement area of the first sealing portion 510 may be increased without increasing a thickness of the first sealing portion 510. In addition, since a contact area of the first sealing portion 510 is increased, adhesive properties of the first sealing portion may be improved.

Accordingly, sealing characteristics of the optical conversion material according to the first sealing portion 510 may be improved.

In the optical path control member according to the first embodiment, a 1-1 cutting portion, a 1-2 cutting portion, a 2-1 cutting portion, and a 2-2 cutting portion that pass through the second substrate, the second electrode, the buffer layer, and an entire or a portion of the optical conversion unit on the second substrate may be formed.

In addition, a first sealing portion and a second sealing portion may be disposed inside the 1-1 cutting portion, the 1-2 cutting portion, the 2-1 cutting portion, and the 2-2 cutting portion, respectively.

The first sealing portion and the second sealing portion may be disposed to seal the inlet and the outlet of the accommodating portion for accommodating the optical conversion material and may be disposed to extend along a side region of the optical conversion unit, that is, a side region in the first direction.

Accordingly, it is possible to inhibit the optical conversion material inside the accommodating portion from flowing out to the outside of the optical conversion unit by the first sealing portion, and it is possible to inhibit impurities from penetrating into the optical conversion unit from the outside by the first sealing portion and the second sealing portion, thereby improving the reliability of the optical path control member.

In addition, since the first sealing portion and the second sealing portion are disposed inside the cutting portions formed on the second substrate, as compared with the formation of the first sealing portion and the second sealing portion outside the optical conversion unit, the size of the optical path control member may be reduced, and sealing characteristics of the optical path control member may be improved by inhibiting the sealing portion material from being denatured by an external environment.

In addition, in the optical path control member according to the first embodiment, the first connection electrode may be disposed on a first protrusion formed on the first substrate, and the second connection electrode may be disposed on a second protrusion formed on the second substrate.

The surfaces of the first and second substrates may not entirely protrude, and the first protrusion and the second protrusion may protrude only by an area in which the first connection region and the second connection electrode may be formed.

Accordingly, the areas of the first protrusion and the second protrusion may be reduced. Therefore, when the optical path control member is coupled to a display panel and applied to a display device, other components of the display device may be disposed in regions that do not correspond to the first protrusion and the second protrusion, thereby reducing a bezel region of the display device.

That is, the optical path control member according to the first embodiment reduces the size of the bezel region where the connection electrode is disposed, thereby reducing the bezel region of the display device to which the optical path control member is applied.

Hereinafter, an optical path control member according to a second embodiment will be described with reference to FIGS. 15 to 24.

In the description of the optical path control member according to the second embodiment, descriptions of the same as or similar to those of the optical path control member according to the first embodiment described above will be omitted, and the same reference numerals will be assigned to the same components.

Referring to FIGS. 15 to 25, in the optical path control member according to the second embodiment, an accommodating portion 320 of the optical conversion unit is tilted at a predetermined angle to be disposed unlike the first embodiment described above.

Referring to FIGS. 15 to 18, the accommodating portion 320 may extend in a direction different from the first direction 1A and the second direction 2A.

Accordingly, one end and the other end of the at least one accommodating portion among the accommodating portions 320 may be in contact with the first sealing portion 510, and one end and the other end of the at least one accommodating portion may be in contact with the first sealing portion 510 and the second sealing portion 520.

As the accommodating portion is tilted at a predetermined inclination angle, and when the optical path control member is coupled to a display panel to form a display device, it is possible to inhibit a moire phenomenon caused by overlapping the accommodating portion of the optical path control member and a pattern of the display panel.

That is, the one end and the other end of the accommodating portion 320 according to the second embodiment may be formed on both an outer surface in the first direction and an outer surface in the second direction of the optical path control member.

Figure 15:
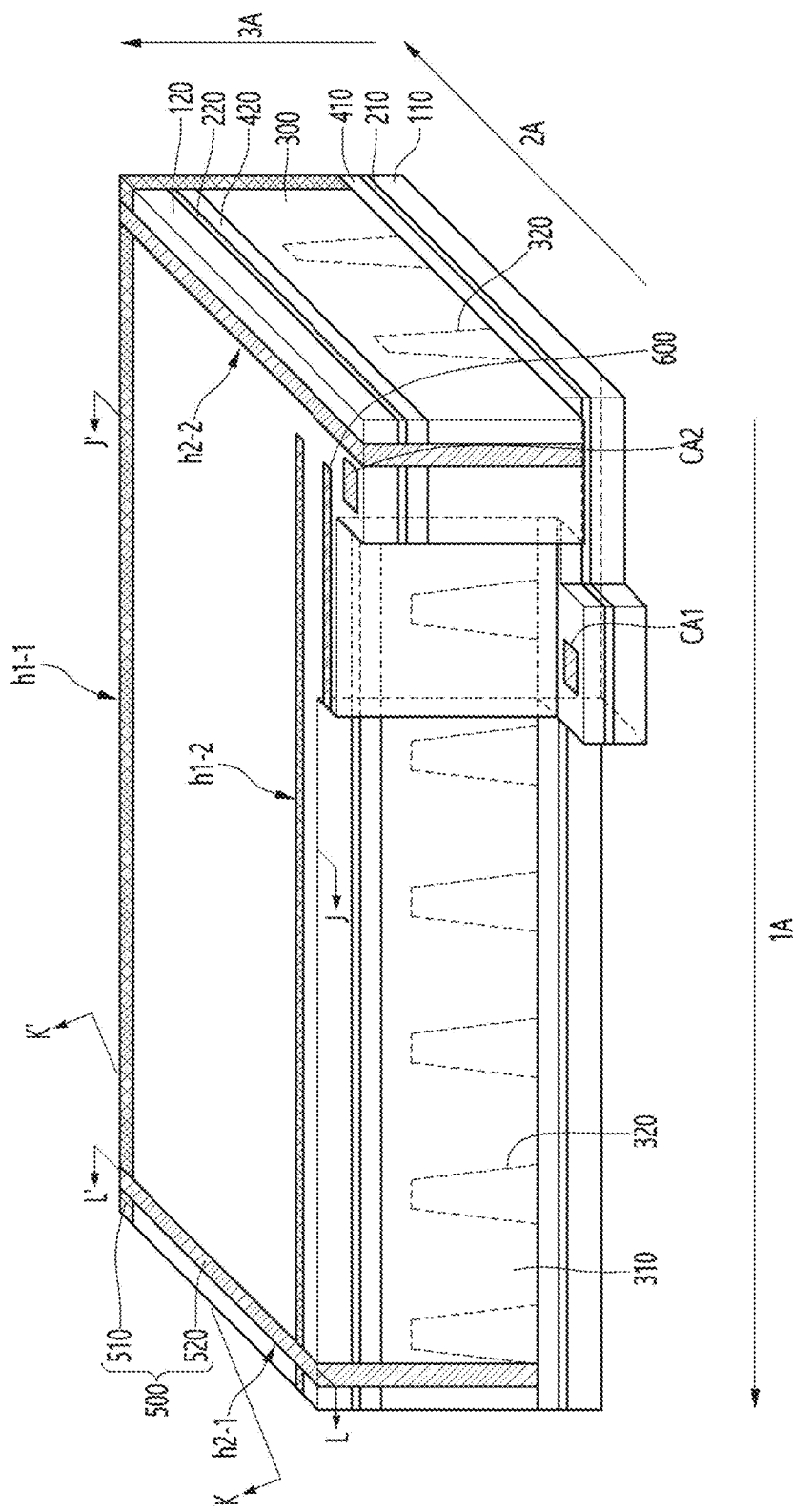
FIG. 15 is a perspective view of an optical path control member according to a second embodiment.
Figure 16:
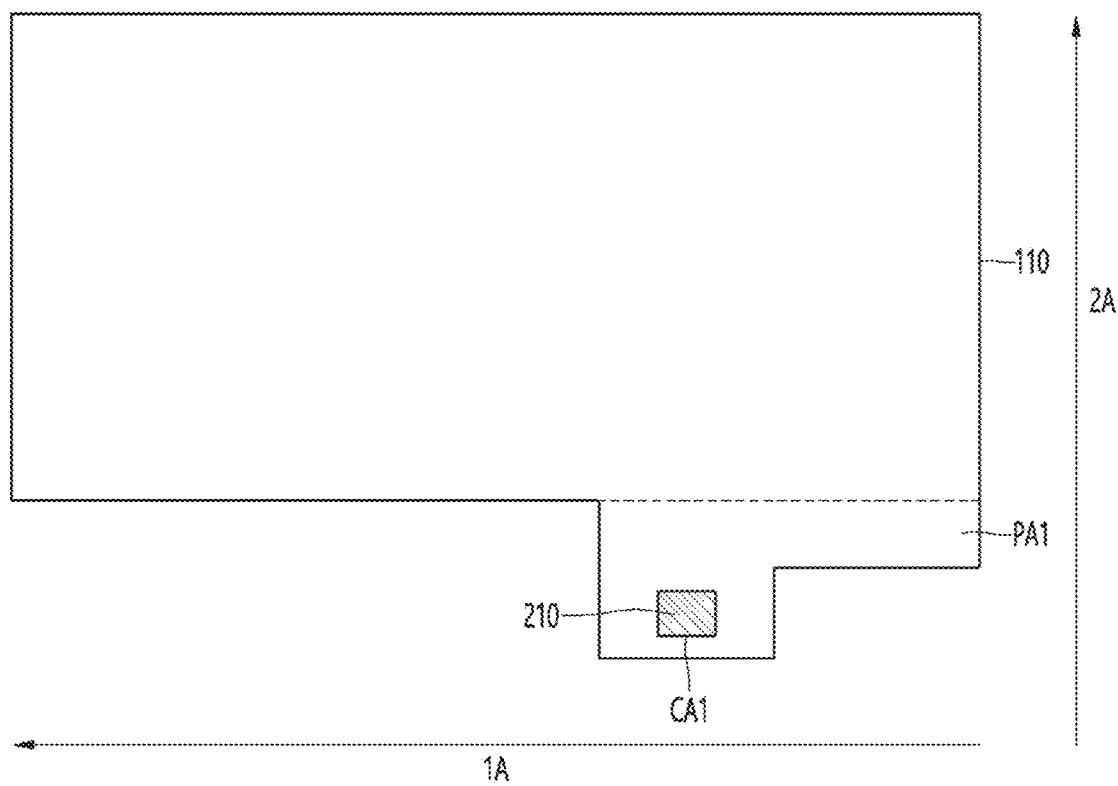
FIG. 16 is a top view of a first substrate of the optical path control member according to the second embodiment.
Figure 17:
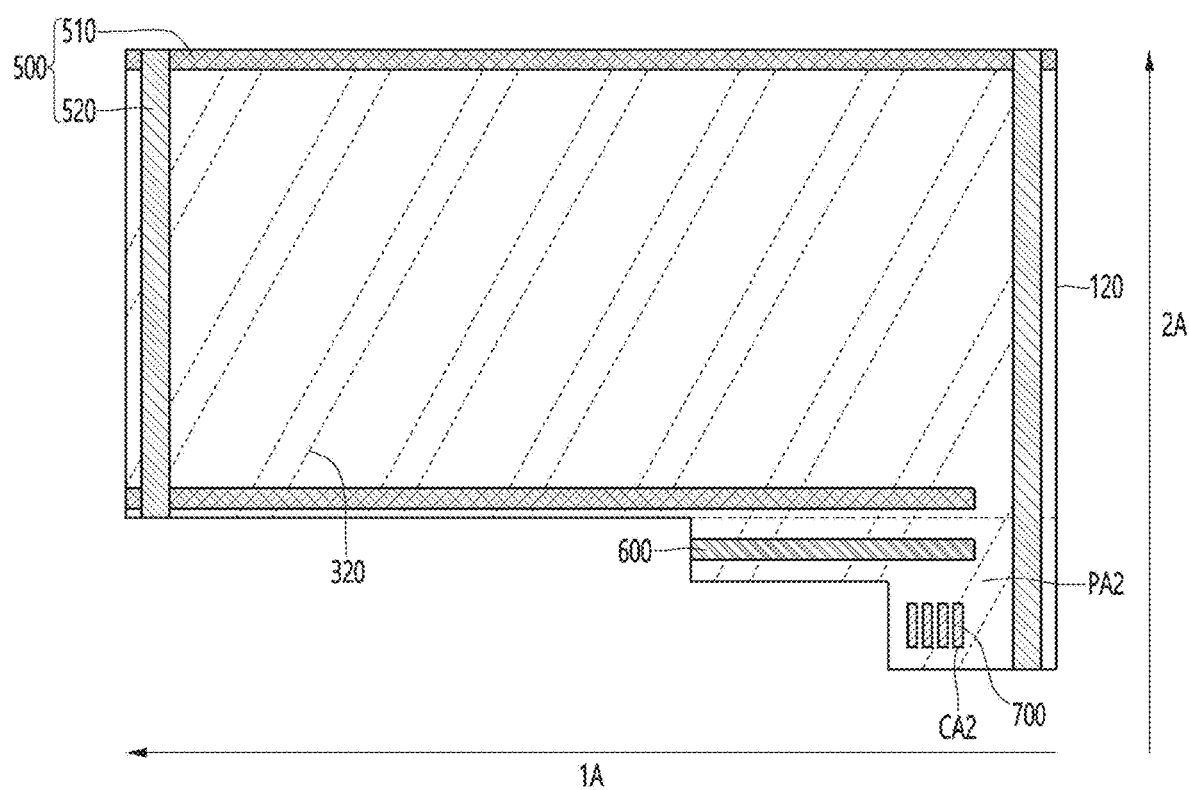
FIG. 17 is a top view of a second substrate of the optical path control member according to the second embodiment.
Figure 18:
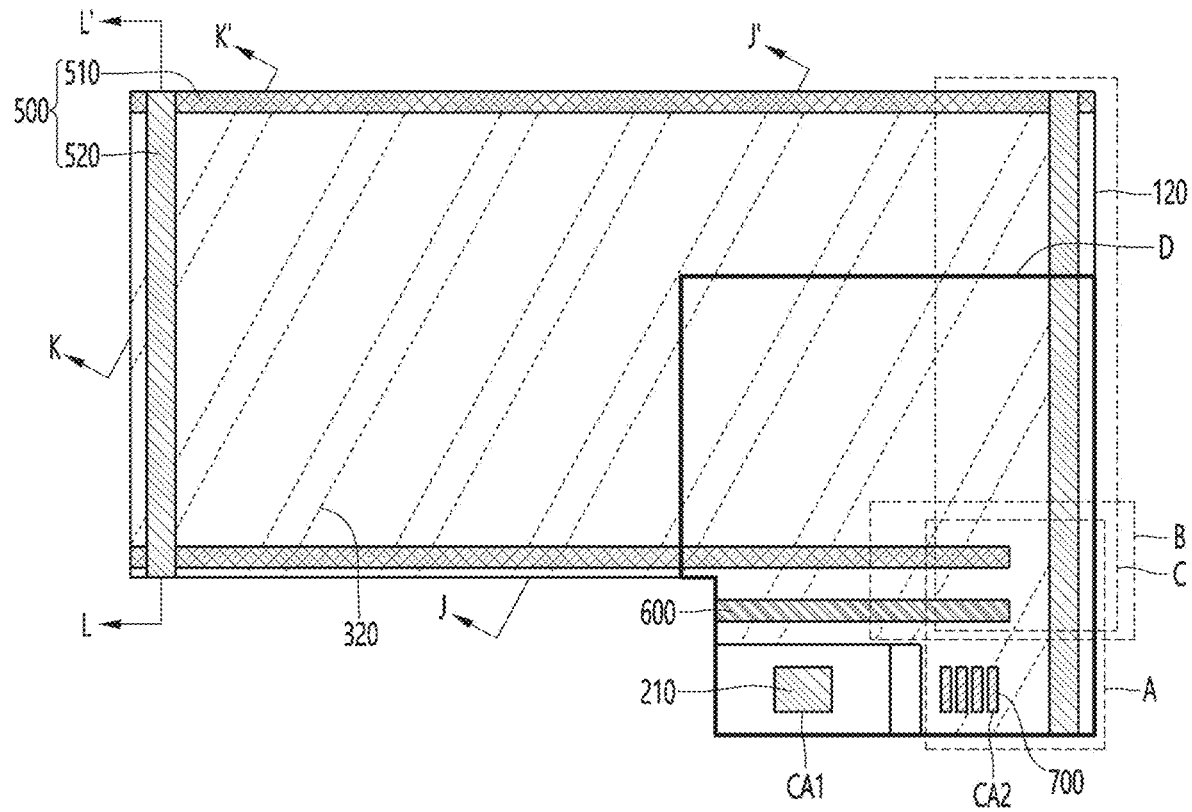
FIG. 18 is a top view of the second substrate in which the first and second substrates of the optical path control member are laminated according to the second embodiment.
Figure 19:
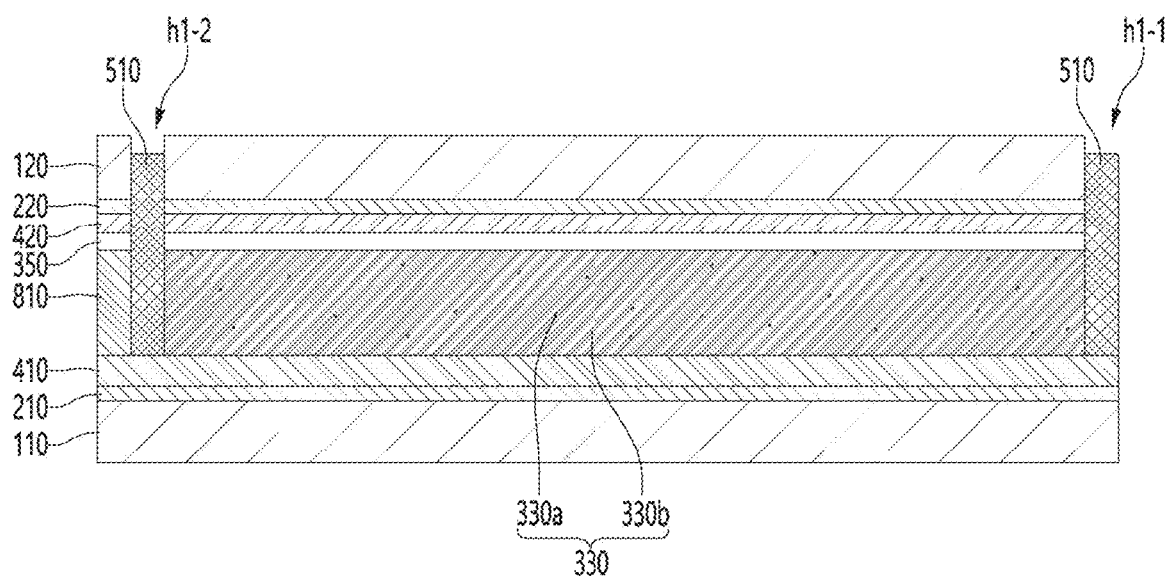
FIG. 19 is a cross-sectional view taken along line J-J' in FIG. 15.

FIG. 19 is a cross-sectional view taken along line J-J' in FIGS. 15 and 18. That is, FIG. 19 is a cross-sectional view taken one accommodating portion of the optical path control member in an inclination angle direction.

Referring to FIG. 19, an optical conversion material 330 may be disposed inside the accommodating portion 320. In detail, the optical conversion material 330 and the first sealing portion 510 may be disposed inside the accommodating portion 320.

The first sealing portion 510 may be disposed at one end and the other end of the accommodating portion 320 in the second direction 2A to seal the optical conversion material 330 disposed inside the accommodating portion 320.

That is, at least one accommodating portion among the plurality of accommodating portions of the optical conversion unit may be disposed in contact with only the first sealing portion 510.

The optical conversion material 330 inside the accommodating portion 320 may be sealed by the first sealing portion 510, so that it is possible to inhibit the optical conversion material 330 from flowing out to the outside of the optical path control member.

The first sealing portion 510 disposed in the 1-1 cutting portion h1-1 may be disposed in contact with the optical conversion material 330. In addition, the first sealing portion 510 disposed in the 1-2 cutting portions h1-2 may be disposed in contact with the optical conversion material 300 and a first mixing region 810.

The first mixing region 810 may be a region where both the material of the dam portion 600 and a material of the first sealing portion 510, which are removed during the manufacturing process of the optical path control member, are disposed.

That is, the first mixing region 810 may include the same or a different material from the first sealing portion 510.

For example, when the materials of the first sealing portion 510 and the dam portion 600 include the same material, the first mixing region 810 may be a region where the first sealing portion 510 extends.

Alternatively, when the materials of the first sealing portion 510 and the dam portion 600 include different materials, the first mixing region 810 may be a region where the materials of the first sealing portion 510 and the dam portion 600 are mixed or a region where the materials of the first sealing portion 510 and the dam portion 600 are separated while having an interface without being mixed with each other and disposed together.

By the first mixing region 810 disposed inside the accommodating portion 320, it is possible to minimize the occurrence of air bubbles in the accommodating portion 320.

That is, as an injection amount of the material of the dam portion 600 varies in any one of the accommodating portions, a size of a space region between the first sealing portion 510 and the dam portion 600 may vary, and by disposing the sealing material of the first sealing portion 510 inside such a space region in an appropriate amount, the inside of the accommodating portion may be disposed to fill with the first sealing portion 510, the optical conversion material 330, and the like.

Accordingly, it is possible to inhibit the occurrence of air bubbles due to voids or the like inside the accommodating portion 320 and the light leakage phenomenon or the like according thereto.

Figure 20:
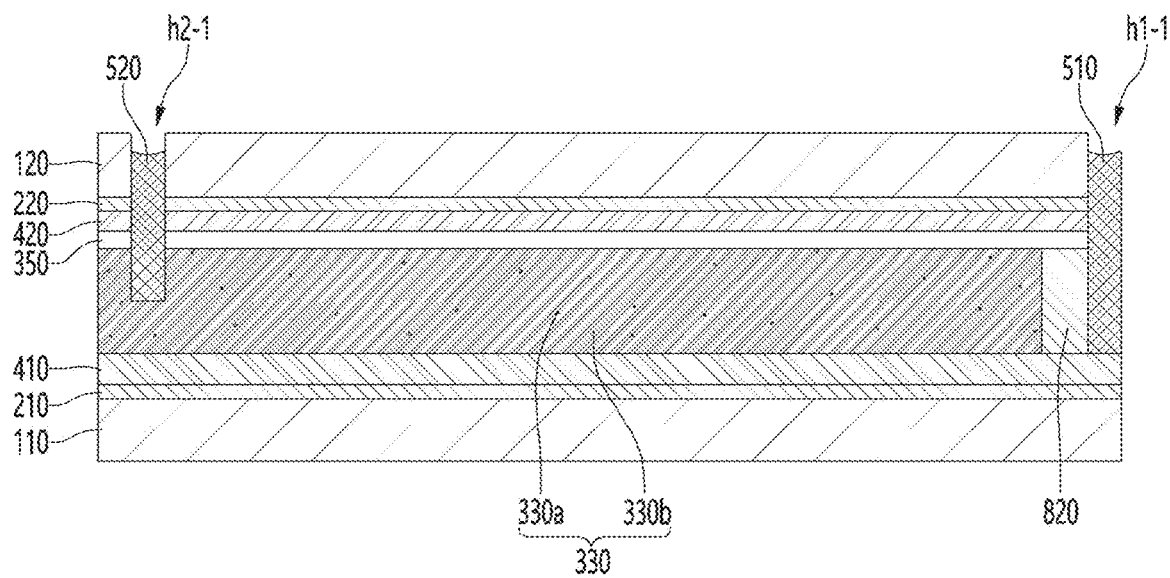
FIG. 20 is a cross-sectional view taken along line K-K' in FIG. 15.

FIG. 20 is a cross-sectional view taken along line K-K' in FIGS. 15 and 18. That is, FIG. 20 is a cross-sectional view taken the outermost accommodating portion of the optical path control member in an inclination angle direction.

Referring to FIG. 20, an optical conversion material 330 may be disposed inside the accommodating portion 320. In detail, the optical conversion material 330 and the first sealing portion 510 and the second sealing portion 520 may be disposed inside the accommodating portion 320.

The first sealing portion 510 and the second sealing portion 520 may seal the optical conversion material 330 disposed inside the accommodating portion 320.

That is, the first sealing portion 510 may seal an end in an outer surface direction in the second direction among ends of the accommodating portion 320, and the second sealing portion 520 may seal an end in an outer surface direction in the first direction among the ends of the accommodating portion 320.

That is, at least one accommodating portion among the plurality of accommodating portions of the optical conversion unit may be disposed in contact with the first sealing portion 510 and the second sealing portion 520.

The optical conversion material 330 inside the accommodating portion 320 is sealed by the first sealing portion 510 and the second sealing portion 520, so that it is possible to inhibit the optical conversion material from flowing out to the outside.

The first sealing portion 510 disposed in the 1-1 cutting portion h1-1 may be disposed in contact with the optical conversion material 330. Alternatively, the first sealing portion 510 disposed on the 1-1 cutting portion h1-1 may be in contact with the optical conversion material 330 and a second mixing region 820.

The second mixing region 820 may be a region where both the first sealing portion 510 and the optical conversion material 330 are included.

That is, in the first sealing portion 510 disposed in the 1-1 cutting portion h1-1, a part of the sealing material penetrates into the accommodating portion 320 in a region overlapping the accommodating portion 320, or, the optical conversion material 330 may penetrate into the 1-1 cutting portion h1-1.

In the second mixing region 820, the optical conversion material 330 and the sealing material may be disposed to be phase-separated from each other or may be disposed to be mixed with each other.

In addition, in the first sealing portion 510 disposed in the 1-1 cutting portion h1-1, a part of the sealing material penetrates into the accommodating portion 320 in the region overlapping the accommodating portion 320. The first sealing portion 510 may improve adhesive properties of the second sealing portion by an anchoring effect, and thus it is possible to inhibit the second sealing portion from being delaminated.

In addition, the second sealing portion 520 disposed in the 2-1 cutting portion h2-1 may be disposed in contact with the optical conversion material 330. In detail, one surface of the second sealing portion 520 facing the first sealing portion may be in contact with the optical conversion material 330. In addition, the optical conversion material 330 may exist in a direction of the other surface opposite to the one surface to be in contact with the optical conversion material 330. In addition, the second mixed region including both the optical conversion material 330 and the sealing material may be disposed in the direction of the other surface opposite to the one surface.

Figure 21:
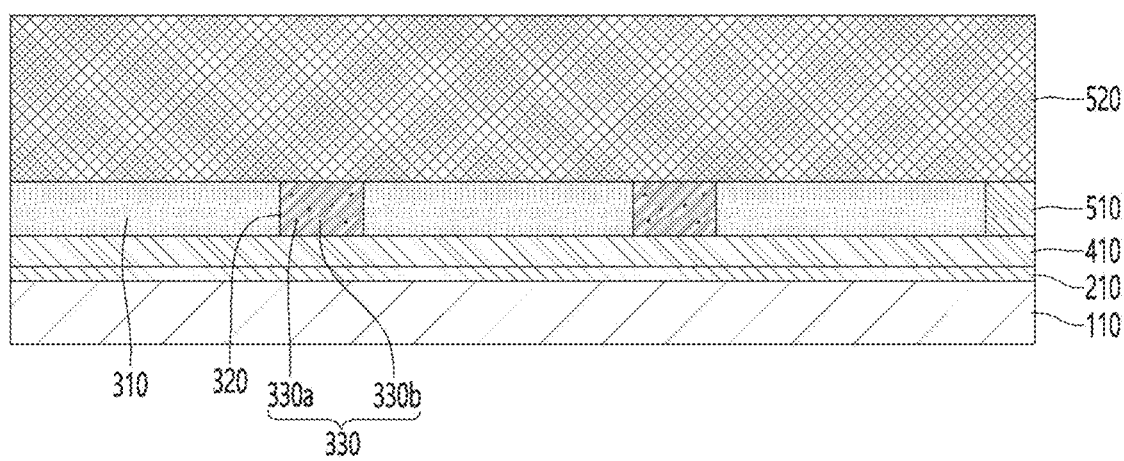
FIG. 21 is a cross-sectional view taken along line L-L' in FIG. 15.

FIG. 21 is a cross-sectional view taken along line L-L' in FIGS. 15 and 18. That is, FIG. 21 is a cross-sectional view taken along an extending direction of the second sealing portion of the optical path control member.

Referring to FIG. 21, the second sealing portion 520 may be formed to pass through the second substrate 120, the second electrode 220, and the buffer layer 410 and may be formed by removing a part of the accommodating portion 320 and the partition wall 310. In addition, the second sealing portion 520 may be formed to cross the accommodating portion 320 and the partition wall portion 310. That is, the partition wall portion 310 and the accommodating portion 320 may be alternately disposed under the second sealing portion 520.

An optical conversion material 330 may be disposed inside the accommodating portion 320 that has not been removed. In detail, when the optical conversion material 330 is filled in the accommodating portion 320, one end of the optical conversion material 330 inside the accommodating portion 320 may be sealed by the first sealing portion 510 to minimize the movement of the optical conversion material. Subsequently, the optical conversion material remaining in the accommodating portion under the second sealing portion may also be sealed by forming the 2-1 cutting portion h2-1 and forming the second sealing portion 520. That is, the second sealing portion 520 may be in contact with side and upper surfaces of the optical conversion material 330 and may seal the optical conversion material 330.

Preferably, when the second sealing portion is formed, both the accommodating portion and the partition wall portion are removed, so that it is possible to inhibit the optical conversion material from flowing out to the outside.

Meanwhile, a third mixing region may be formed in a region where the second sealing portion 520 and the accommodating portion 320 overlap, that is, are in contact with each other.

The third mixing region may be a region where the second sealing portion 520 and the optical conversion material 330 are mixed.

That is, in the second sealing portion 520 disposed in the 2-1 cutting portion h2-1, a part of the sealing material penetrates into the accommodating portion 320 in the region overlapping the accommodating portion 320, or the optical conversion material may penetrate into the 2-1 cutting portion h2-1 to be mixed with the optical conversion material 330.

Accordingly, the second sealing portion 520 may improve the adhesive properties of the second sealing portion by the anchor effect, and thus it is possible to inhibit the second sealing portion from being delaminated.

Figure 22:
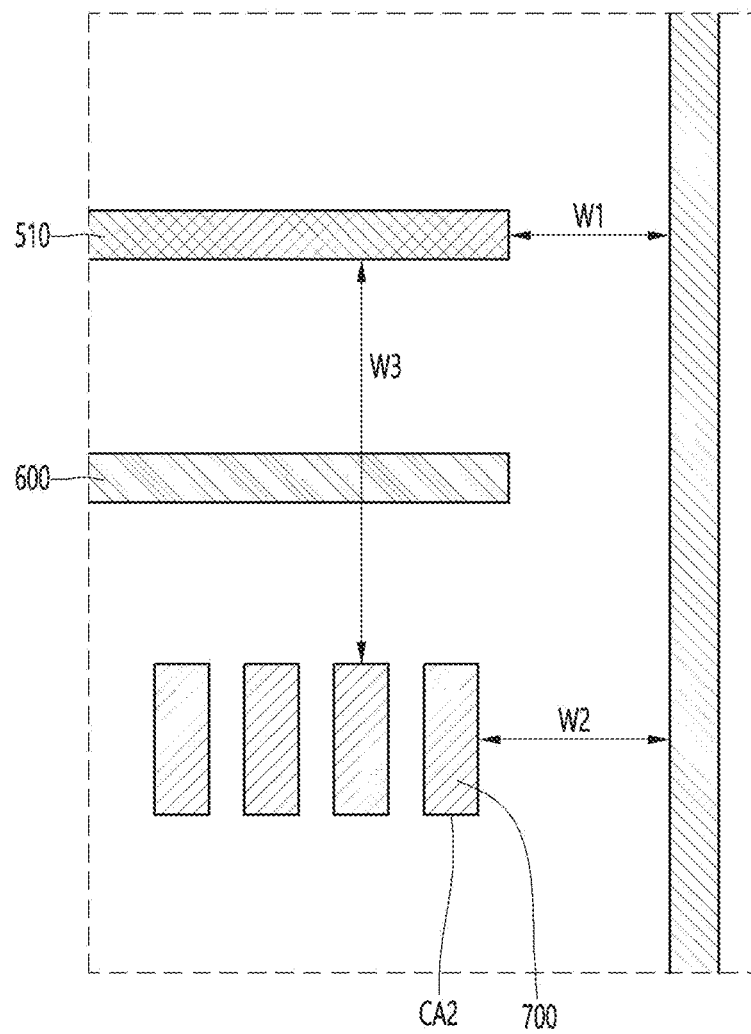
FIG. 22 is an enlarged view of region A in FIG. 18.

Meanwhile, FIG. 22 is an enlarged view of region A in FIG. 18. Referring to FIG. 22, one end in the first direction of at least one of the first sealing portions 510 disposed on the dam portion 600 and the 1-2 cutting portion h1-2 may be disposed to protrude more toward an end of the second substrate than one end of the second connection portion CA2 in the first direction.

For example, a distance between the end of the first sealing portion 510 and the end of the second substrate 120 in the first direction may be smaller than a distance between the end of the second connection region CA2 and the end of the second substrate 120 in the first direction.

That is, a first width W1 between the end of the first sealing portion 510 defined as the open region OA and the end of the second substrate 120 in the first direction may be smaller than a second width W2 between the end of the electrode connection portion 700 of the second connection region CA2 and the end of the second substrate 120 in the first direction.

In this case, when the electrode connection portion 700 of the second substrate 120 is included in plural, the second width W2 may be defined as a width between the outermost electrode connection portion and the end of the second substrate 120 in the first direction.

In addition, a third width W3 between the first sealing portion 510 disposed in the 1-2 cutting portion h1-2 and the electrode connection portion 700 may be greater than the second width W2. Through this, it is possible to secure a space for forming a dam portion between the first sealing portion 510 and the electrode connection portion 700, and referring to FIG. 25 below, and accordingly, it is possible to inhibit the optical conversion material from flowing out to the third cutting portion h3 for forming the electrode connection portion to interfere with current movement between the second electrode 220 and the electrode connection portion 700.

Figure 23:
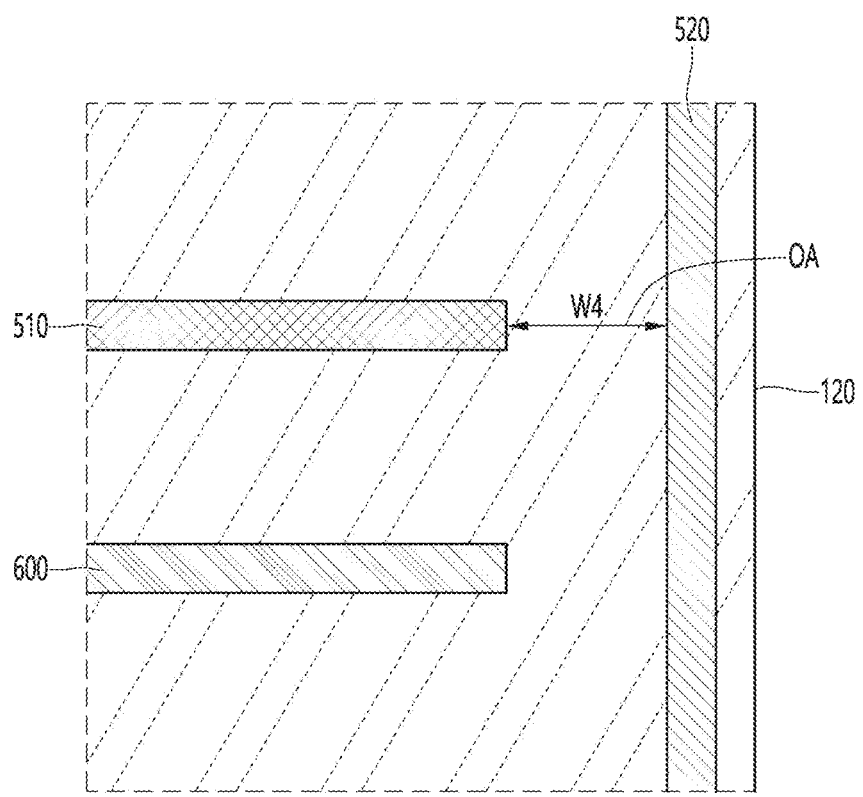
FIG. 23 is an enlarged view of region B in FIG. 18.

Meanwhile, FIG. 23 is an enlarged view of region B in FIG. 18. Referring to FIG. 23, a plurality of accommodating portions may be disposed in the open region OA.

In detail, three or more, five or more, ten or more, fifteen or more, twenty or more accommodating portions may be disposed in the open region OA.

In addition, a width W4 of the open region OA may be 100 μm or more, 300 μm or more, 600 μm or more, 800 μm or more, or 1,000 μm or more.

When the accommodating portion is disposed in the open region OA at less than three or with a width of less than 100 μm, sufficient current and voltage may not be applied to the optical conversion material 330 inside the accommodating portion 320 that is disposed between the first sealing portion 510 and the second sealing portion 520 from the electrode connection portion, and thus optical conversion efficiency may be lowered. In addition, when the width of the open region OA is too small, disconnection may occur during manufacturing, and thus process efficiency may be lowered.

In addition, one or more, two or more, three or more, four or more, five or more accommodating portions may be in contact with a side surface of the open region side of the first sealing portion 510. This is formed by tilting the accommodating portion 320, and a large amount of the optical conversion material may be formed in the accommodating portion close to the open region among the plurality of accommodating portions, thereby further increasing an optical conversion area. In FIG. 23 below, it is illustrated that one accommodating portion is in contact with the side surface of the open region side of the first sealing portion 510, but the number of accommodating portions in contact as described above is not limited thereto.

Figure 24:
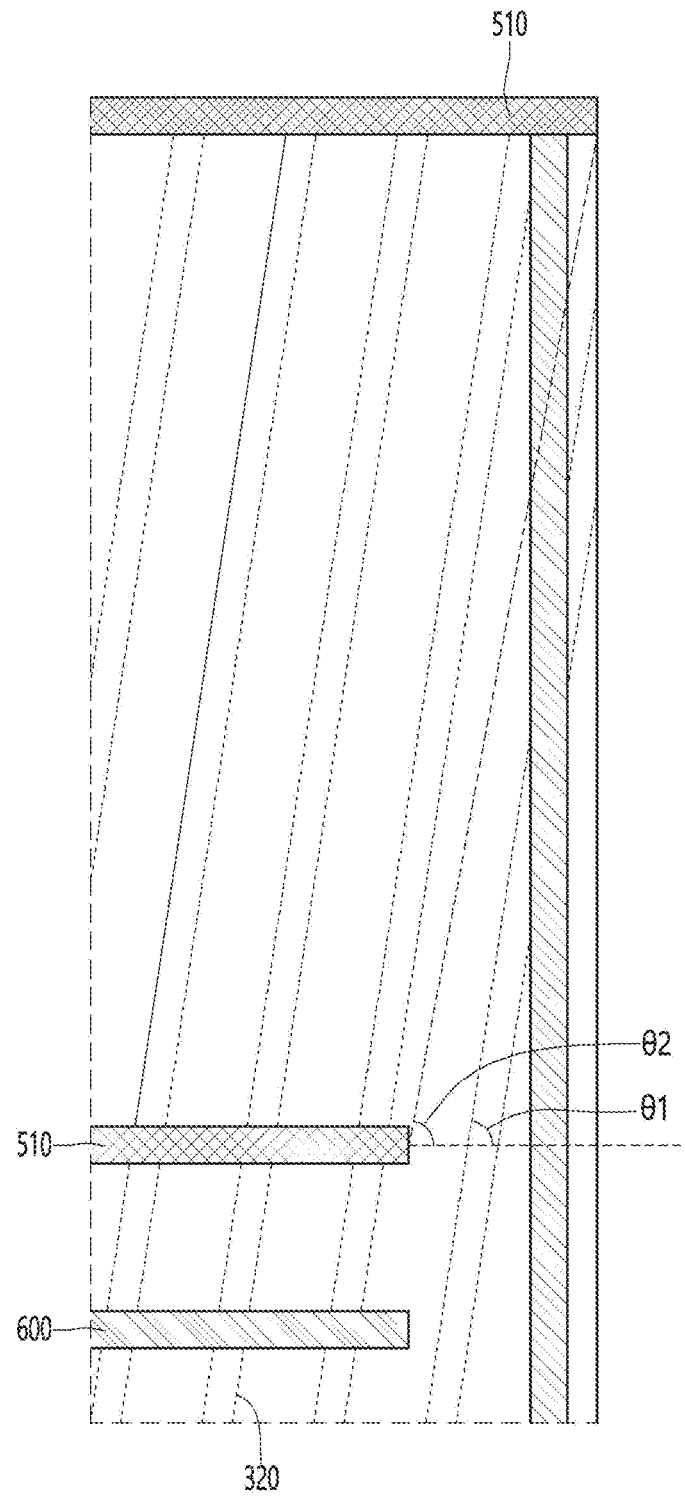
FIG. 24 is an enlarged view of region C in FIG. 18.

Meanwhile, FIG. 24 is an enlarged view of region C in FIG. 18. Referring to FIG. 24, the accommodating portion 320 may be inclined at a predetermined angle.

In detail, when a tilting angle θ1 of the accommodating portion is defined as an acute angle between the accommodating portion and an extension line of the first sealing portion 510 disposed in the 1-2 cutting portion h1-2, the tilting angle θ1 of the first sealing portion 510 may be smaller than an acute angle θ2 between an imaginary line connecting from one end of the 1-1 cutting portion h1-1 in the first direction to one end of the 1-2 cutting portion h1-2 in the first direction and the first sealing portion 510 disposed on the 1-2 cutting portion h1-2.

Accordingly, it is possible to minimize an area of the accommodating portion into which the optical conversion material is not injected due to the open region among the plurality of accommodating portions. That is, in the optical path control member, an angle formed by a width of the open region in the first direction and the accommodating portion should be formed at an acute angle to form many optical conversion regions of the optical path control member. That is, in the optical path control member, when the angle formed by the width of the open region in the first direction and the accommodating portion is formed in a right angle, the optical conversion material may not be formed on an entire of one side surface of the substrate corresponding to the open region, and thus the optical conversion region of the optical path control member is reduced.

For example, the tilting angle of the accommodating portion may be 60° to 89°, 65° to 87°, or 75° to 85°.

Figure 25:
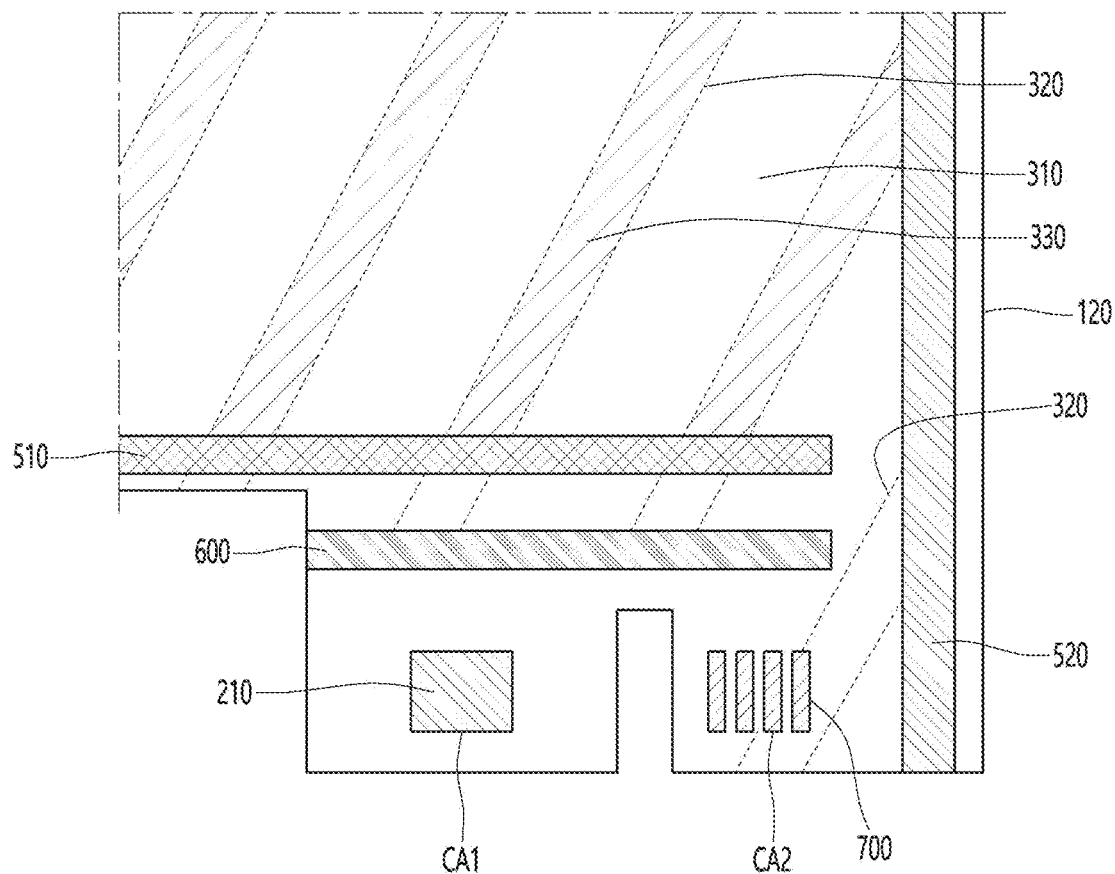
FIG. 25 is an enlarged view of region D in FIG. 18.

Meanwhile, referring to FIG. 25, the accommodating portion 320 may include a region where the optical conversion material 330 is not included.

In detail, FIG. 25 is an enlarged view of region D in FIG. 18, and the optical conversion material may not be disposed in the accommodating portion, the optical conversion material may be disposed only in a part of the accommodating portion, or the optical conversion material may be disposed only in some accommodating portions among the plurality of accommodating portions. That is, the accommodating portion may be formed outside the sealing portion, and as a region without the optical conversion material is formed in the accommodating portion outside the sealing portion, a region inhibiting penetration of external impurities from the outside of the sealing portion may be formed. Through this, it is possible to minimize the penetration of external impurities into the optical conversion material.

In the optical path control member according to the second embodiment, the accommodating portion may be disposed by tilting the accommodating portion at an inclination angle of a predetermined size with respect to the second direction of the substrate.

Accordingly, when the optical path control member and the display panel are coupled to form the display device, it is possible to inhibit the occurrence of the moire phenomenon caused by overlapping the pattern of the accommodating portion of the optical path controlling member and the pixel pattern of the display panel.

Accordingly, when the user views the display device from the outside, it is possible to inhibit the pattern from being visually recognized due to the moire phenomenon caused by the overlapping of the accommodating portion pattern of the optical path control member and the pixel pattern of the display panel.

In addition, the optical path control member according to the second embodiment may inhibit the optical conversion material from flowing out to the side surface of the optical path control member as the accommodating portion is inclined.

That is, since the first sealing portion and the second sealing portion are disposed at the ends of the optical path control member in the first and second directions to seal the optical conversion material inside the accommodating portion, it is possible to minimize the optical conversion material flowing out to the outside or external impurities penetrating into the optical conversion material.

In addition, by forming a region where the sealing portion and the optical conversion material are mixed, adhesive properties of the sealing portion may be improved by the anchor effect. Accordingly, it is possible to improve the adhesion of the sealing portion to inhibit delamination, thereby improving reliability and sealing properties of the optical path control member.

Hereinafter, an optical path control member according to a third embodiment will be described with reference to FIGS. 26 to 30.

In the description of the optical path controlling member according to the third embodiment, descriptions of the same as or similar to those of the optical path controlling member according to the first and second embodiments described above will be omitted, and the same reference numerals will be assigned to the same components.

Referring to FIGS. 26 to 29, in the optical path control member according to the third embodiment, the first protrusion PA1 and the second protrusion PA2 may be disposed to overlap each other. That is, unlike the first and second embodiments, the first protrusion PA1 and the second protrusion PA2 may not be disposed to be misaligned from each other and may be disposed to entirely or partially overlap each other.

Accordingly, when the optical path control member is manufactured, by facilitating the alignment of the first substrate 110 and the second substrate 120, it is possible to inhibit defects due to an error occurring during the process of laminating the first substrate and the second substrate, thereby improving process efficiency.

Figure 26:
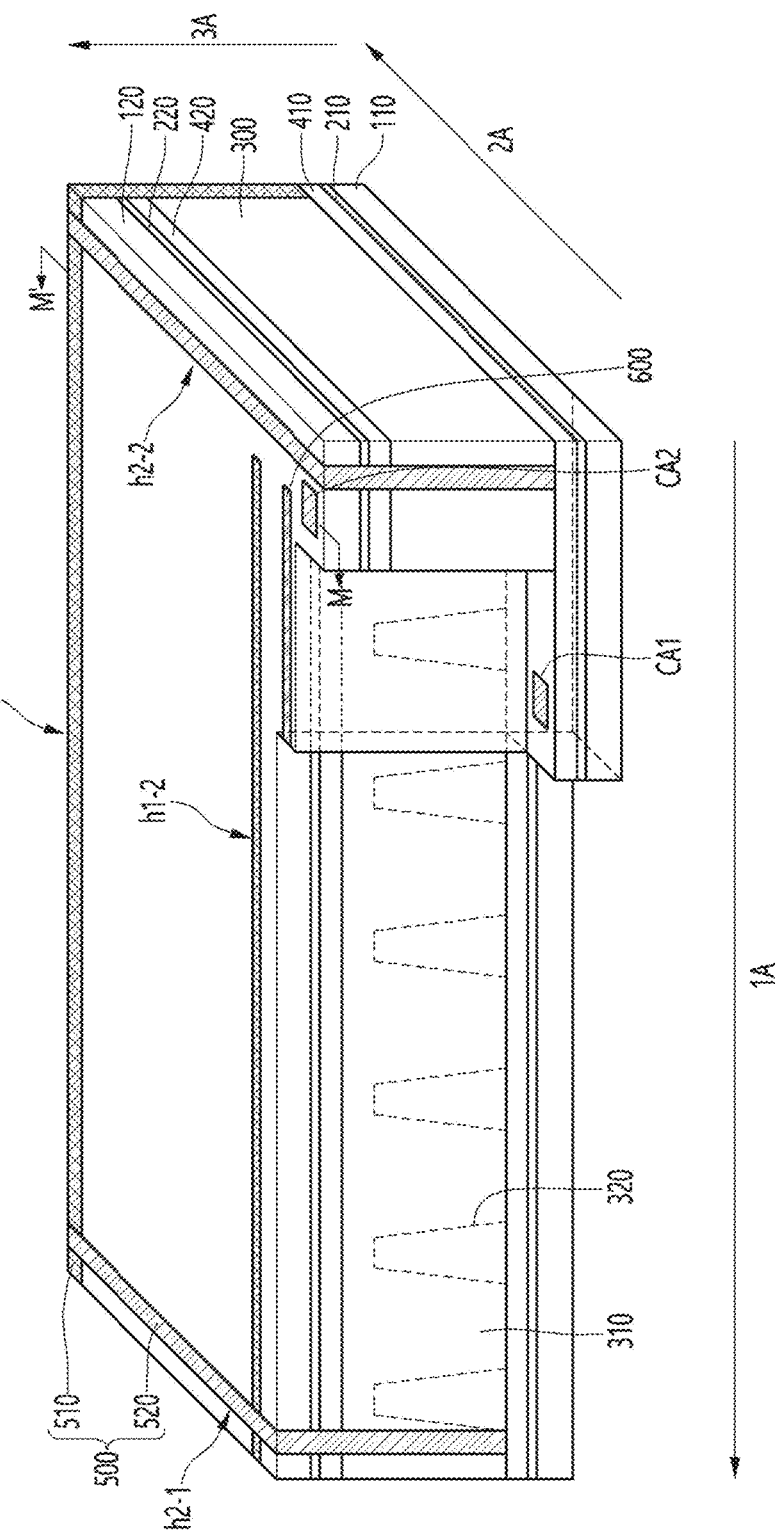
FIG. 26 is a perspective view of an optical path control member according to a third embodiment.
Figure 27:
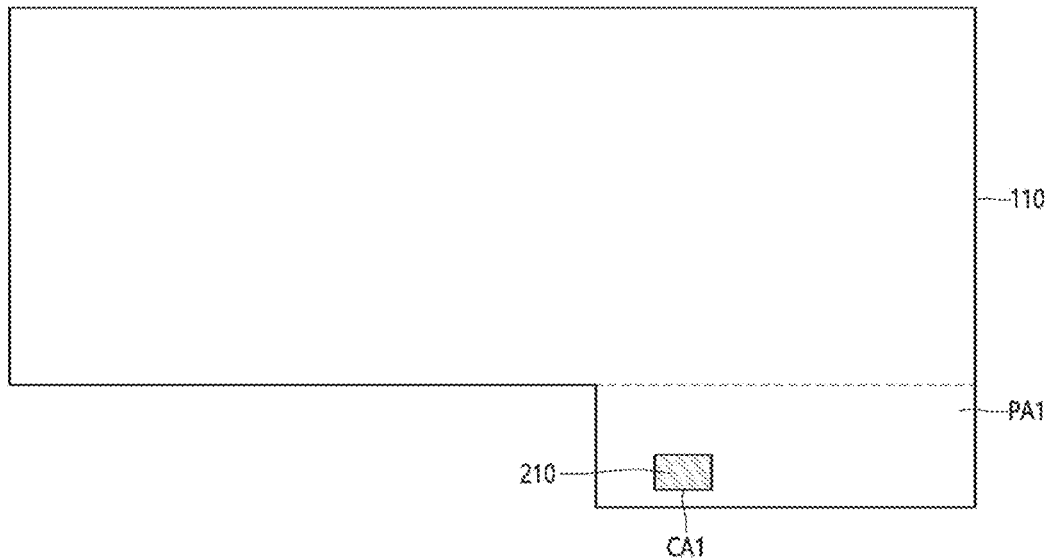
FIG. 27 is a top view of a first substrate of the optical path control member according to the third embodiment.
Figure 28:
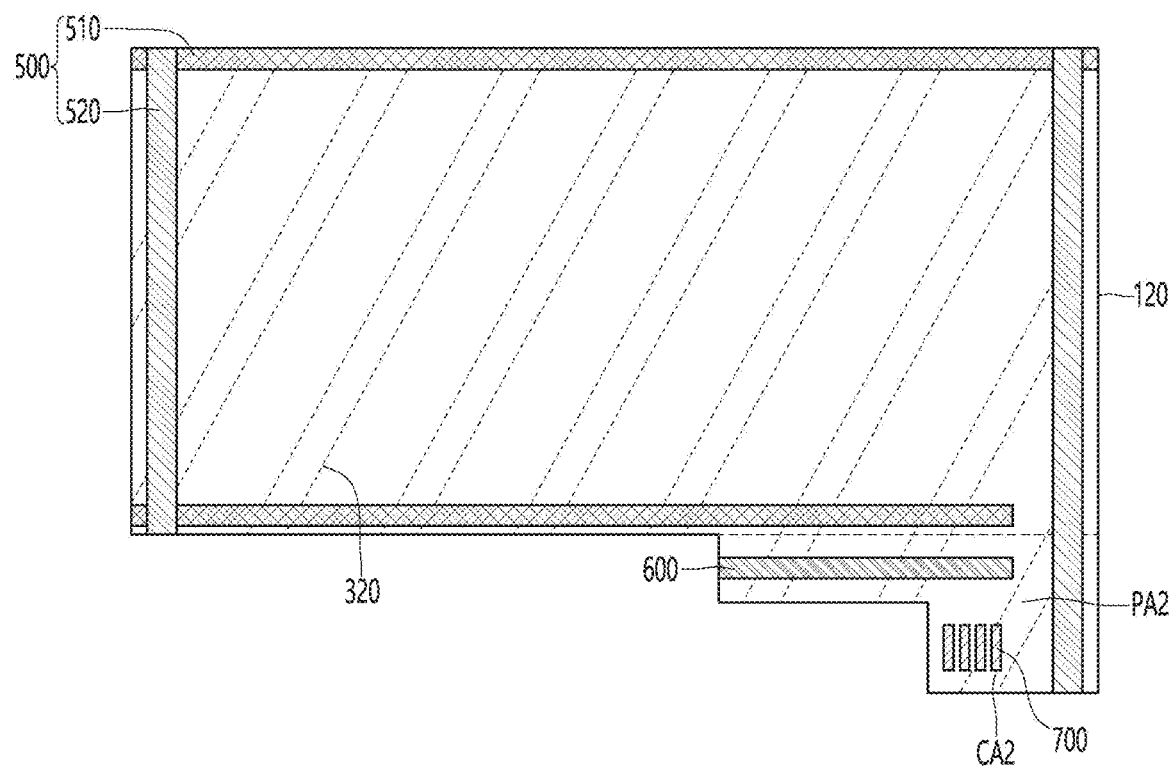
FIG. 28 is a top view of a second substrate of the optical path control member according to the third embodiment.
Figure 29:
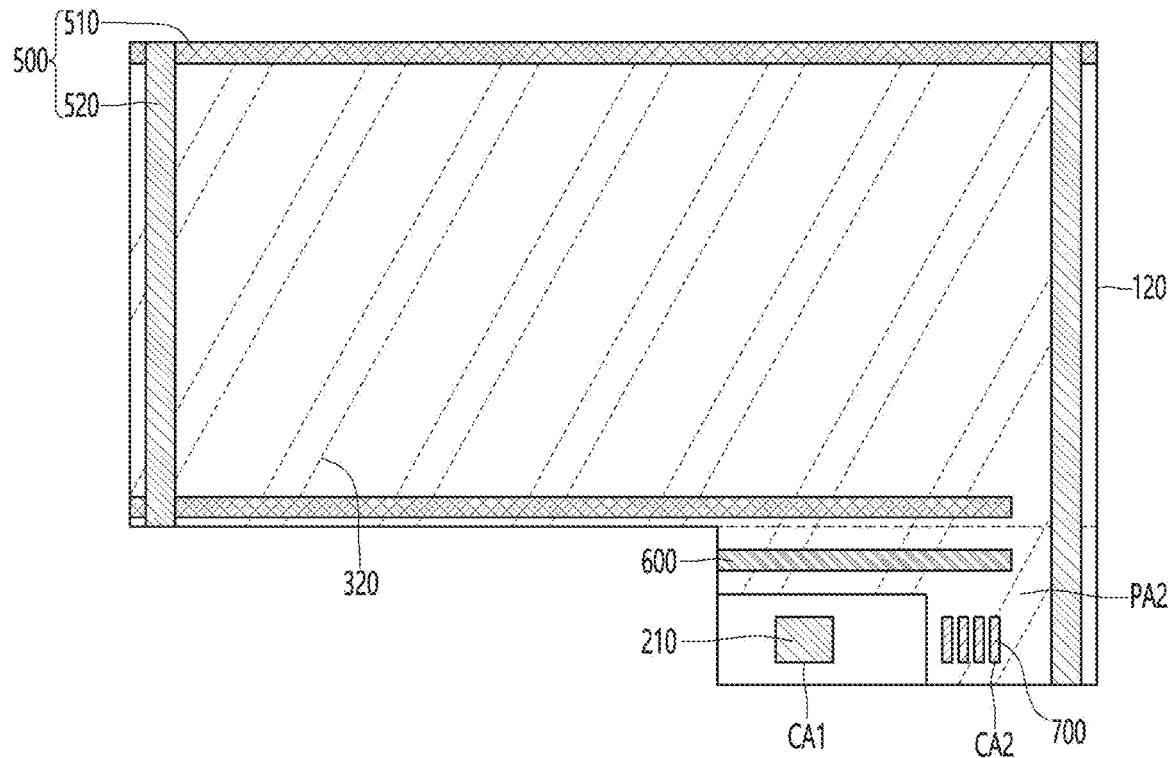
FIG. 29 is a top view of the second substrate in which the first and second substrates of the optical path control member are laminated according to the third embodiment.
Figure 30:
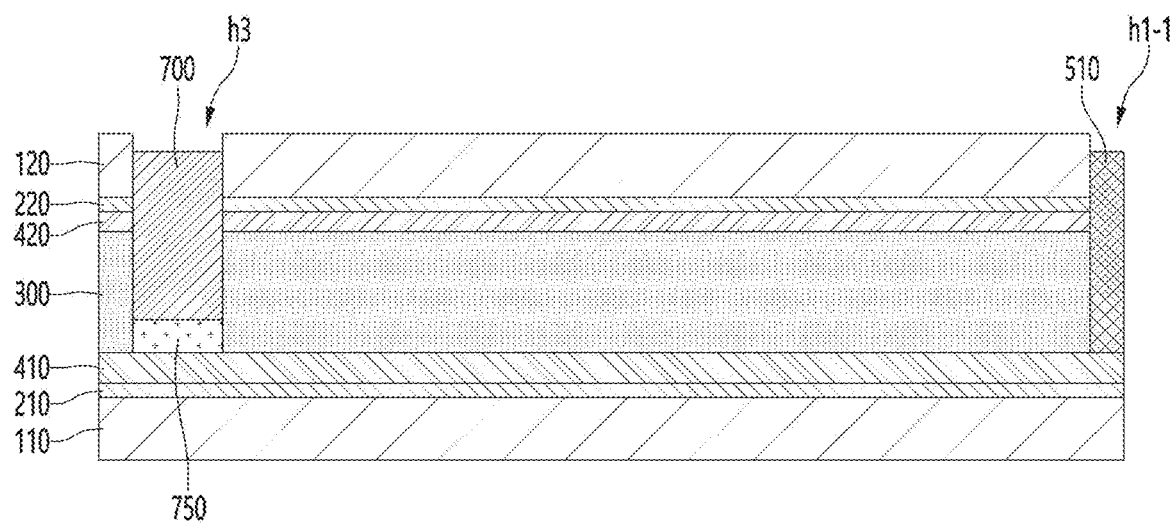
FIG. 30 is a cross-sectional view taken along line M-M' in FIG. 26.

FIG. 30 is a cross-sectional view taken along line M-M' in FIG. 26. That is, FIG. 30 is a cross-sectional view taken the second connection region CA2 disposed on the second protrusion PA2 in the second direction.

Referring to FIG. 30, a second connection region CA2 may be disposed on the second protrusion PA2, and a third cutting portion h3 may be formed in the second connection region CA2. An electrode connection portion 700 including a conductive material may be disposed inside the third cutting portion h3.

The third cutting portion h3 may pass through the second substrate 120, the second electrode 220, and the buffer layer 420. In addition, the third cutting portion h3 may partially pass through the optical conversion unit 300.

Accordingly, the third cutting portion h3 may be formed to expose the optical conversion unit 300. Therefore, the electrode connection portion 700 disposed inside the third cutting portion h3 may be disposed to be spaced apart from the adhesive layer 410.

In addition, an insulating layer 750 disposed between the electrode connection portion 700 and the adhesive layer 410 may be disposed inside the third cutting portion h3.

When the electrode connection portion 700 and the adhesive layer 410 are disposed to be spaced apart from each other, and the insulating layer 750 disposed between the electrode connection portion 700 and the adhesive layer 410 is disposed, it is possible to inhibit the electrode connection portion 700 from being electrically connected to the first electrode 210 by the dielectric constant of the adhesive layer 410.

Therefore, restrictions on material selection of the adhesive layer 410 may be reduced, and an electric short by the dielectric constant of the adhesive layer 410 may be inhibited, thereby improving driving characteristics and reliability of the optical path control member.

In the optical path control member according to the third embodiment, the first protrusion of the first substrate and the second protrusion of the second substrate may be disposed to overlap each other.

Accordingly, in the process of manufacturing the optical path control member, defects due to a bonding process may be inhibited, and process efficiency may be improved.

In addition, the adhesive layer is spaced apart from the electrode connection portion disposed inside the third cutting portion which is the second connection region, and the insulating layer is disposed between the electrode connection portion and the adhesive layer, so that it is possible to inhibit the electrode connection portion from being electrically connected to the first electrode by the dielectric constant of the adhesive layer.

Therefore, a material of the adhesive layer may be freely selected and an electric short by the dielectric constant of the adhesive layer may be inhibited, thereby improving the driving characteristics and reliability of the optical path control member.

Hereinafter, an optical path control member according to a fourth embodiment will be described with reference to FIGS. 31 to 39.

In the description of the optical path control member according to the fourth embodiment, descriptions of the same as or similar to those of the optical path control member according to the first, second, and third embodiments described above will be omitted, and the same reference numerals will be assigned to the same components. In addition, the optical path control member according to the fourth embodiment may be applied in combination with the optical path control member according to the first, second, and third embodiments described above.

Referring to FIGS. 31 to 39, the optical path control member according to the fourth embodiment may include a first substrate 110, a second substrate 120, a first electrode 210, a second electrode 220, and optical conversion unit 300.

A cutting portion may be formed on the second substrate 120. In detail, the second substrate 120 may include a plurality of cutting portions.

Figure 31:
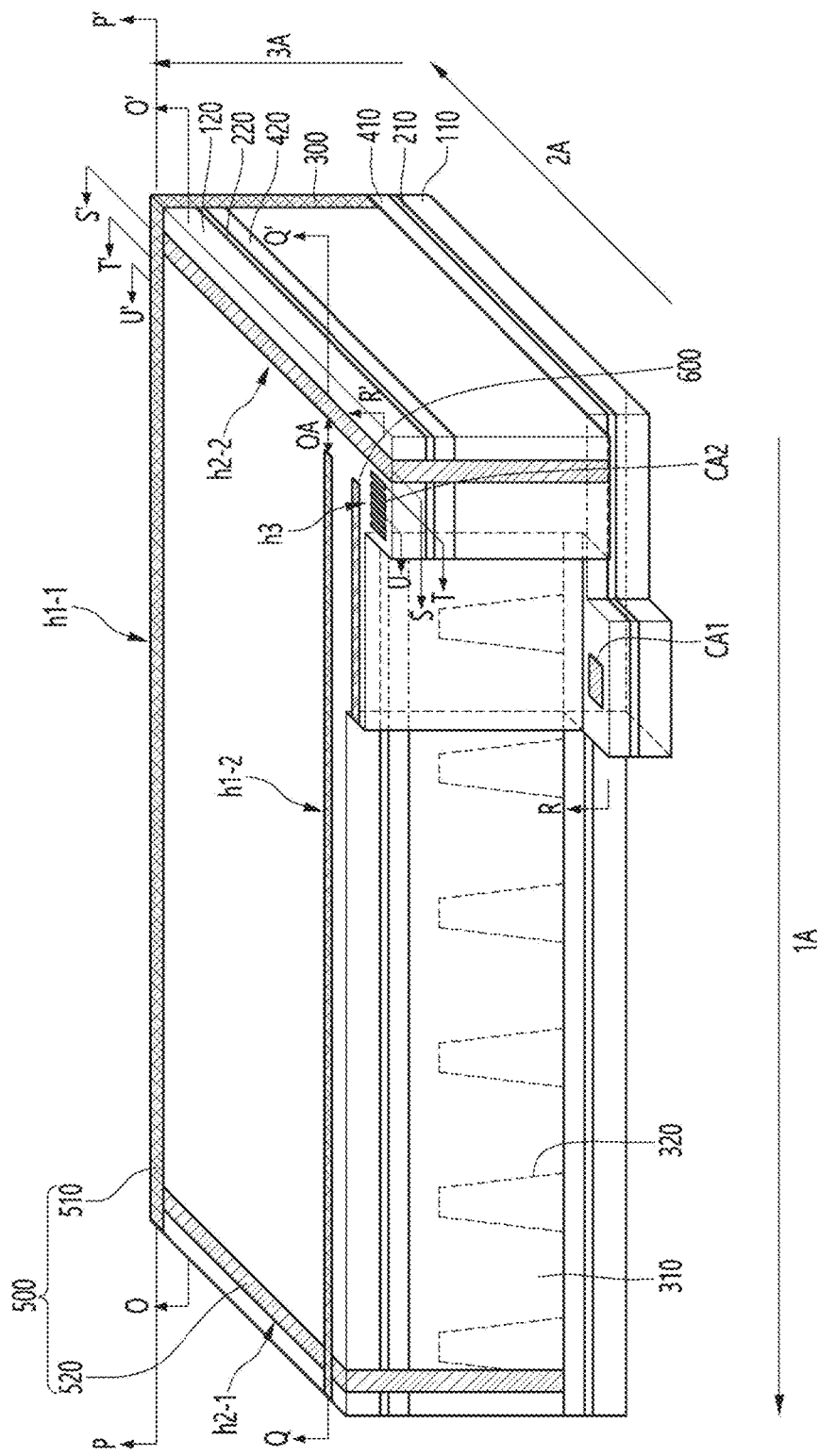
FIG. 31 is a perspective view of an optical path control member according to a fourth embodiment.
Figure 32:
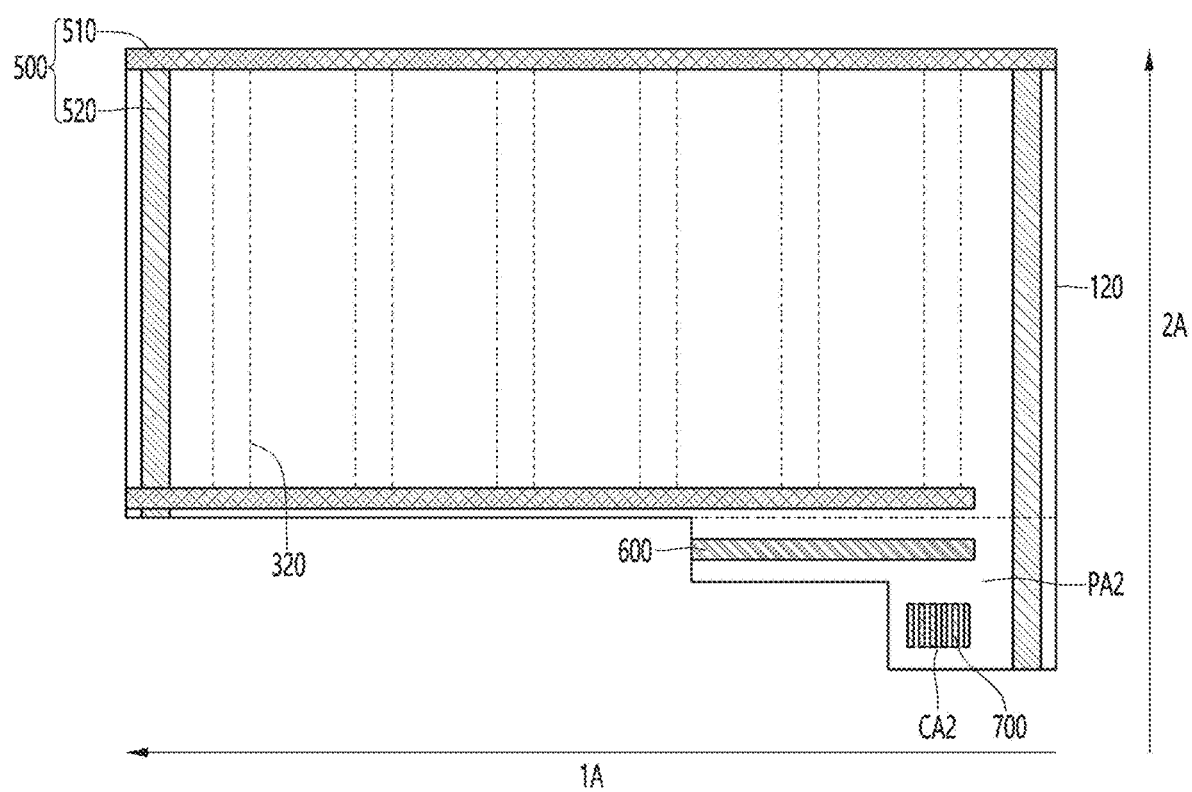
FIG. 32 is a top view of a second substrate of the optical path control member according to the fourth embodiment.
Figure 33:
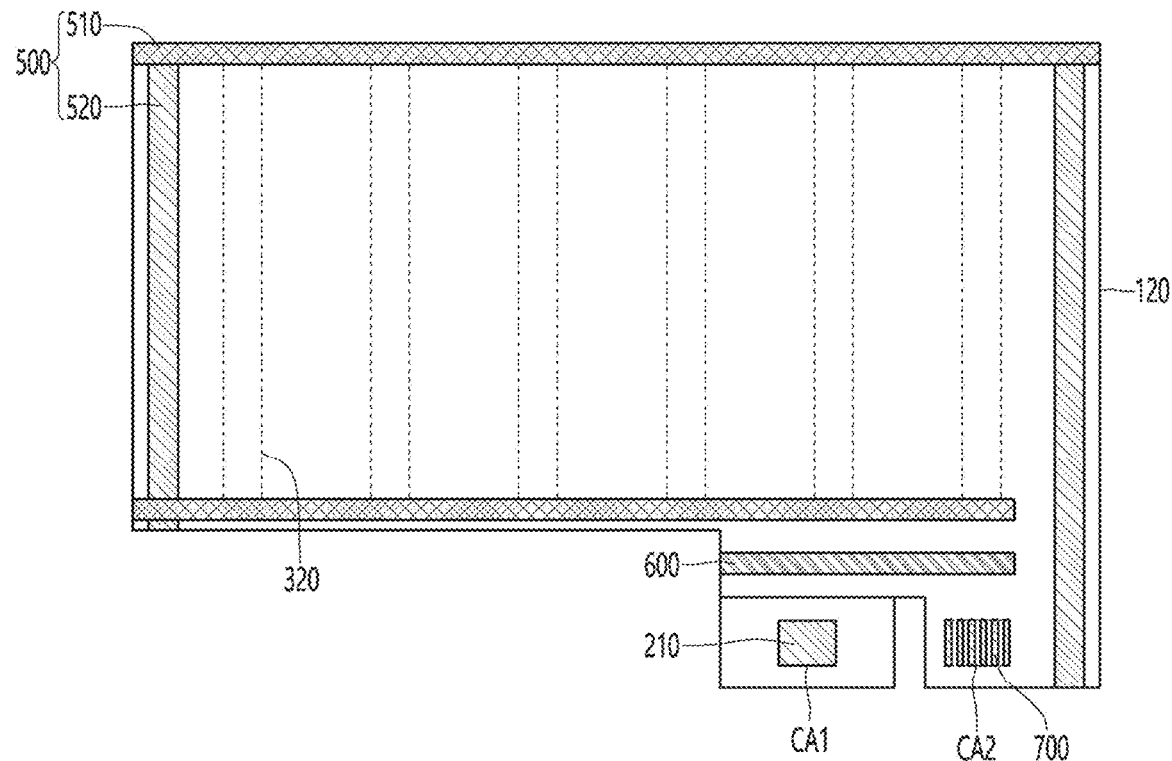
FIG. 33 is a top view of the second substrate in which the first and second substrates of the optical path control member are laminated according to the fourth embodiment.
Figure 34:
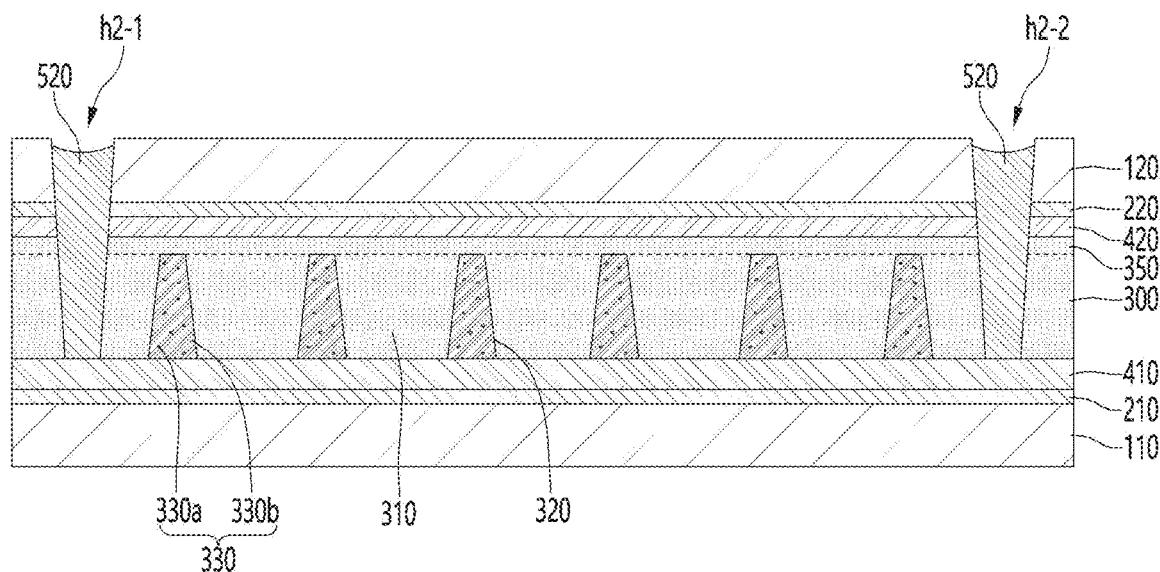
FIGS. 34 and 35 are cross-sectional views taken along line O-O' in FIG. 31.

Referring to FIG. 31, the second substrate 120 may include a 1-1 cutting portion h1-1, a 1-2 cutting portion h1-2, a 2-1 cutting portion h2-1, and a 2-2 cutting portion h2-2.

In the optical path control member according to the fourth embodiment, unlike the optical path control member according to the first to third embodiments described above, the 2-1 cutting portion h2-1 and the 2-2 cutting portion h2-2 may be formed up to a depth exposing one surface of the insulating layer 410.

A second sealing portion 520 may be disposed on the outermost side of the optical path control member. In detail, the second sealing portion 520 extending in the second direction 2A and disposed to face each other may be disposed on the outermost side of the optical path control member in the first direction 1A.

The second sealing portion 520 may be disposed inside the cutting portions described above. In detail, the second sealing portion 520 may be disposed inside the 2-1 cutting portion h2-1 and the 2-2 cutting portion h2-2.

That is, the 2-1 cutting portion h2-1 and the 2-2 cutting portion h2-2 may be formed to sequentially pass through the second substrate 120, the second electrode 220, the buffer layer 420, and the optical conversion unit 300 including the base portion 350 and the partition wall portion 310, and the second sealing portion 520 may be formed by disposing the sealing material inside the 2-1 cutting portion h2-1 and the 2-2 cutting portion h2-2.

That is, one surface of the partition wall portion 310 or the adhesive layer 410 may be exposed through the 2-1 cutting portion h2-1 and the 2-2 cutting portion h2-1, and the second sealing portion 520 may be disposed in contact with the adhesive layer 410.

The second sealing portion 520 may be disposed in contact with a side surface of the second substrate 120. In addition, the second sealing portion 520 may be disposed in contact with a side surface of the second electrode 220. In addition, the second sealing portion 520 may be disposed in contact with a side surface of the buffer layer 420. In addition, the second sealing portion 520 may be disposed in contact with a side surface of the base portion 350. In addition, the second sealing portion 520 may be disposed in contact with a side surface of the partition wall portion 310.

The second sealing portion 520 may be disposed on a side surface of the optical path control member, that is, a side surface in the second direction 2A, to inhibit impurities that may penetrate from the outside from penetrating into the optical conversion unit 300.

The second sealing portion 520 may be disposed to completely fill the 2-1 cutting portion h2-1 and the 2-2 cutting portion h2-2 or may be disposed to have a height lower than depths of the 2-1 cutting portion h2-1 and the 2-2 cutting portion h2-2. Accordingly, as shown in FIGS. 5 and 6, an upper surface of the second sealing portion 520 may be disposed to have a height lower than an upper surface of the second substrate 120. That is, a step may be formed between the upper surface of the second sealing portion 520 and the upper surface of the second substrate 120. In addition, the upper surface of the second sealing portion 520 may be formed in a concave shape.

The 2-1 cutting portion h2-1 and the 2-2 cutting portion h2-2 may be disposed to have different lengths. In detail, a length of the 2-2 cutting portion h2-2 in the second direction 2A may be greater than a length of the 2-1 cutting portion h2-1 in the second direction 2A.

The 2-2 cutting portion h2-2 may be disposed to extend to the second protrusion PA2 of the second substrate 120, and accordingly, the 2-2 cutting portion h2-2 may be disposed. The length of may be disposed to be greater than that of the second-first cutting portion h2-1.

Accordingly, a length of the second sealing portion 520 disposed inside the 2-1 cutting portion h2-1 and the 2-2 cutting portion h2-2 may also vary. That is, a length of the second sealing portion 520 disposed inside the 2-2 cutting portion h2-2 may be greater than that of the second sealing portion 520 disposed in the 2-1 cutting portion h2-1.

A first sealing portion and a second sealing portion may be disposed inside the 1-1 cutting portion, the 1-2 cutting portion, the 2-1 cutting portion, and the 2-2 cutting portion, respectively.

The first sealing portion and the second sealing portion may be disposed to seal an inlet and an outlet of the accommodating portion for accommodating the optical conversion material and may be disposed to extend along a side surface region of the optical conversion unit, that is, a side surface region in the first direction.

Accordingly, it is possible to inhibit the optical conversion material inside the accommodating portion from flowing out to the outside of the optical conversion unit by the first sealing portion, and it is possible to inhibit impurities from penetrating into the optical conversion unit from the outside by the first sealing portion and the second sealing portion, thereby improving the reliability of the optical path control member.

In addition, since the first sealing portion and the second sealing portion are disposed inside the cutting portions formed on the second substrate, as compared with the formation of the first sealing portion and the second sealing portion outside the optical conversion unit, the size of the optical path control member may be reduced, and sealing characteristics of the optical path control member may be improved by inhibiting the sealing portion material from being denatured by an external environment.

FIGS. 38 to 42 are various cross-sectional views taken along line R-R' in FIG. 31. That is, FIGS. 38 to 42 are cross-sectional views taken along protrusion regions of the first substrate and the second substrate.

Referring to FIGS. 38 to 42, a first protrusion PA1 of the first substrate 110 and a second protrusion PA2 of the second substrate 120 may be disposed to be spaced apart from each other. That is, the first protrusion PA1 of the first substrate 110 and the second protrusion PA2 of the second substrate 120 may be disposed to be spaced apart from each other in the first direction 1A.

Accordingly, the first connection region CA1 disposed on the first protrusion PA1 and the second connection region CA2 disposed on the second protrusion PA2 are physically spaced apart from each other, so that it is possible to inhibit the first connection region CA1 and the second connection region CA2 from being electrically connected to each other through the adhesive layer.

The first connection region CA1 may be disposed on the first protrusion PA1. The first electrode 210 may be exposed in the first connection region CA1. That is, the first electrode 210 on the first substrate 110 may be exposed by partially etching the adhesive layer 410 on the first protrusion PA1, and accordingly, an upper surface of the first electrode 210 may be exposed in the first connection region CA1. That is, the first electrode 210 exposed in the first connection region CA1 may be a first connection electrode that is connected to an external printed circuit board or a flexible printed circuit board.

In addition, the second connection region CA2 may be disposed on the second protrusion PA2. A third cutting portion h3 may be formed in the second connection region CA2. In detail, a plurality of third cutting portions h3 may be formed in the second connection region CA2. In more detail, the plurality of third cutting portions h3 disposed to be spaced apart from each other may be formed in the second connection region CA2.

The first connection region CA1 and the second connection region CA2 may be disposed on the same surface. Accordingly, when the same printed circuit board is connected to the first connection region CA1 and the second connection region CA2, the first connection region CA1 and the second connection region CA2 are disposed on the same surface, so that the first connection region CA1, the second connection region CA2, and the printed circuit board may be easily connected.

FIGS. 38 to 41 illustrates only six third cutting portions h3 disposed to be spaced apart from each other, but the embodiment is not limited thereto, and the number of the third cutting portions h3 may be less than six or more than six.

Electrode connection portions 700 including a conductive material may be disposed inside the third cutting portions h3.

The electrode connection portion 700 may include a material different from that of at least one of the first electrode 210 and the second electrode 220. In addition, a light transmittance of the electrode connection portion 700 may be smaller than that of at least one of the first electrode 210 and the second electrode 220.

For example, the electrode connection portion 700 may include a metal. In detail, the electrode connection portion 700 may include a metal paste in which metal particles are dispersed in a binder.

The electrode connection portion 700 may be disposed in contact with the side surface of the second substrate 120 inside the third cutting portion h3. In addition, the electrode connection portion 700 may be disposed in contact with the side surface of the second electrode 220 inside the third cutting portion h3. In addition, the electrode connection portion 700 may be disposed in contact with the side surface of the buffer layer 420 inside the third cutting portion h3. In addition, the electrode connection portion 700 may be disposed in contact with the side surface of the base portion 350 inside the third cutting portion h3. In addition, the electrode connection portion 700 may be disposed in contact with the side surface of the partition wall portion 310 inside the third cutting portion h3.

That is, the electrode connection portion 700 may be disposed in contact with at least one side surface of the second substrate 120, the second electrode 220, the buffer layer 420, the base portion 350, and the partition wall portion 310.

Figure 38:
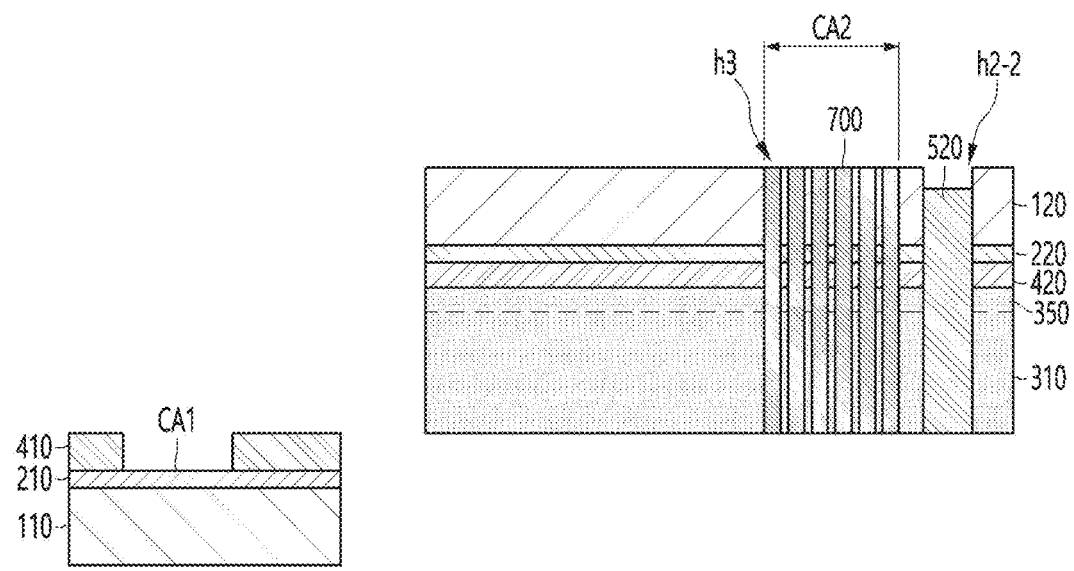
FIGS. 38 to 42 are various cross-sectional views taken along line R-R' in FIG. 31.

For example, referring to FIG. 38, the third cutting portion h3 may be formed to pass through all of the second substrate 120, the second electrode 220, the buffer layer 420, the base portion 350, and the partition wall portion 310.

Accordingly, the electrode connection portion 700 may be disposed in contact with the side surface of the second substrate 120, the side surface of the second electrode 220, the side surface of the buffer layer 420, the side surface of the base portion 350, and the side surface of the partition wall portion 310 inside the third cutting portion h3.

Figure 39:
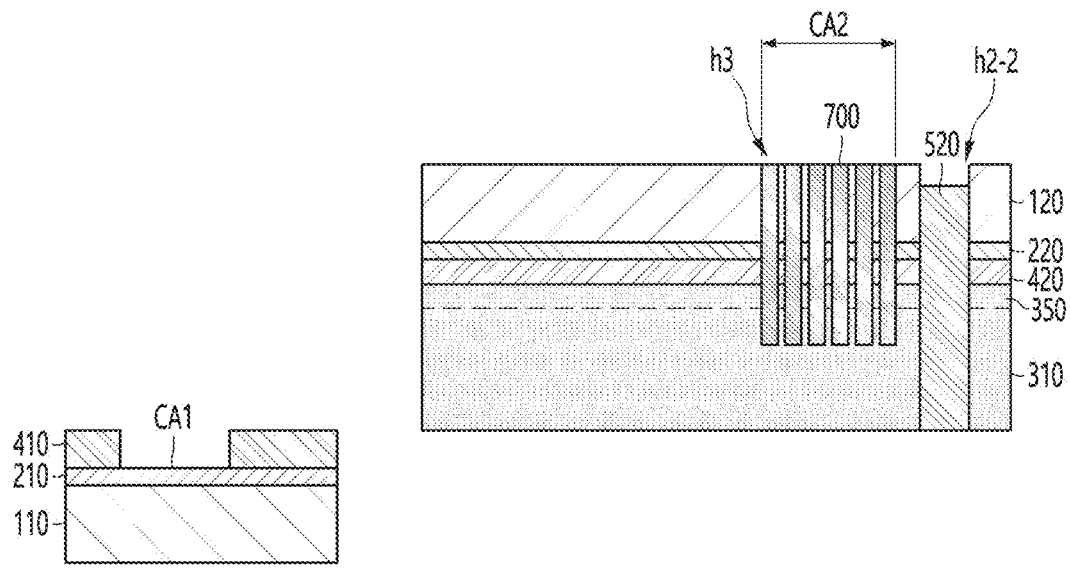

Alternatively, referring to FIG. 39, the third cutting portion h3 may be formed to pass through the second substrate 120, the second electrode 220, the buffer layer 420, and the base portion 350. That is, the third cutting portion h3 may not be formed in the partition wall portion 310 or may be formed by removing only a part of the partition wall portion 310.

Accordingly, the electrode connection portion 700 may be disposed in contact with the side surface of the second substrate 120, the side surface of the second electrode 220, the side surface of the buffer layer 420, and the side surface of the base portion 350 inside the third cutting portion h3.

The upper surface of the electrode connection portion 700 may be disposed on the same plane as the upper surface of the second substrate 120 or may be lower. For example, the upper surface of the electrode connection portion 700 may be disposed on the same plane as the upper surface of the second substrate 120. Alternatively, as shown in FIG. 8, the upper surface of the electrode connection portion 700 may be disposed lower than the upper surface of the second substrate 120.

Accordingly, the upper surface of the electrode connection portion 700 and the upper surface of the second substrate 120 may be formed on the same plane without a step, or may be disposed with a step such that the upper surface of the electrode connection portion 700 is lower.

Accordingly, it is possible to inhibit the overall thickness of the optical path control member from increasing due to the height of the electrode connection portion 700, thereby reducing the overall thickness of the optical path control member.

The electrode connection portion 700 may be electrically connected to the second electrode 220 and may be exposed to the outside of the second substrate 120. That is, the electrode connection portion 700 may be exposed on the second protrusion portion PA2 of the second substrate 120. That is, the upper surface of the electrode connection portion 700 may be exposed in the second connection region CA2.

Accordingly, the electrode connection portion 700 exposed in the second connection region CA2 may be the second connection electrode connected to an external printed circuit board or a flexible printed circuit board.

Accordingly, the first electrode 210 and the second electrode 220 may be respectively connected to the same printed circuit board or flexible printed circuit board through the first connection electrode of the first connection region and the second connection electrode of the second connection region to be electrically connected to each other.

Alternatively, the first electrode 210 and the second electrode 220 may be respectively connected to another printed circuit board or a flexible printed circuit board through the first connection electrode of the first connection region and the second connection electrode of the second connection region to be electrically connected to each other. That is, the first connection electrode may be connected to a first circuit board, and the second connection electrode may be connected to a second circuit board different from the first circuit board.

Since the electrode connection portion 700 is disposed inside the plurality of third cutting portions rather than one cutting portion, a contact area between the electrode connection portion 700 and the second electrode 220 may be increased. Accordingly, as the contact area between the electrode connection portion and the second electrode increases, electrical connection characteristics of the second electrode, the electrode connection portion, and the printed circuit board may be improved.

Figure 40:
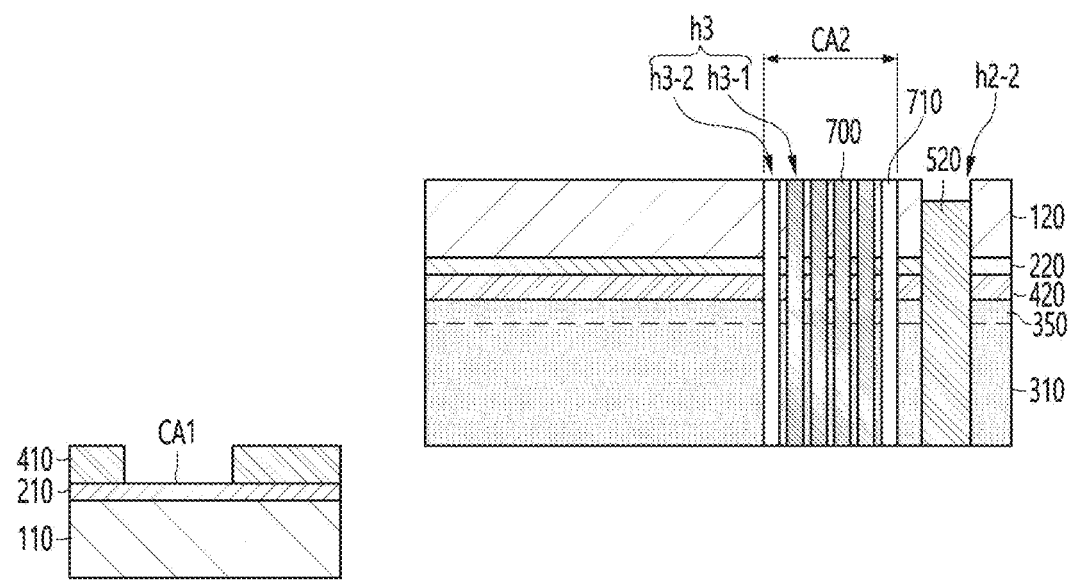

Meanwhile, referring to FIG. 40, the third cutting portion h3 may include a 3-1 cutting portion h3-1 and a 3-2 cutting portion h3-2 depending on whether the conductive material is disposed.

In detail, the third cutting portion h3 may include the 3-1 cutting portion h3-1 in which the conductive material is disposed and the 3-2 cutting portion h3-2 in which the conductive material is not disposed.

The 3-1 cutting portion h3-1 on which the conductive material is disposed may be the electrode connection portion 700. In addition, the 3-2 cutting portion h3-2 on which the conductive material is not disposed may be a dummy portion 710. In FIG. 40, the 3-2 cutting portion h3-2 is defined as a region where the conductive material is not disposed, but the embodiment is not limited thereto, and the 3-2 cutting portion h3-2 may be defined as a region where the conductive material is partially disposed.

That is, the conductive material may not be disposed on at least one of the plurality of third cutting portions h3. That is, the second connection region CA may include a non-conductive dummy portion 710.

As the second connection region CA2 includes the dummy portion 710, the printed circuit board may not be connected to a region where the conductive material is not filled or is less filled among the plurality of third cutting portions. Accordingly, electrical connection characteristics between the second connection region CA2 and the printed circuit board may be improved.

In addition, when the dummy portion 710 is disposed at both ends of the second connection region CA2, a position of the second connection region CA2 may be easily identified from the outside, and when connecting the second connection region CA2 and the printed circuit board, it is possible to minimize a connection failure due to an alignment error.

Figure 41:
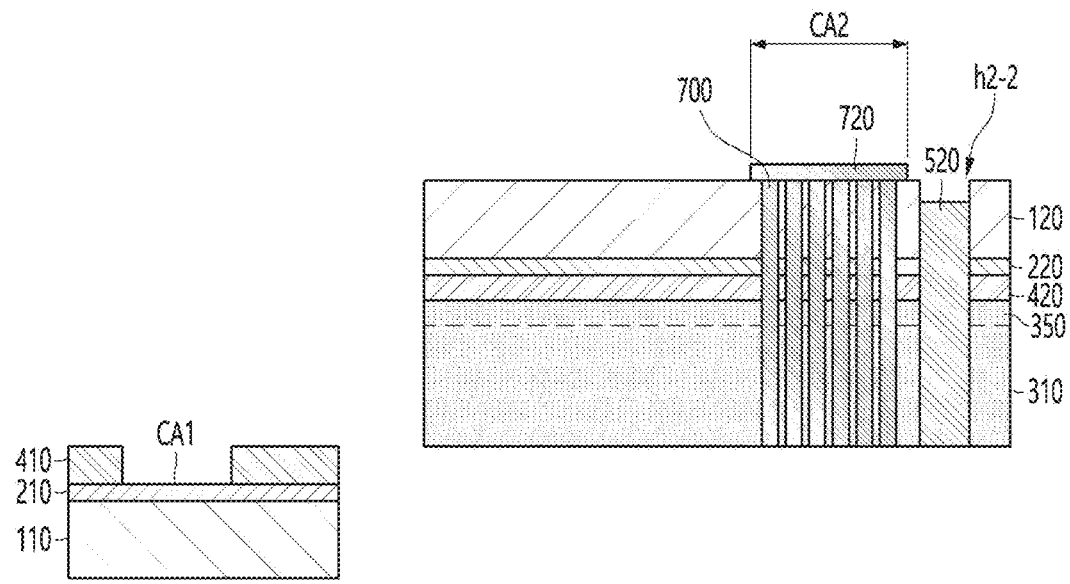

Meanwhile, referring to FIG. 41, a merging portion 720 may be disposed on the electrode connection portion 700. In detail, the merging portion 720 may be disposed on the electrode connection portion 700 to be connected to the electrode connection portions 700 disposed in the plurality of third cutting portions h3.

The merging portion 720 may include a conductive material the same as or similar to that of the electrode connection portion 700.

The electrode connection portion 700 and the printed circuit board may be easily connected by the merging portion 720. That is, when connecting the printed circuit board with the electrode connection portion disposed inside the plurality of third cutting portions, it is possible to inhibit the connection failure due to the alignment error. That is, it is possible to inhibit the printed circuit board from not being connected to the electrode connection portion disposed inside some of the plurality of third cutting portion as the alignment between the electrode connection portion and the printed circuit board is misaligned.

Therefore, the connection between the electrode connection portion 700 and the printed circuit board may be facilitated by the merging portion, and the electrical connection characteristics may be improved.

Figure 42:
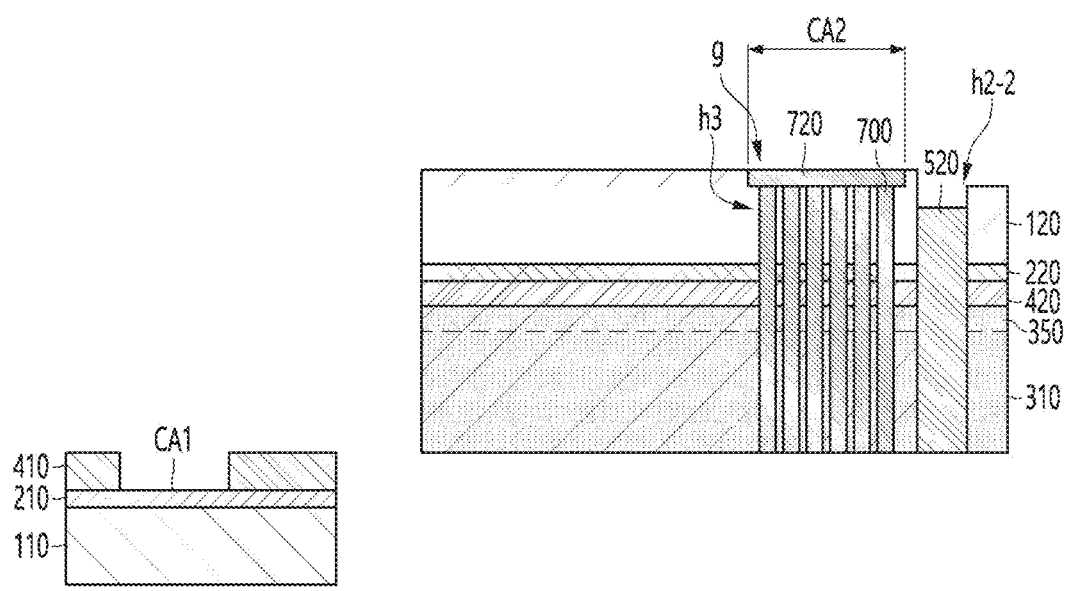

Meanwhile, referring to FIG. 42, the merging portion 720 may be disposed inside the second substrate 120. That is, the merging portion 720 may be disposed to be buried inside the second substrate 120.

That is, a groove g in which the merging portion 720 is disposed may be first formed in the second substrate 120, and the third cutting portions h3 may be disposed under the groove g.

The merging portion 720 may be disposed to be completely buried inside the second substrate 120 or may be partially protruded from the upper surface of the second substrate 120 to be buried.

Accordingly, it is possible to minimize an increase in a thickness of the optical path control member by the merging portion 720, and the merging portion 720 is safely supported inside the second substrate 120, thereby improving the reliability of the optical path control member.

In the optical path control member according to the fourth embodiment, the first connection electrode of the first connection region and the second connection electrode of the second connection region may be disposed on a first protrusion and a second protrusion formed on the first and second substrates.

The surfaces of the first and second substrates may not entirely protrude, and the first protrusion and the second protrusion may protrude only by an area in which the first connection region and the second connection electrode may be formed.

Accordingly, the areas of the first protrusion and the second protrusion may be reduced. Therefore, when the optical path control member is coupled to a display panel and applied to a display device, other components of the display device may be disposed in regions that do not correspond to the first protrusion and the second protrusion, thereby reducing a bezel region of the display device.

That is, the optical path control member according to the first embodiment reduces the size of the bezel region where the connection electrode is disposed, thereby reducing the bezel region of the display device to which the optical path control member is applied.

Figure 43:
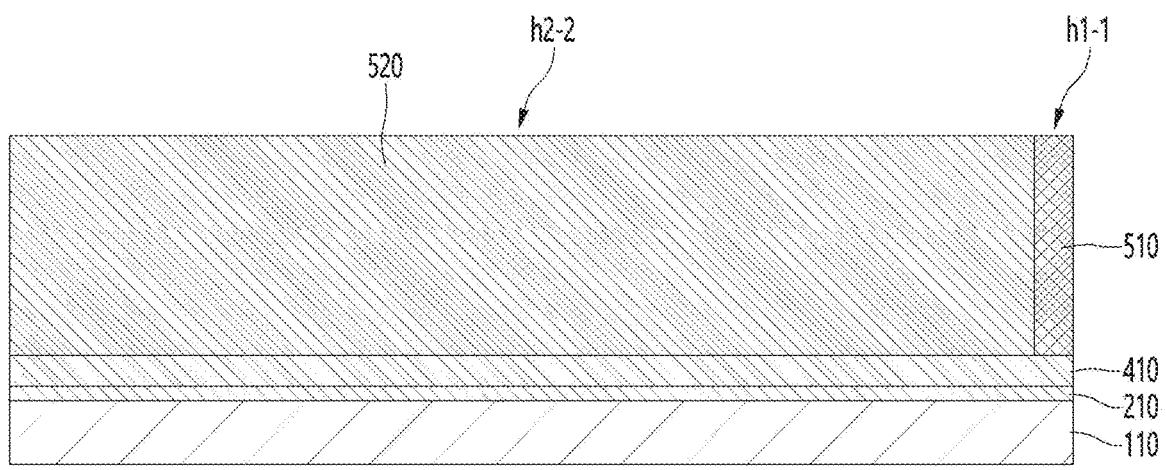
FIG. 43 is a cross-sectional view taken along line S-S' in FIG. 31.

FIG. 43 is a cross-sectional view taken along line S-S' in FIG. 31. That is, FIG. 43 is a cross-sectional view taken along both ends of the 2-2 cutting portion in the second direction.

Referring to FIG. 43, the 2-2 cutting portion h2-2 may be disposed to extend from the second protrusion PA2 of the second substrate 120 in the second direction 2A.

Referring to FIG. 43, the first-first cutting portion h1-1 and the second-second cutting portion h2-2 may be connected to each other.

Since the 1-1 cutting portion h1-1 and the 2-2 cutting portion h2-2 are connected, the first sealing portion 510 disposed on the 1-1 cutting portion h1-1 and the second sealing portion 520 disposed on the 2-2 cutting portion h2-2 may be disposed to be connected to each other.

Meanwhile, in the drawing, it is illustrated that the 2-2 cutting portion h2-2 is disposed to be spaced apart from the end of the second substrate 120 in the first direction 1A, that is, the outer surface, but the embodiment is not limited thereto, and the 2-2 cutting portion h2-2 may be formed by removing one outer surface of the second substrate 120 in the first direction 1A like the 1-1 cutting portion h1-1 described above. Accordingly, in the one outer surface of the second substrate 120 in the first direction 1A, a portion of the 2-2 second cutting portion h2-2 may be the outermost surface of the second substrate 120.

Figure 44:
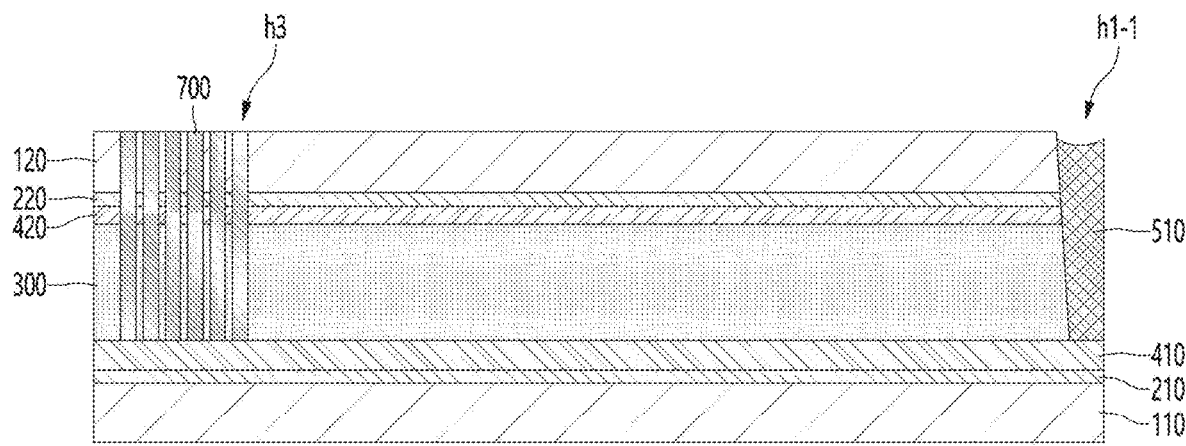
FIG. 44 is a cross-sectional view taken along line T-T' in FIG. 31.
Figure 45:
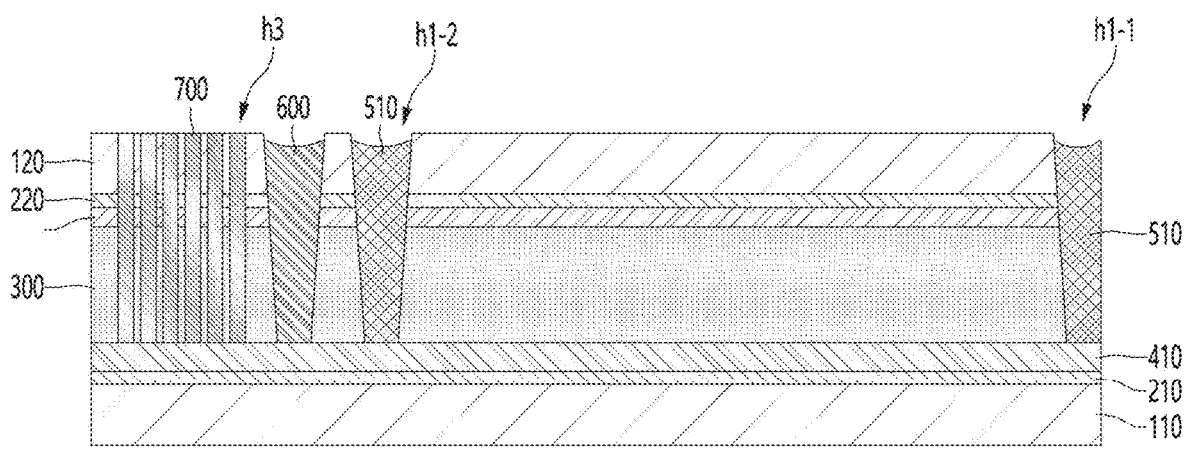
FIG. 45 is a cross-sectional view taken along line the U-U' in FIG. 31.

FIG. 44 is a cross-sectional view taken along line T-T' region in FIG. 31, and FIG. 45 is a cross-sectional view taken along line U-U' region of FIG. 31, that is, FIGS. 44 and 45 are cross-sectional views taken the second connection region CA2 disposed on the second protrusion PA2 in the second direction.

Referring to FIGS. 44 and 45, the second connection region CA2 may include a region overlapping the first sealing portion 510 and a region not overlapping the first sealing portion 510.

That is, since the 1-2 cutting portion h1-2 and the 2-2 cutting portion h2-2 are disposed to be spaced apart from each other, the second connection region CA2 may be disposed in a region overlapping the open region OA in the second direction and in a region overlapping the first sealing portion 510 disposed inside the 1-2 cutting portion h1-2.

In addition, referring to FIG. 45, a dam portion 600 may be disposed between the second connection region CA2, that is, between the electrode connection portion 700 and the first sealing portion 510. That is, the dam portion 600 may be disposed on the second protrusion PA2 between the electrode connection portion 700 and the first sealing portion 510.

The dam portion 600 may be formed by filling a dam forming material in a cutting portion passing through the second substrate 120, the second electrode 220, the buffer layer 410, and the optical conversion unit 300.

The dam portion 600 is a material that controls an injection length of the optical conversion material when the optical conversion material 330 is injected into the accommodating portion 320, and the dam portion 600 may inhibit the optical conversion material 330 from overflowing in an outer direction of the dam, that is, in a direction of the electrode connection portion 700.

A part of the dam portion 600 may be removed during the manufacturing process of the optical path control member, a part of the dam portion 600 may remain, and a part of the dam portion may remain in a region adjacent to the second connection region CA2.

Meanwhile, referring to FIG. 45, it is illustrated that the optical conversion unit 300 remains between the electrode connection portion 700 and the dam portion 600, but the embodiment is not limited thereto.

Figure 35:
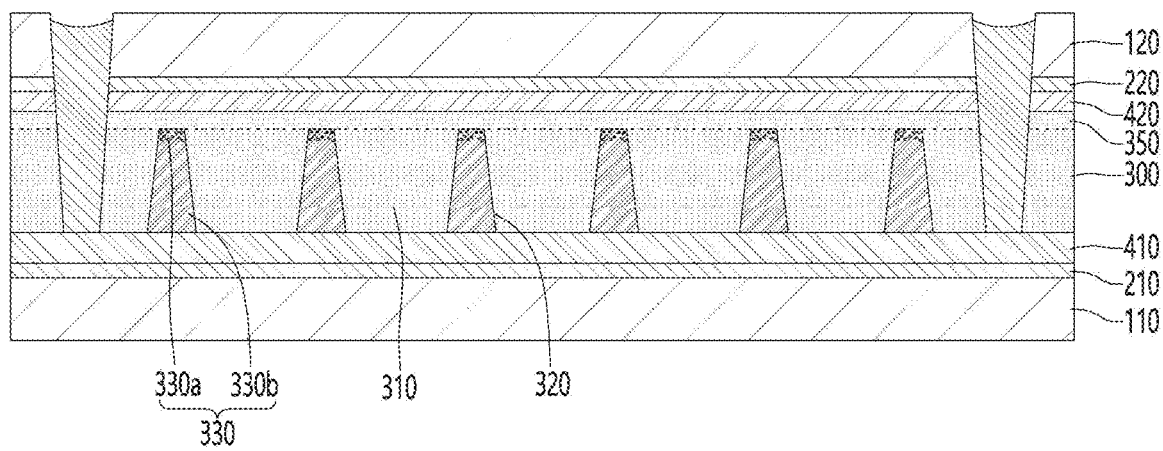
Figure 36:
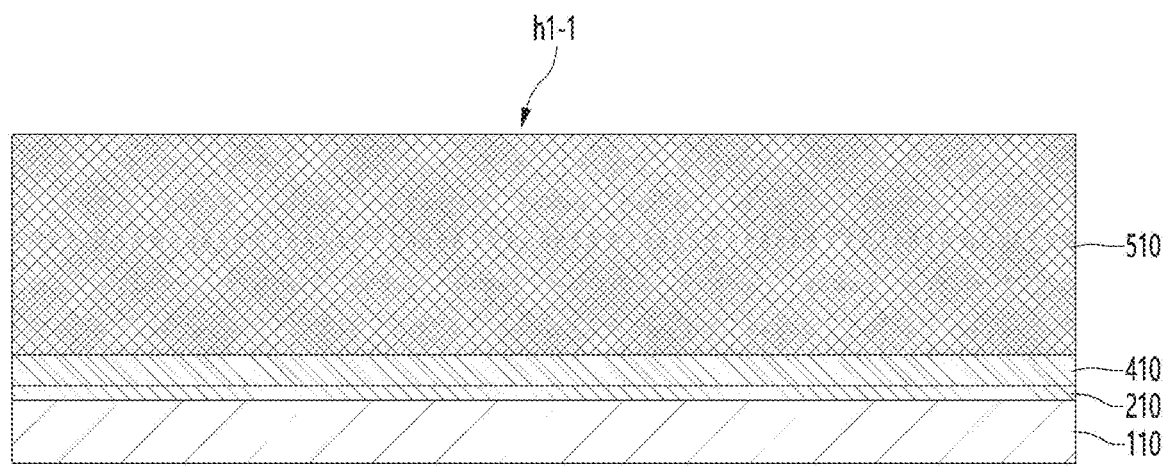
FIG. 36 is a cross-sectional view taken along line P-P' in FIG. 31.
Figure 37:
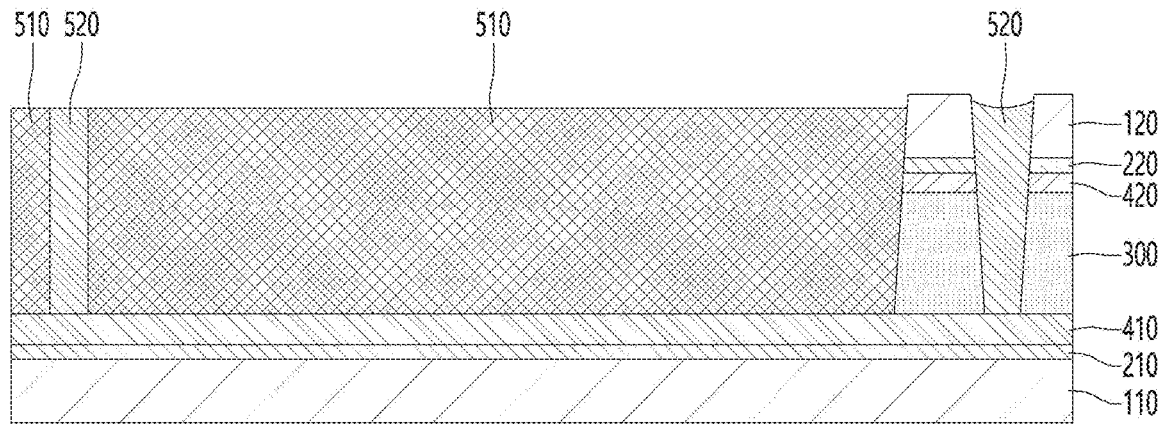
FIG. 37 is a cross-sectional view taken along line Q-Q' in FIG. 31.

That is, when the optical conversion unit 300 between the electrode connection portion 700 and the dam portion 600 is a partition wall portion 310 region, as shown in FIG. 35, the optical conversion unit 300, the buffer layer 420, the second electrode 220, and the second substrate 120 may remain between the electrode connection portion 700 and the dam portion 600.

However, when the optical conversion unit 300 between the electrode connection portion 700 and the dam portion 600 is the accommodating portion 320 region, a material of the dam portion 600 may move into the accommodating portion 320, so that the dam portion 600 and the electrode connection portion 700 may contact each other.

In addition, referring to FIG. 45, it is illustrated that the optical conversion unit 300 remains between the dam portion 600 and the first sealing portion 510, but the embodiment is not limited thereto.

That is, when the optical conversion unit 300 between the dam portion 600 and the first sealing portion 510 is the accommodating portion 320 region, the optical conversion unit 300, the buffer layer 420, the second electrode 220, and the second substrate 120 may remain between the dam portion 600 and the first sealing portion 510.

However, when the optical conversion unit 300 between the dam portion 600 and the first sealing portion 510 is the accommodating portion 320 region, materials of the first sealing portion 510 and the dam portion 600 may move into the accommodating portion 320, so that the first sealing portion 510 and the dam portion 600 may contact each other.

Hereinafter, an optical path control module according to an embodiment will be described with reference to FIGS. 46(a) and 46(b).

Figure 46A:
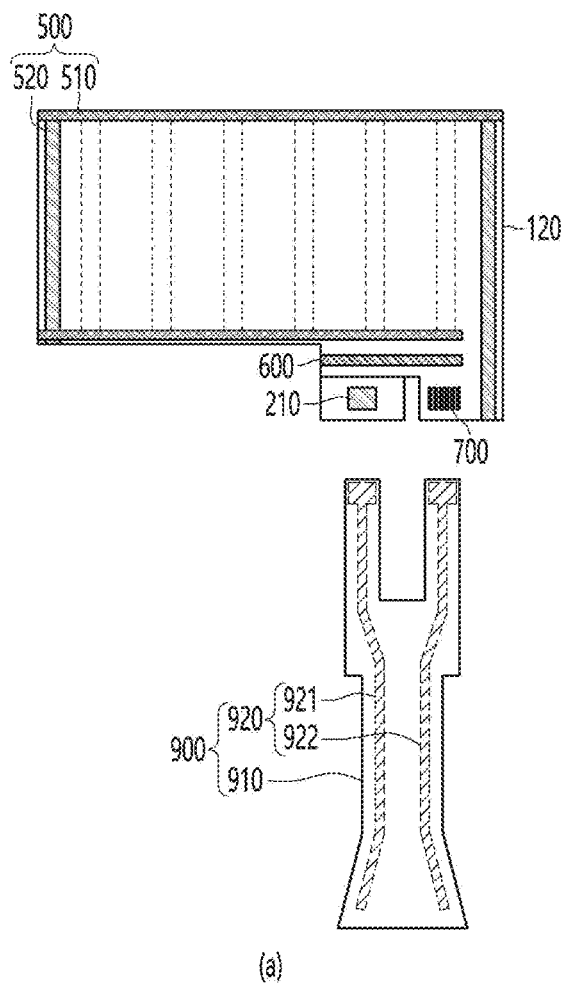
FIGS. 46(*a*) and 46(*b*) for describing an optical path control module in which an optical path control member and a printed circuit board are combined according to an embodiment.
Figure 46B:
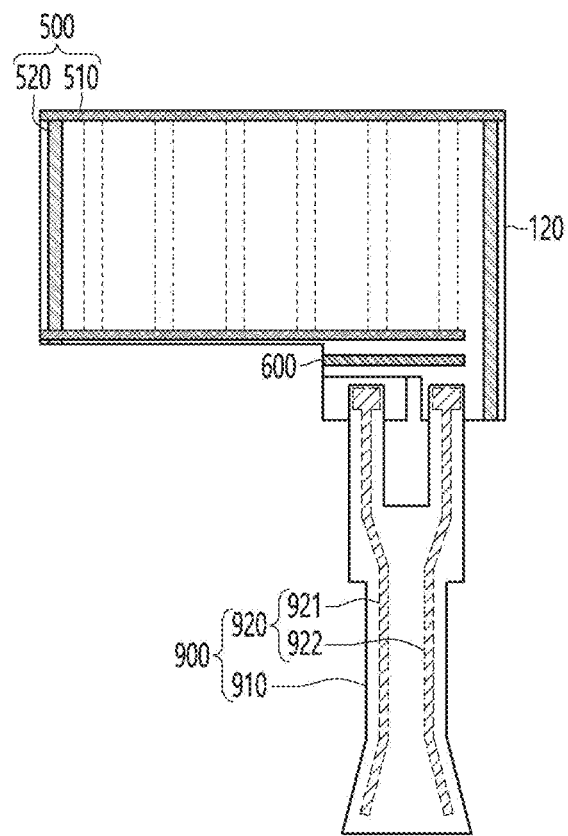

Referring to FIGS. 46(a) and 46(b), the optical path control module according to the embodiment includes the above-described optical path control member and a flexible printed circuit board (FPCB) electrically connected to the optical path control member.

Referring to FIGS. 46(a) and 46(b), the flexible printed circuit board 900 may include a substrate 910 and a wiring electrode 920 disposed on the substrate 910.

The wiring electrode 920 may include a first wiring electrode 921 and a second wiring electrode 922.

The first wiring electrode 921 and the second wiring electrode 922 may be disposed on the same substrate 910. For example, the first wiring electrode 921 and the second wiring electrode 922 may be disposed on the same surface of the substrate 910.

The first wiring electrode 921 may be connected to the first electrode 210 of the optical path control member. In addition, the second wiring electrode 922 may be connected to the second electrode 220 of the optical path control member. Accordingly, the optical path control member and the flexible printed circuit board may be electrically connected to each other.

The first electrode 210 and the second electrode 220 of the optical path control member may be disposed on the same surface.

That is, since the first electrode 210 is disposed on the upper surface of the first substrate 110, a plurality of cutting portions are formed on the second substrate 120, and the second electrode 220 is disposed on the upper surface of the second substrate 120 through the electrode connection portion, the first electrode 210 and the second electrode 220 may be disposed on the same surface of the optical path control member.

Accordingly, the optical path control member and the flexible printed circuit board may be electrically connected on one surface through one flexible printed circuit board.

In the related art, there was a problem that the first electrode and the second electrode are disposed in different directions and connected through two printed circuit boards, so that the bezel region of the optical path control module is increased, or the first electrode and the second electrode are disposed on different surfaces, so that it is difficult to connect the flexible printed circuit board and the electrode.

However, in the optical path control module according to the embodiment, since the first electrode and the second electrode are disposed on the same surface of the optical path control member and are connected to each other on the same surface using one flexible printed circuit board, it is possible to reduce the bezel region of the optical path control module while facilitating the connection between the path control member and the flexible printed circuit board.

Hereinafter, a method of manufacturing an optical path control member according to embodiments will be described with reference to FIGS. 47 to 64. In the description of the method of manufacturing the optical path controlling member according to the embodiments, descriptions of the same as or similar to those of the optical path controlling member according to the embodiments described above will be omitted, and the same reference numerals will be assigned to the same components.

Figure 47:
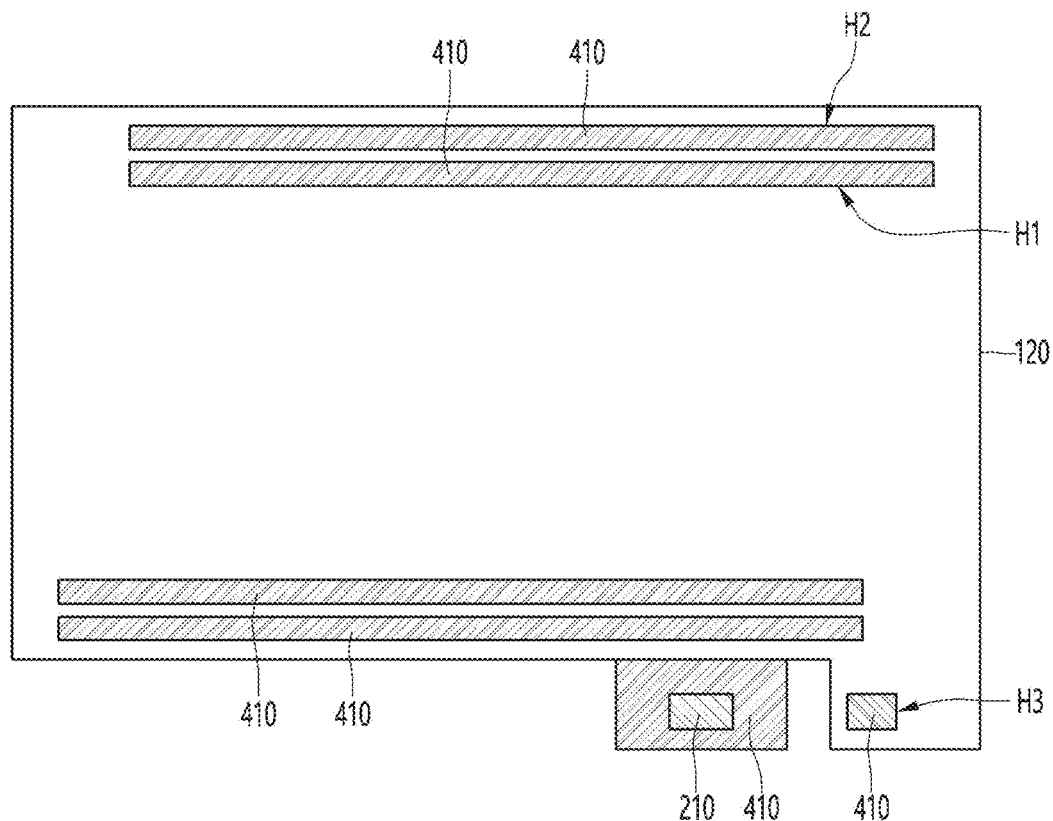
FIGS. 47 to 64 are views for describing a method of manufacturing an optical path control member according to an embodiment.
Figure 48:
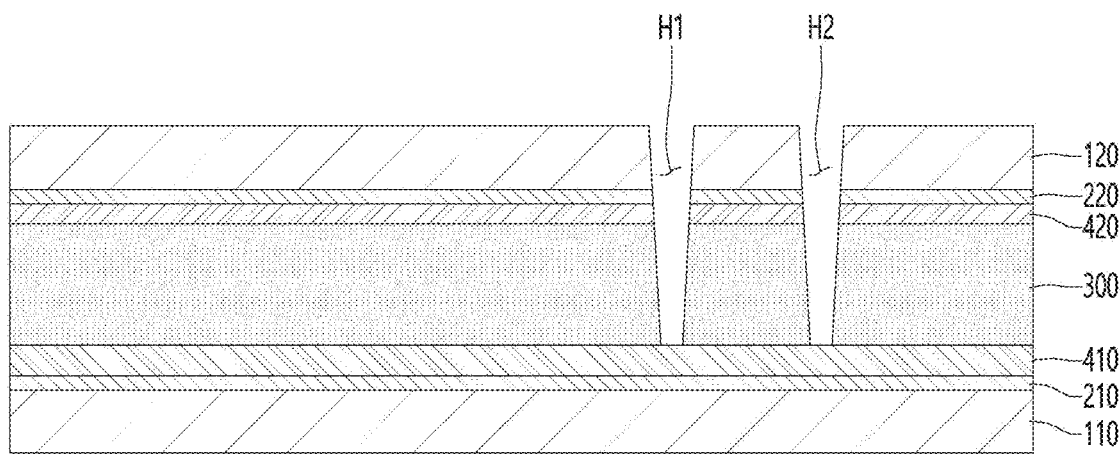

Referring to FIGS. 47 and 48, the first substrate 110 and the second substrate 120 may be adhered through the adhesive layer 410. That is, the first substrate 110 and the second substrate 120 may be adhered to each other so that the second substrate 120 is disposed on the first substrate 110.

Accordingly, one surface of the adhesive layer 410 may be exposed in a first hole H1, a second hole H2, the third cutting portion, and the first protrusion portion PA1 formed in the second substrate 120.

Figure 49:
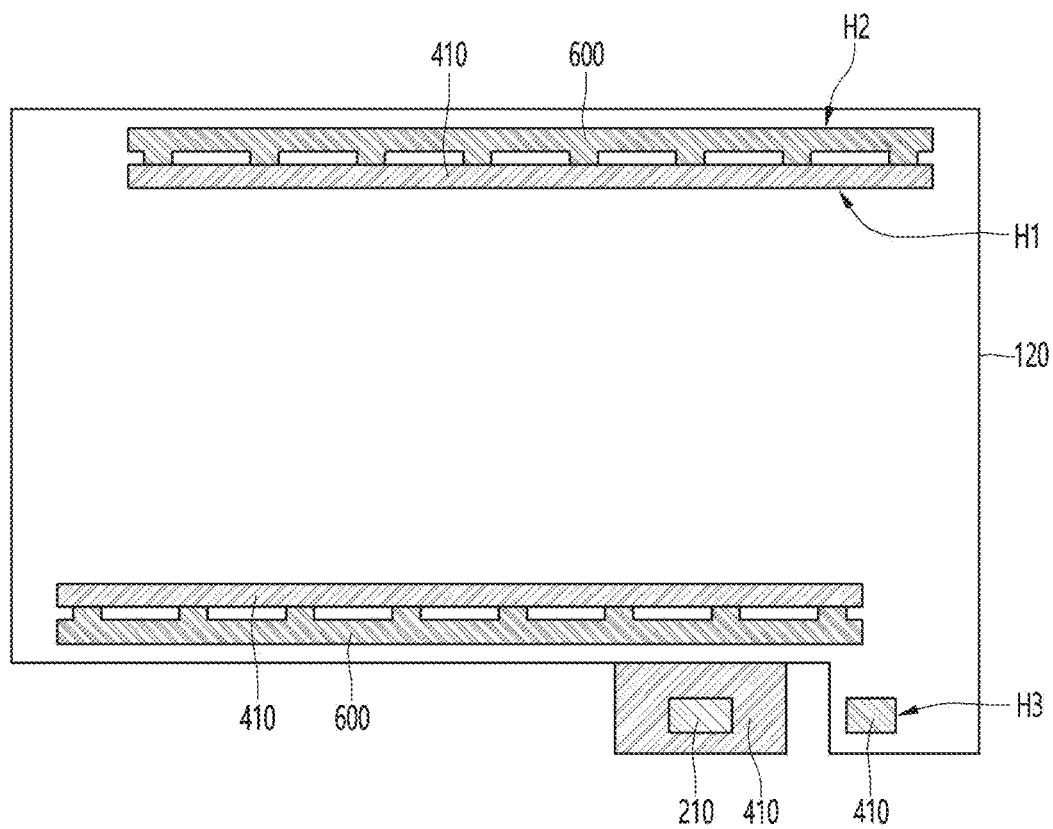
Figure 50:
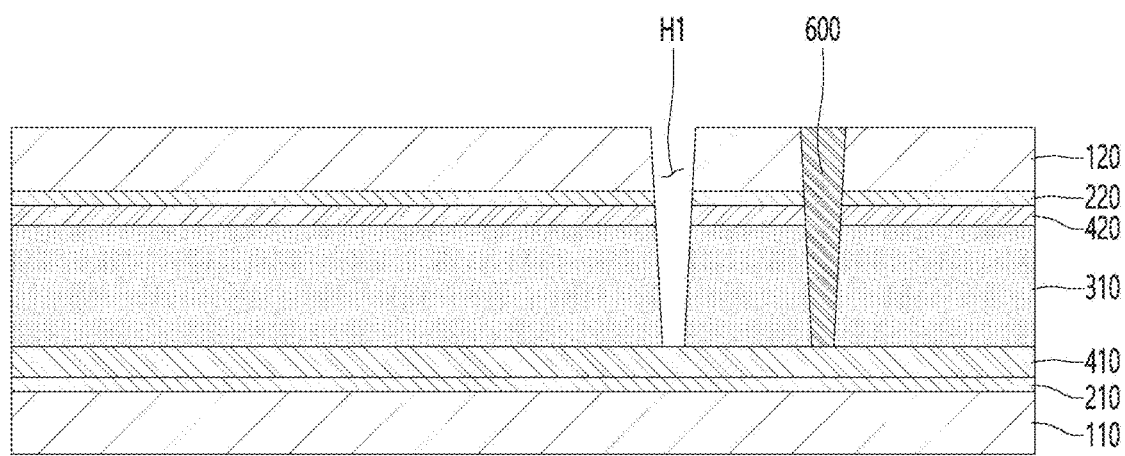

Subsequently, referring to FIGS. 49 and 50, the dam portion 600 may be formed by filling the inside of the second hole H2 with a material forming the dam portion 600.

The dam portion 600 may be partially or entirely filled along the accommodating portion 320 to a region between the first hole H1 and the second hole H2.

The dam portion 600 may include polyurethane acrylate, but the embodiment is not limited thereto.

Figure 51:
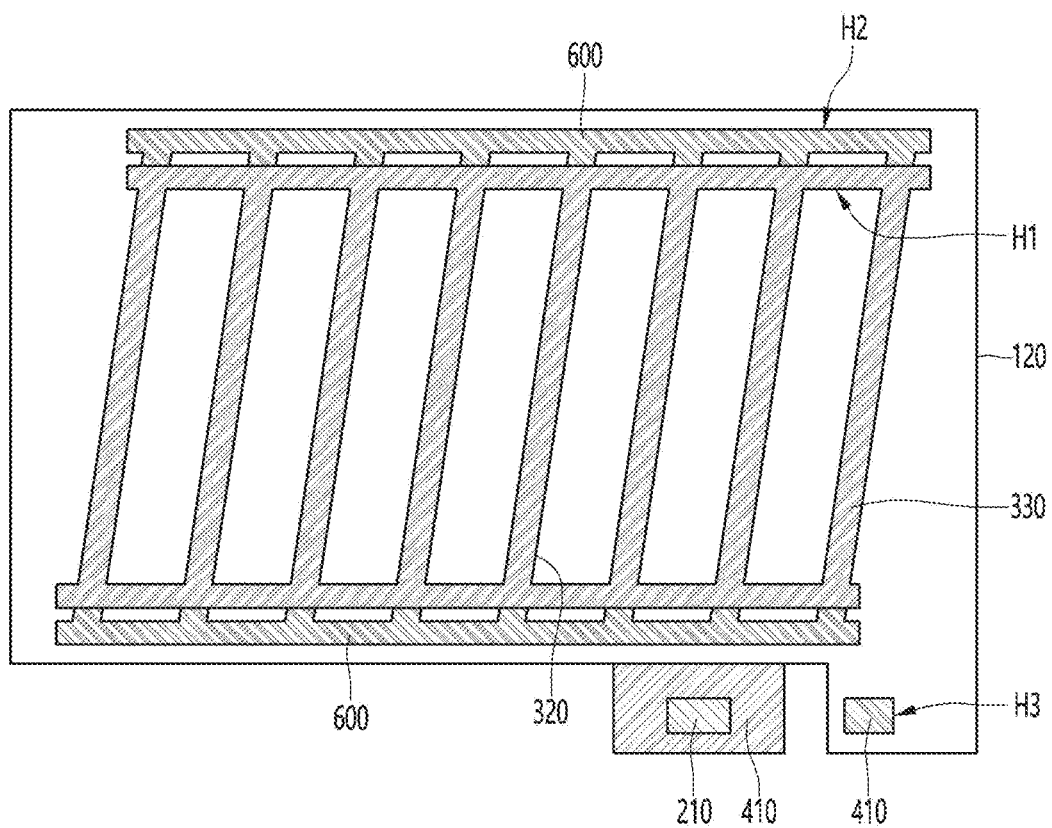
Figure 52:
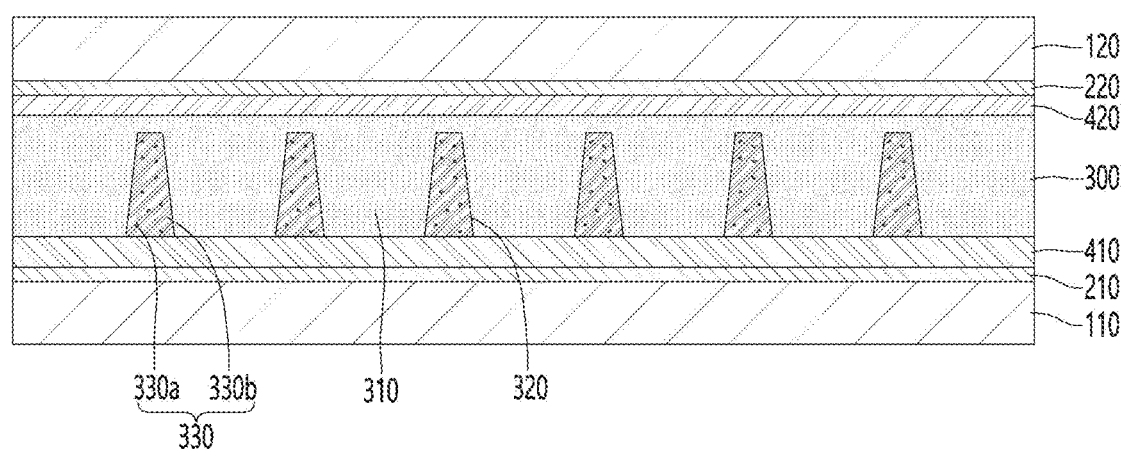

Subsequently, referring to FIGS. 51 and 52, the optical conversion material 330 including the optical conversion particles 330a and the dispersion liquid 330b may be injected into the accommodating portion 320 through the first hole H1. Accordingly, the optical conversion material 330 may be filled into the accommodating portion 320, the first hole H1, and the second hole H2.

The accommodating portion 320 may be tilted at a predetermined inclination angle with respect to the second direction 2A, and accordingly, the optical conversion material 330 may also be tilted and filled at a predetermined inclination angle.

For example, after one first hole H1 of the first holes H1 facing each other is designated as an inlet, and the other first hole H1 is designated as an outlet, an optical conversion material is dispensed into the inlet, and then the optical conversion material may be filled into the accommodating portion 320 by a capillary method of sucking the optical conversion material from the outlet.

Figure 53:
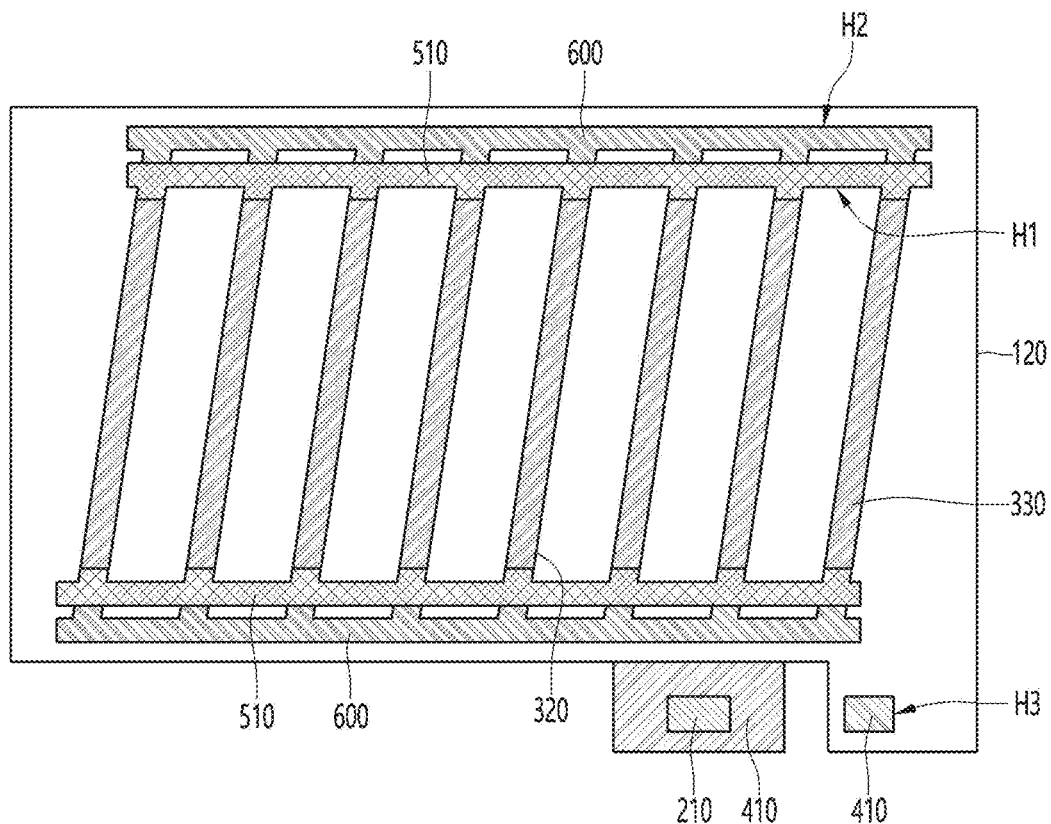
Figure 54:
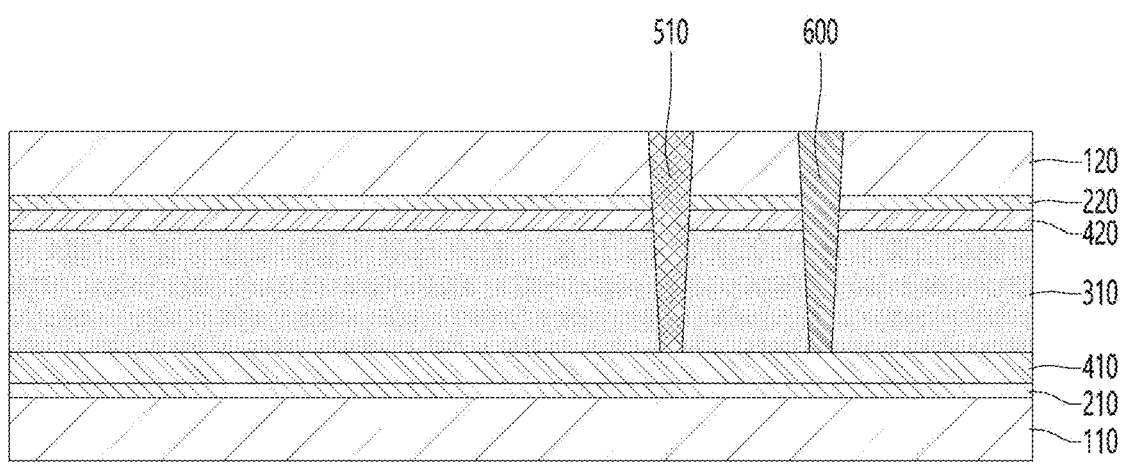

Subsequently, referring to FIGS. 53 and 54, the first sealing portion 510 may be formed by filling the inside of the first hole H1 and the second hole H2 with a sealing material.

The first sealing portion 510 may include the same material as the dam portion 600, but the embodiment is not limited thereto.

Meanwhile, in order to easily fill the sealing material into the first hole H1, a process (for example, a cleaning process) of forming an injection path of the sealing material by cleaning the inside of the first hole H1 may be additionally performed before filling the sealing material.

Meanwhile, while the first sealing portion 510 is disposed inside the first hole H1 and the second hole H2, a part of the first sealing portion 510 may move into the accommodating portion 320. Accordingly, the optical conversion material 510 and the sealing material may be disposed together in the accommodating portion 320.

Figure 55:
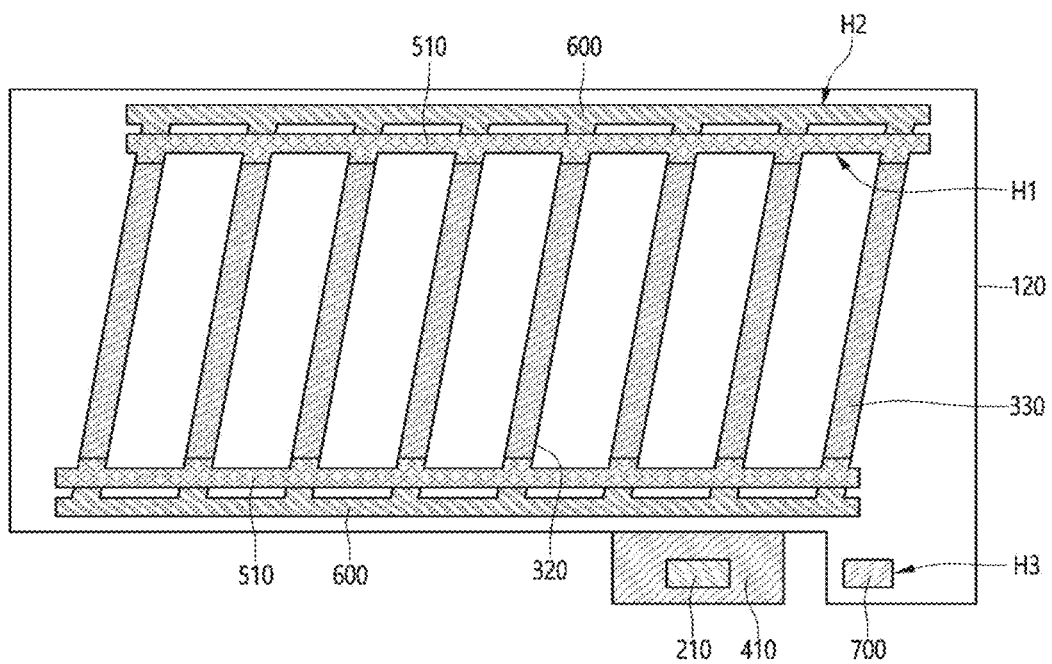
Figure 56:
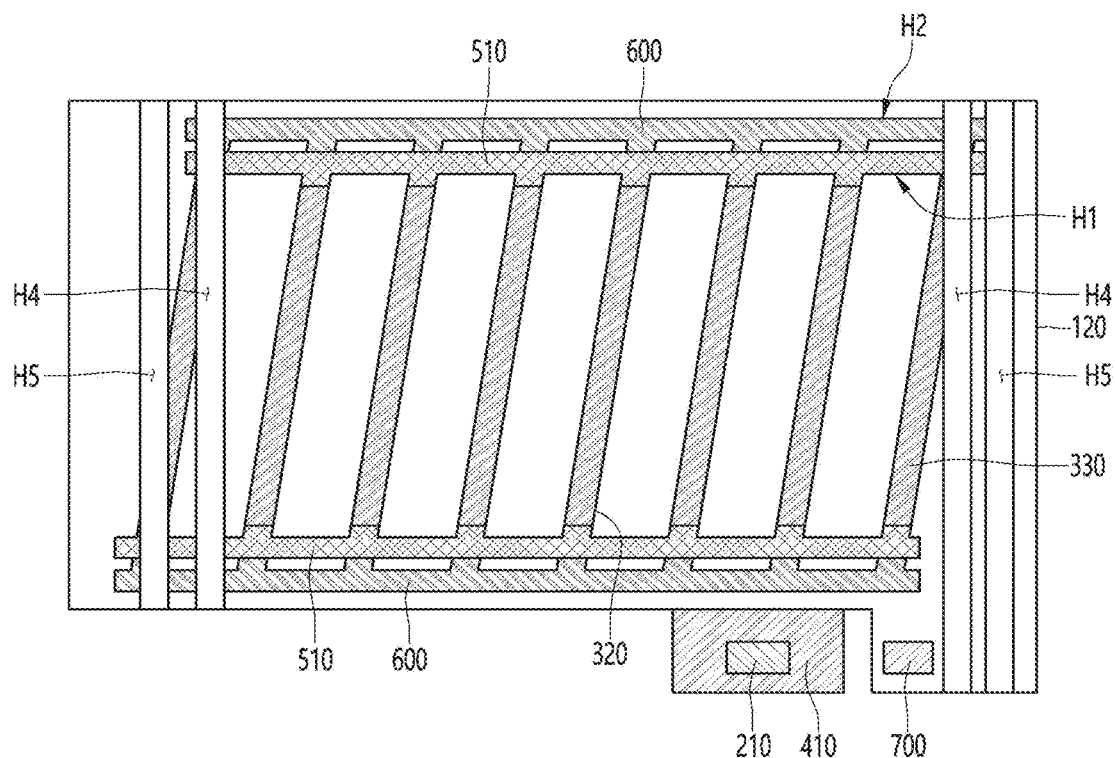

Subsequently, referring to FIG. 55, the third cutting portion h3 may be filled with a conductive material to form the electrode connection portion 700 of the second substrate 120.

The electrode connection portion 700 may be disposed in contact with the second electrode 220 inside the third cutting portion h3, thereby becoming the second connection electrode connected to the printed circuit board.

Subsequently, referring to FIGS. 56 to 59, a fourth hole H4 and a fifth hole H5 may be additionally formed. In detail, the fourth hole H4 and the fifth hole H5 forming to extend in the second direction may be formed on the second substrate 120. That is, at least one of the fourth hole H4 and the fifth hole H5 may be formed by irradiating a laser from the second substrate 120 toward the first substrate 110.

At least one of the fourth hole H4 and the fifth hole H5 may be disposed to overlap the first hole H1 and the second hole H2.

Figure 62:
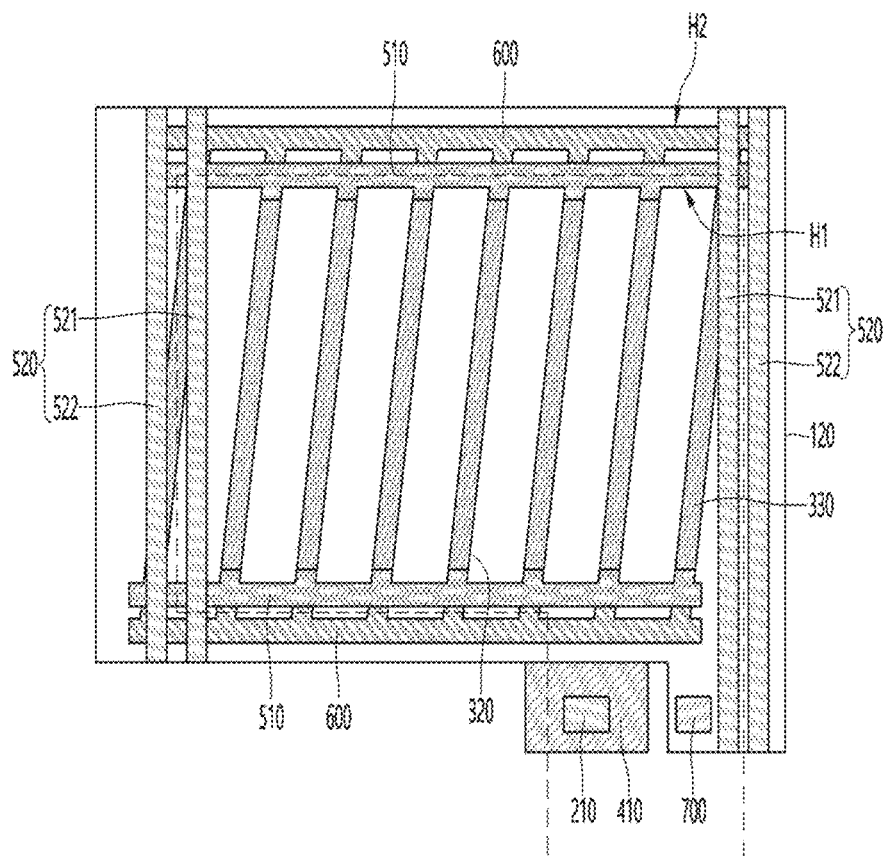

As shown in FIG. 62 below, when the cutting process is performed in order to minimize a bezel of the display or the optical path control member, only at least one of the fourth hole H4 and the fifth hole H5 may be formed in order to inhibit ink of the accommodating portion exposed in a lateral direction from flowing down.

Alternatively, the fourth hole or the fifth hole may not be formed. After performing the cutting process, in a state in which the other side of the ink of the accommodating portion of which a side surface is exposed is blocked by the first sealing portion, the optical conversion material inside the accommodating portion may not flow down to the outside of the optical path control member due to a pressure difference between atmospheric pressure inside the accommodating portion and atmospheric pressure outside the optical path control member.

However, since reliability may be deteriorated when a mode is converted several times, the mode conversion reliability of the entire optical path control member may be improved by forming the fourth hole or the fifth hole to seal the side surface of the optical path control member.

Referring to FIGS. 57 to 60, the fourth hole H4 and the fifth hole H5 may be formed to have various depths.

Figure 57:
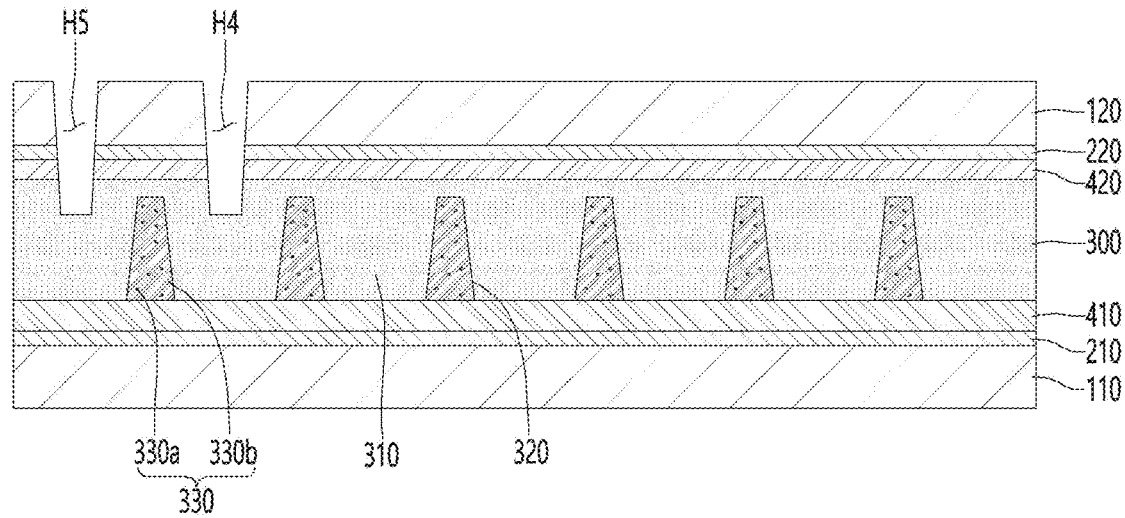

For example, referring to FIG. 57, the fourth hole H4 and the fifth hole H5 may pass through the second substrate 120, the second electrode 220, and the buffer layer 420 and may be formed by removing a part of the optical conversion unit 300.

Figure 58:
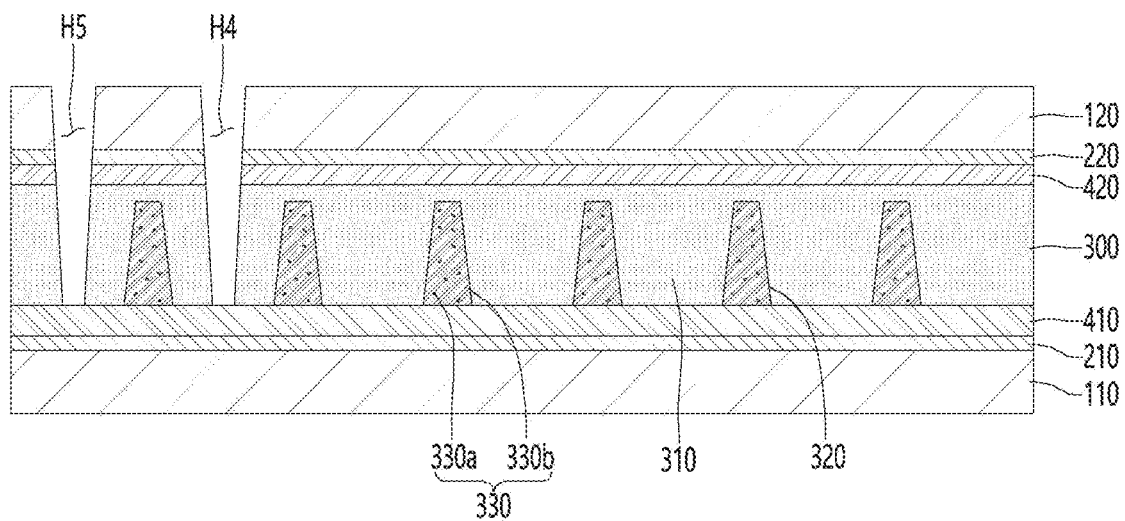

Alternatively, referring to FIG. 58, the fourth hole H4 and the fifth hole H5 may be formed to pass through the second substrate 120, the second electrode 220, the buffer layer 420, and the optical conversion unit 300.

Figure 59:
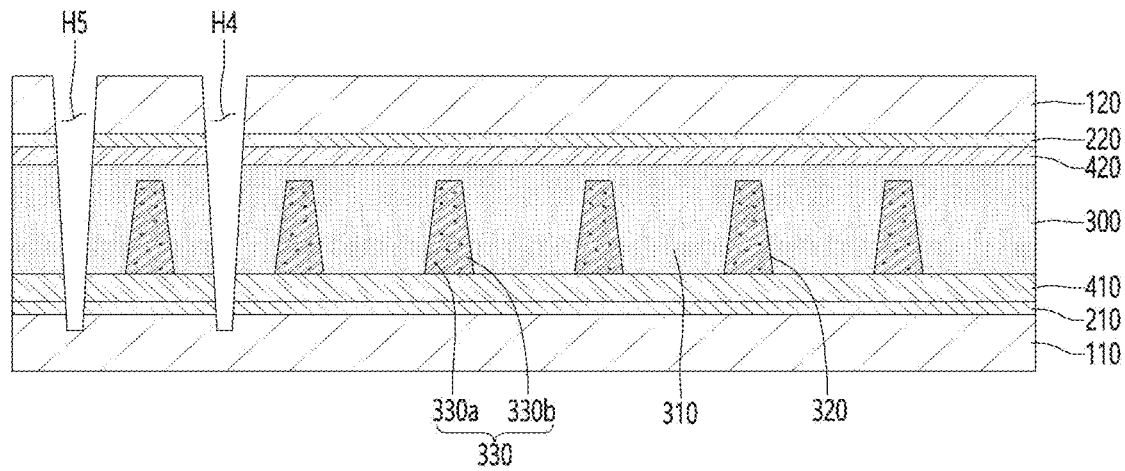

Alternatively, referring to FIG. 59, the fourth hole H4 and the fifth hole H5 may pass through the second substrate 120, the second electrode 220, the buffer layer 420, and the optical conversion unit 300, the adhesive layer 410, and the first electrode 210 and may be formed by removing a part of the first substrate 110.

It is illustrated in the drawing that the fourth hole H4 and the fifth hole H5 are formed to have the same depth as each other, but the embodiment is not limited thereto, and the fourth hole H4 and the fifth hole H5 may be formed to have different depths.

Figure 60:
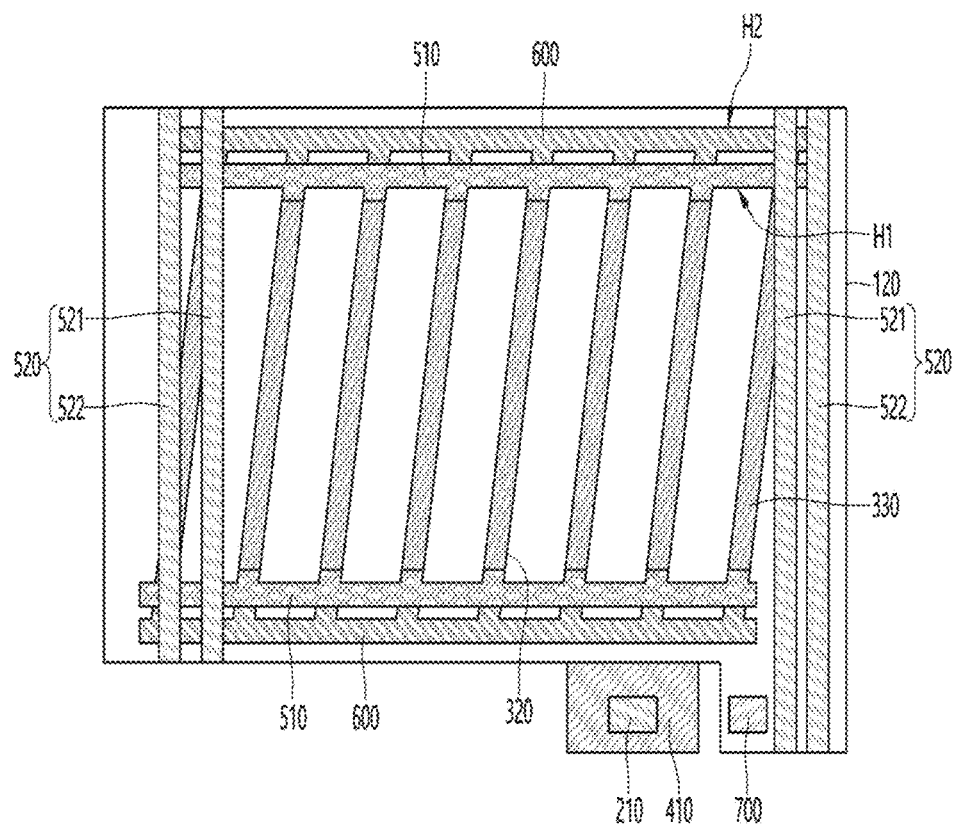
Figure 61:
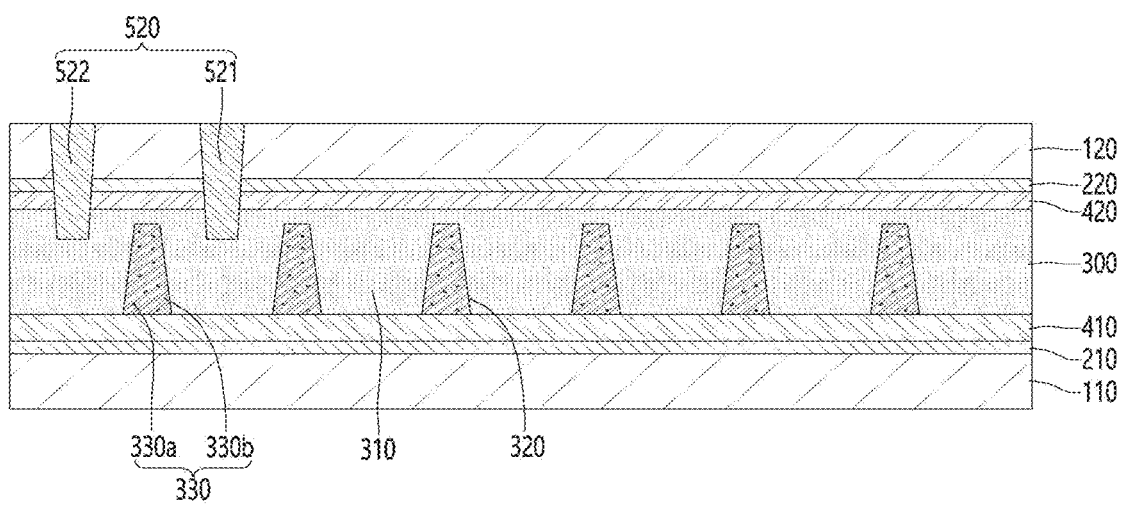

Subsequently, referring to FIGS. 60 and 61, the second sealing portion 520 may be formed by disposing a sealing material in the fourth hole H4 and the fifth hole H5.

The second sealing portion 520 may include the same material as those of the dam portion 600 and the first sealing portion 510 described above, but the embodiment is not limited thereto.

Figure 63:
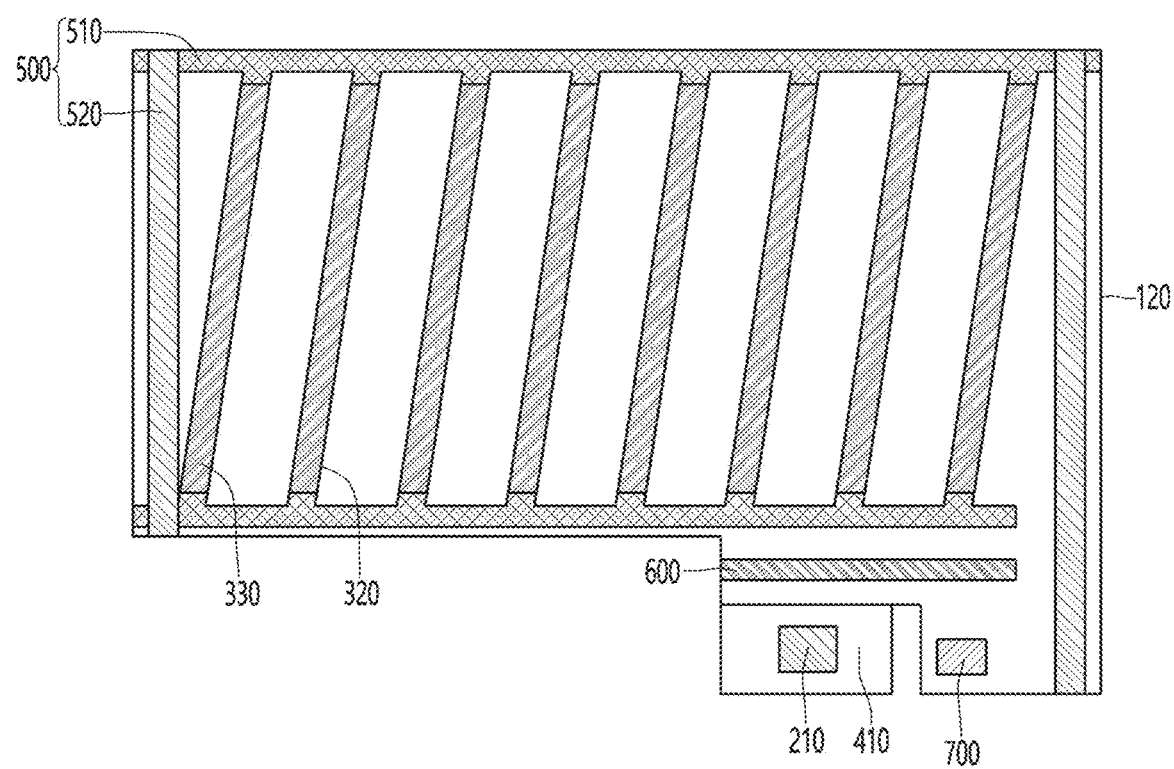

Subsequently, referring to FIGS. 62 and 63, the optical path control member of FIG. 63 may be finally manufactured by cutting in a dotted line direction of FIG. 62.

Figure 64:
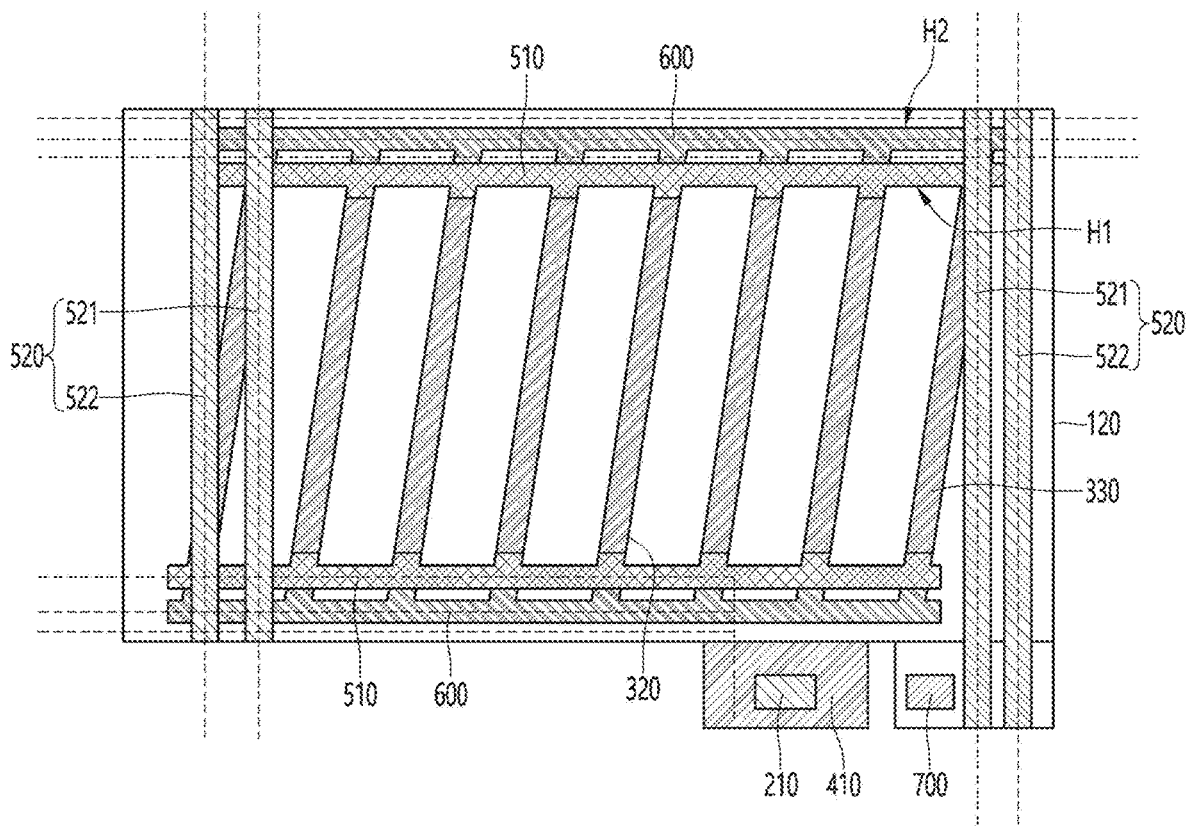

Meanwhile, referring to FIG. 64, the outer surface of the optical path control member may be formed in various shapes by disposing the cutting line at various positions.

Through this, the area of the accommodating portion in which the optical conversion material is formed in the optical path control member may be freely formed to be 10% or more, 20% or more, 25% or more, 30% or more, 40% or more, or 50% or more as compared with the second substrate. In addition, the area of the accommodating portion in which the optical conversion material is formed may be adjusted to 10% to 60%, 20% to 50%, or 20% to 40%. Through this, the front transmittance and the side transmittance of the optical path control member may be adjusted within a desired range. In addition, it is possible to reduce the bezel region of the display panel on which the optical path control member is mounted, and to secure a region capable of mounting other components required in the display panel.

Hereinafter, referring to FIGS. 65 to 69, a display device to which an optical path control member according to an embodiment is applied will be described.

Figure 65:
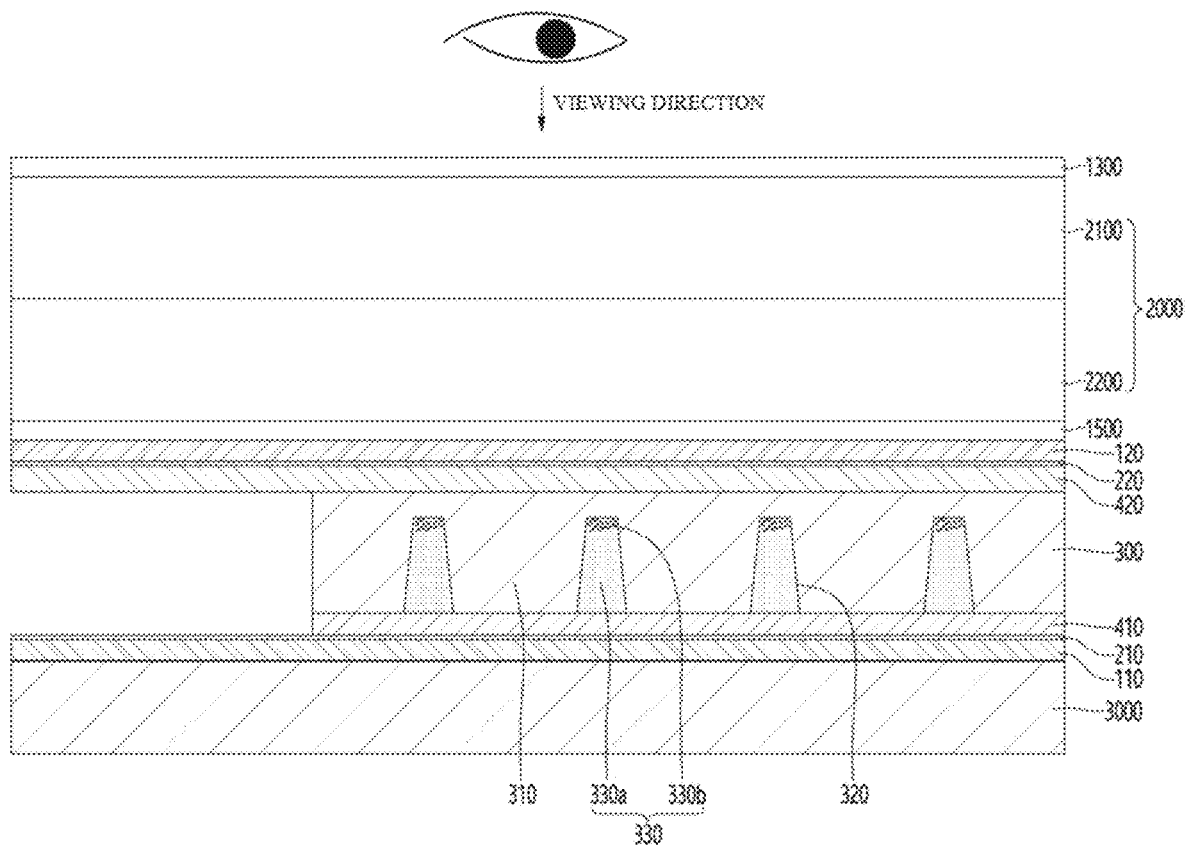
FIGS. 65 and 66 are cross-sectional views of a display device to which an optical path control member according to an embodiment is applied.
Figure 66:
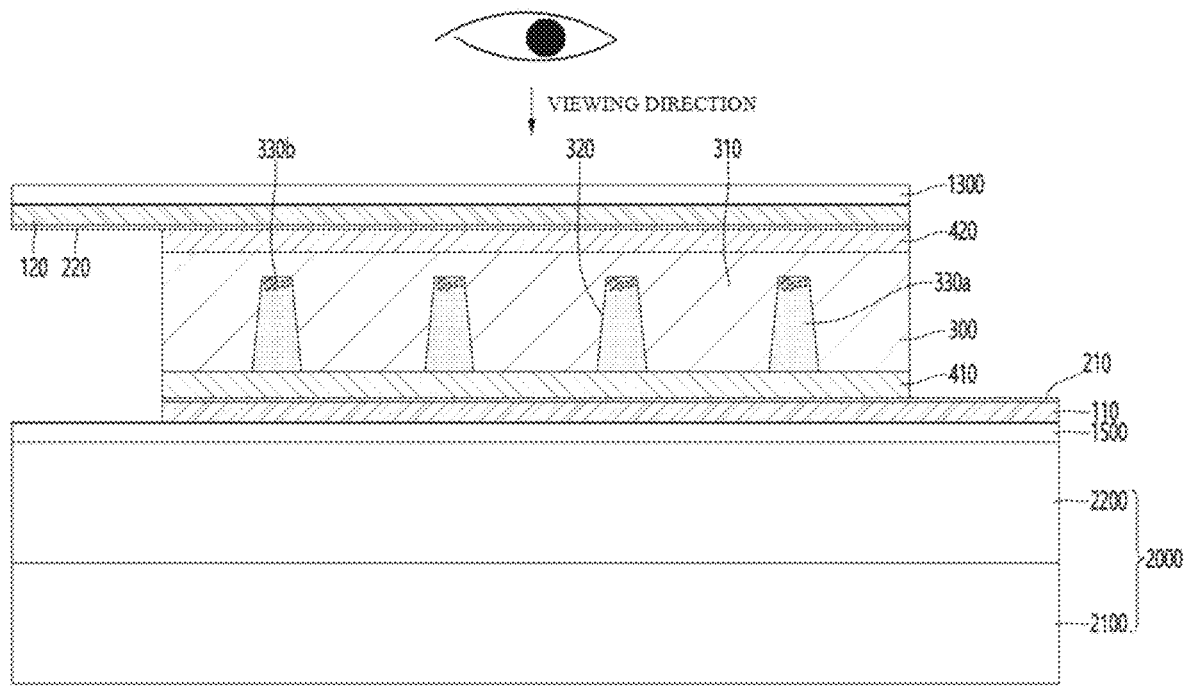

Referring to FIGS. 65 to 66, an optical path control member 1000 according to an embodiment may be disposed on or under a display panel 2000.

The display panel 2000 and the optical path control member 1000 may be disposed to be adhered to each other. For example, the display panel 2000 and the optical path control member 1000 may be adhered to each other via an adhesive layer 1500. The adhesive layer 1500 may be transparent. For example, the adhesive layer 1500 may include an adhesive or an adhesive layer including an optical transparent adhesive material.

The adhesive layer 1500 may include a release film. In detail, when adhering the optical path control member and the display panel, the optical path control member and the display panel may be adhered after the release film is removed.

The display panel 2000 may include a first' substrate 2100 and a second' substrate 2200. When the display panel 2000 is a liquid crystal display panel, the optical path control member may be formed under the liquid crystal panel. That is, when a surface viewed by the user in the liquid crystal panel is defined as an upper portion of the liquid crystal panel, the optical path control member may be disposed under the liquid crystal panel. The display panel 2000 may be formed in a structure in which the first' substrate 2100 including a thin film transistor (TFT) and a pixel electrode and the second' substrate 2200 including color filter layers are bonded to each other with a liquid crystal layer interposed therebetween.

In addition, the display panel 2000 may be a liquid crystal display panel of a color filter on transistor (COT) structure in which a thin film transistor, a color filter, and a black electrolyte are formed at the first' substrate 2100 and the second' substrate 2200 is bonded to the first' substrate 2100 with the liquid crystal layer interposed therebetween. That is, a thin film transistor may be formed on the first' substrate 2100, a protective film may be formed on the thin film transistor, and a color filter layer may be formed on the protective film. In addition, a pixel electrode in contact with the thin film transistor may be formed on the first' substrate 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit 3000 providing light from a rear surface of the display panel 2000.

That is, as shown in FIG. 65, the optical path control member may be disposed under the liquid crystal panel and on the backlight unit 3000, and the optical path control member may be disposed between the backlight unit 3000 and the display panel 2000.

Alternatively, as shown in FIG. 66, when the display panel 2000 is an organic light emitting diode panel, the optical path control member may be formed on the organic light emitting diode panel. That is, when the surface viewed by the user in the organic light emitting diode panel is defined as an upper portion of the organic light emitting diode panel, the optical path control member may be disposed on the organic light emitting diode panel. The display panel 2000 may include a self-luminous element that does not require a separate light source. In the display panel 2000, a thin film transistor may be formed on the first' substrate 2100, and an organic light emitting element in contact with the thin film transistor may be formed. The organic light emitting element may include an anode, a cathode, and an organic light emitting layer formed between the anode and the cathode. In addition, the second' substrate 2200 configured to function as an encapsulation substrate for encapsulation may be further included on the organic light emitting element.

In addition, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting diode panel, the polarizing plate may be the external light reflection inhibiting polarizing plate.

In addition, an additional functional layer 1300 such as an anti-reflection layer, an anti-glare, or the like may be further disposed on the optical path control member 1000. Specifically, the functional layer 1300 may be adhered to one surface of the first substrate 110 of the optical path control member. Although not shown in drawings, the functional layer 1300 may be adhered to the first substrate 110 of the optical path control member via an adhesive layer. In addition, a release film for protecting the functional layer may be further disposed on the functional layer 1300.

Further, a touch panel may be further disposed between the display panel and the optical path control member.

It is illustrated in the drawings that the optical path control member is disposed at an upper portion of the display panel, but the embodiment is not limited thereto, and the optical path control member may be disposed at various positions such as a position in which light is adjustable, that is, a lower portion of the display panel, or between a second substrate and a first substrate of the display panel, or the like.

In addition, it is shown in the drawings that the optical conversion unit of the optical path control member according to the embodiment is in a direction parallel or perpendicular to an outer surface of the second substrate, but the optical conversion unit is formed to be inclined at a predetermined angle from the outer surface of the second substrate. Through this, a moire phenomenon occurring between the display panel and the optical path control member may be reduced.

Figure 69:
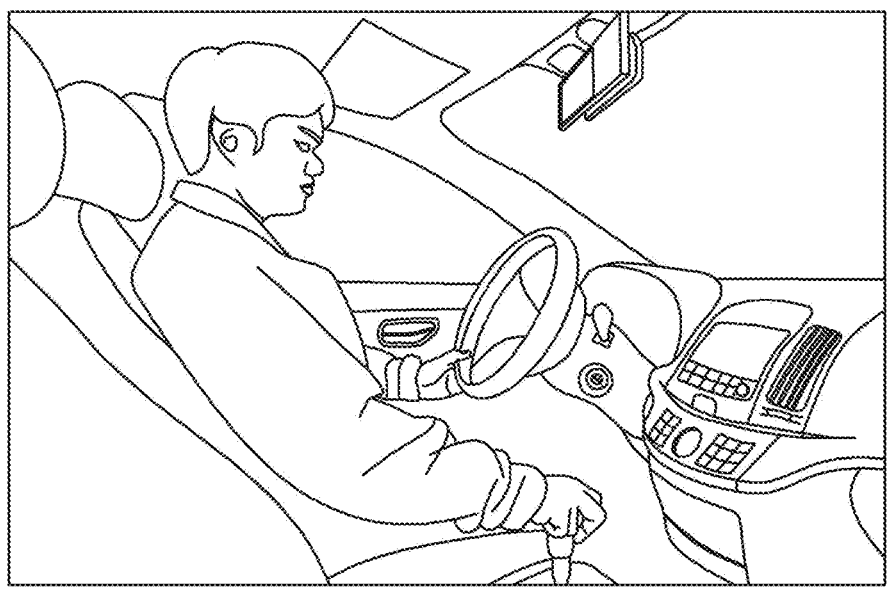

Referring to FIGS. 67 to 69, an optical path control member according to an embodiment may be applied to various display devices.

Referring to FIGS. 67 to 69, the optical path control member according to the embodiment may be applied to a display device that displays a display.

For example, when power is applied to the optical path control member as shown in FIG. 67, the accommodating portion functions as the light transmitting part, so that the display device may be driven in the public mode, and when power is not applied to the optical path control member as shown in FIG. 68, the accommodating portion functions as the light blocking part, so that the display device may be driven in the light blocking mode.

Accordingly, a user may easily drive the display device in a privacy mode or a normal mode according to application of power.

Light emitted from the backlight unit or the self-luminous element may move from the first substrate toward the second substrate. Alternatively, the light emitted from the backlight unit or the self-luminous element may also move from the second substrate toward the first substrate.

In addition, referring to FIG. 69, the display device to which the optical path control member according to the embodiment is applied may also be applied inside a vehicle.

For example, the display device including the optical path control member according to the embodiment may display a video confirming information of the vehicle and a movement route of the vehicle. The display device may be disposed between a driver seat and a passenger seat of the vehicle.

In addition, the optical path control member according to the embodiment may be applied to a dashboard that displays a speed, an engine, an alarm signal, and the like of the vehicle.

Further, the optical path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An optical path control member comprising:
 a first substrate in which a first direction and a second direction are defined;
 a first electrode disposed on the first substrate;
 a second substrate which is disposed on the first substrate, and in which the first direction and the second direction are defined;
 a second electrode disposed under the second substrate; and
 an optical conversion unit disposed between the first electrode and the second electrode,
 wherein the second substrate and the second electrode include a cutting portion passing through the second substrate and the second electrode,
 wherein the cutting portion includes:
 a 1-1 cutting portion and a 1-2 cutting portion that are disposed to face each other in the second direction;
 a 2-1 cutting portion and a 2-2 cutting portion that are disposed to face each other in the first direction, and
 an open region formed by spacing the 1-2 cutting portion apart from the 2-2 cutting portion,
 wherein a first sealing portion is disposed on the 1-1 cutting portion and the 1-2 cutting portion,
 a second sealing portion is disposed inside the 2-1 cutting portion and the 2-2 cutting portion,
 wherein the optical conversion unit includes a plurality of partition wall portions, a plurality of accommodating portions, and a base portion, wherein an optical conversion material including optical conversion particles and a dispersion liquid is disposed inside the accommodating portion, and wherein the optical conversion material is in contact with at least one of the first sealing portion and the second sealing portion.

2. The optical path control member of claim 1, comprising a buffer layer disposed between the second electrode and the optical conversion unit, wherein at least one of the 1-1 cutting portion, the 1-2 cutting portion, the 2-1 cutting portion, and the 2-2 cutting portion passes through the buffer layer and the base portion.

3. The optical path control member of claim 2, comprising an adhesive layer disposed between the first electrode and the optical conversion unit, wherein at least one of the first sealing portion and the second sealing portion is disposed in direct contact with the adhesive layer.

4. The optical path control member of claim 1, wherein the optical conversion material of at least one of the plurality of accommodating portions is in contact with the first sealing portion, and the optical conversion material of at least one of the plurality of accommodating portions is in contact with the first sealing portion and the second sealing portion.

5. The optical path control member of claim 1, wherein the accommodating portion extends in a direction different from the second direction.

6. The optical path control member of claim 1, wherein the first substrate includes a first protrusion, a dam portion is disposed on the first protrusion, and the second substrate includes a second protrusion.

7. The optical path control member of claim 6, wherein the first electrode is exposed on the first protrusion, an additional cutting portion passing through the second substrate and the second electrode is formed in the second protrusion, and an electrode connection portion connected to a side surface of the second electrode is disposed inside the additional cutting portion.

8. The optical path control member of claim 7, wherein the electrode connection portion includes a material different from that of at least one of the first electrode and the second electrode.

9. The optical path control member of claim 7, wherein the dam portion is disposed between the electrode connection portion and the first sealing portion.

10. The optical path control member of claim 9, comprising an adhesive layer disposed between the first electrode and the optical conversion unit.

11. The optical path control member of claim 10, wherein an insulating layer is disposed between the electrode connection portion and the adhesive layer.

12. The optical path control member of claim 6, wherein a first mixing region including both a material of the first sealing portion and a material of the dam portion is disposed between the first sealing portion and the dam portion.

13. The optical path control member of claim 1, wherein at least one accommodating portion among the plurality of accommodating portions includes another mixing region including both the optical conversion material and a material of the first sealing portion.

14. The optical path control member of claim 1, wherein a different mixing region including both the optical conversion material and a material of the second sealing portion is included between the second sealing portion and the optical conversion material.

15. The optical path control member of claim 1, wherein depths of the 1-1 cutting portion and the 1-2 cutting portion and the 2-1 cutting portion and the 2-2 cutting portion are different from each other.

16. The optical path control member of claim 1, wherein lengths of the 2-1 cutting portion and the 2-2 cutting portion in the second direction are different from each other.

17. The optical path control member of claim 1, wherein the 1-1 cutting portion is connected to the 2-1 cutting portion and the 2-2 cutting portion, and the 1-2 cutting portion is connected to the 2-1 cutting portion.

18. A display device comprising:

a panel including at least one of a display panel and a touch panel; and the optical path control member of claim 1, which is disposed on or under the panel.

19. The display device of claim 18, wherein the panel includes a backlight unit and a liquid crystal display panel, the optical path control member is disposed between the backlight unit and the liquid crystal display panel, and light emitted from the backlight unit moves in a direction of the second substrate from the first substrate.

20. The display device of claim 18, wherein the panel includes an organic light emitting diode panel, the optical path control member is disposed on the organic light emitting diode panel, and light emitted from the panel moves in a direction of the second substrate from the first substrate.

* * * * *